US012742655B2

(12) United States Patent
Donato et al.

(10) Patent No.: US 12,742,655 B2
(45) **Date of Patent: *Sep. 22, 2026**

(54) MAP DATA ADJUSTMENTS FOR ANOMALY CORRECTION

(71) Applicant: Apple Inc., Cupertino, CA (US)

(72) Inventors: Gianluca Donato, Los Altos, CA (US); Gunjan Gupta, Sunnyvale, CA (US); Peter J. Potts, San Mateo, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/677,615

(22) Filed: May 29, 2024

(65) Prior Publication Data

US 2024/0318977 A1 Sep. 26, 2024

Related U.S. Application Data

(63) Continuation of application No. 17/832,245, filed on Jun. 3, 2022, now Pat. No. 12,031,836.
(Continued)

(51) Int. Cl.
*G01C 21/00* (2006.01)
*G06T 17/05* (2011.01)
*G06T 17/20* (2006.01)

(52) U.S. Cl.
CPC ..... *G01C 21/3826* (2020.08); *G01C 21/3867* (2020.08); *G01C 21/3881* (2020.08); *G06T 17/05* (2013.01); *G06T 17/20* (2013.01)

(58) Field of Classification Search
CPC .................................................. G01C 21/3826
See application file for complete search history.

(56) References Cited

U.S. PATENT DOCUMENTS 7,751,482 B1 7/2010 Srinivasan et al.
9,111,380 B2 * 8/2015 Piemonte .............. G06T 15/005
(Continued)

FOREIGN PATENT DOCUMENTS

EP 2052214 B1 * 11/2018 ............. G01C 21/36
JP 2003259307 A 9/2003

OTHER PUBLICATIONS

"Non-Final Office Action," mailed Aug. 30, 2023 in U.S. Appl. No. 17/832,245. 52 pages.
(Continued)

*Primary Examiner* — Jean Paul Cass
(74) *Attorney, Agent, or Firm* — Kilpatrick Townsend & Stockton LLP

(57) ABSTRACT

Techniques described herein are used to identify buildings that intersect or otherwise overlap a road, and independently scaling the buildings until they no longer overlap. For example, a computer system may identify an intersection condition corresponding to an intersection between a first polygon of a first type and a second polygon of a second type. The first polygon may include a set of edges connected by a set of vertexes. The computer system may select a first pivot point for the first polygon, which includes a vertex of the set of vertexes or a midpoint of one edge of the set of edges. The computer system may perform an iterative scaling operation. The computer system may determine, based on the iterative scaling operation, a polygon transformation that avoids the intersection condition. The computer system may cause rendering, on a display, of a map view that includes the polygon transformation.

19 Claims, 30 Drawing Sheets

Related U.S. Application Data

(60) Provisional application No. 63/197,544, filed on Jun. 7, 2021.

(56) References Cited

U.S. PATENT DOCUMENTS

| | | | | |
|---|---|---|---|---|
| 9,489,754 | B2 * | 11/2016 | Arikan | G06T 11/00 |
| 10,360,726 | B2 | 7/2019 | Suresh et al. | |
| 10,839,535 | B2 * | 11/2020 | Javidnia | G06T 7/593 |
| 11,019,459 | B1 | 5/2021 | Goldberg | |
| 2010/0201682 | A1 * | 8/2010 | Quan | G06T 15/04 382/173 |
| 2013/0322702 | A1 * | 12/2013 | Piemonte | G06T 19/20 382/113 |
| 2013/0328915 | A1 * | 12/2013 | Arikan | G06T 11/00 345/619 |
| 2016/0229555 | A1 | 8/2016 | Millin et al. | |
| 2018/0101983 | A1 | 4/2018 | Suresh et al. | |
| 2018/0188743 | A1 | 7/2018 | Wheeler | |
| 2018/0276881 | A1 | 9/2018 | VanderLugt et al. | |
| 2019/0156566 | A1 | 5/2019 | Chen et al. | |
| 2019/0333237 | A1 * | 10/2019 | Javidnia | G06T 7/593 |
| 2020/0193701 | A1 | 6/2020 | Ely | |
| 2022/0390255 | A1 * | 12/2022 | Donato | G06T 17/20 |
| 2022/0398782 | A1 | 12/2022 | Flynn et al. | |
| 2023/0018053 | A1 | 1/2023 | Bhowmick | |
| 2023/0168106 | A1 | 6/2023 | Velkavrh et al. | |
| 2023/0222905 | A1 | 7/2023 | Xu et al. | |
| 2024/0318977 | A1 * | 9/2024 | Donato | G06T 17/20 |

OTHER PUBLICATIONS

"Notice of Allowance," mailed Mar. 1, 2024 in U.S. Appl. No. 17/832,245. 18 pages.
"Non-Final Office Action," mailed Sep. 15, 2023 in U.S. Appl. No. 17/951,502. 55 pages.
"Notice of Allowance," mailed Jan. 19, 2024 in U.S. Appl. No. 17/951,502. 14 pages.
"Non-Final Office Action", mailed Aug. 29, 2023 in U.S. Appl. No. 17/951,513. 52 pages.
U.S. Appl. No. 17/651,513 , "Notice of Allowance," mailed Jan. 17, 2024 in U.S. Appl. No. 17/651,513. 15 pages.
Genius et al., "A Solution to the Data Re-Ordering Problem for Multi-Pipeline Streaming Applications on Clustered MPSoC", Available online at: https://ieeexplore.ieee.org/abstract/document/6322892, Oct. 4, 2012, 4 pages.
Mason et al., "Gis Modeling of Riparian Zones Utilizing Digital Elevation Models and Flood Height Data: an Intelligent Approach", Research Gate, Available online at: https://www.researchgate.net/publication/229000338_GIS_modeling_of_riparian_zones_utilizing_digital_elevation_models_and_flood_height_data_An_intelligent_approach, May 7-11, 2007, 10 pages.
Mauck , "Buffer Based on Elevation", Available online at: https://community.esri.com/t5/arcgis-spatial-analyst-questions/buffer-based-on-elevation/td-p/202445, Dec. 2, 2015, 4 pages.
Siart et al., "Combining Digital Elevation Data (Srtm/aster), High Resolution Satellite Imagery (Quickbird) and Gis for Geomorphological Mapping: a Multi-component Case Study on Mediterranean Karst in Central Crete", Geomorphology, vol. 112, Nos. 1-2, Nov. 2009, pp. 106-121.
"Notice of Allowability," mailed Apr. 5, 2024, in U.S. Appl. No. 17/951,513. 16 pages.
"Notice of Allowability," mailed Apr. 8, 2024, in U.S. Appl. No. 17/951,502. 15 pages.

* cited by examiner

MAP DATA ADJUSTMENTS FOR ANOMALY CORRECTION

CROSS-REFERENCES TO RELATED APPLICATIONS

This application is a continuation of U.S. patent application Ser. No. 17/832,245, filed Jun. 3, 2022, which claims the benefit of and priority to U.S. Provisional Application No. 63/197,544, filed Jun. 7, 2021. These applications are incorporated herein by reference in their entireties.

BACKGROUND

Map data is often obtained from various map data sources (e.g., map data vendors). The map data can be combined to generate a map that can represent various types of map data. For example, the map data can include raster images or polygons that represent areas of vegetation, climate, water, buildings, coastlines, elevation, etc. The map data can include raster images, polylines, multi-lines, line strings, etc. that represent roads, paths, or other linear map objects. However, when receiving and combining map data from different vendors, there is often a mismatch between data from different vendors with respect to locations of polygons, elevations, etc. For example, where map data from two different sources is stitched together, there may be differences in the locations of borders of polygons, locations of polygons and/or elevation that cause errors to appear on a map when these polygons and/or elevations are rendered to generate the map.

BRIEF SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer-implemented that includes determining a boundary polygon corresponding to a first terrain mesh, the boundary polygon including a set of candidate points that excludes any collinear points. The computer-implemented method also includes determining a triangulation for the boundary polygon based on the set of candidate points, the triangulation defining a plurality of triangles within the boundary polygon. The computer-implemented method also includes performing a simplification operation for a first triangle of the plurality of triangles by at least: determining first vertical elevations for individual candidate points within the first triangle, determining vertical errors for the individual candidate points in the first triangle by comparing the first vertical elevations with corresponding second vertical elevations obtained from the first terrain mesh, and adding a first candidate point to a second terrain mesh based on a first vertical error of the first candidate point. The computer-implemented method also includes causing rendering, on a display, of a map view that includes the second terrain mesh including the first candidate point. Other embodiments of this aspect include corresponding computer systems, apparatus, and computer programs recorded on one or more computer storage devices, each configured to perform the actions of the methods.

Another general aspect includes a computer-implemented that includes determining, in accordance with an elevation criterion, an elevation anomaly data point in a joined region defined by a first elevation dataset and a second elevation dataset. The computer-implemented method also includes determining, in accordance with a buffer criterion, a set of buffer points surrounding the elevation anomaly data point, the set of buffer points including a set of elevation anomaly points including the elevation anomaly data point and at least one other elevation anomaly data point. The computer-implemented method also includes determining interpoint distances between buffer point in the set of buffer points. The computer-implemented method also includes determining, for at least one buffer point of the set of buffer points, a reduction factor based a first interpoint distance for the at least one buffer point and a first elevation value of the at least one buffer point. The computer-implemented method also includes applying the reduction factor to the at least one buffer point to adjust the first elevation value. The computer-implemented method also includes causing rendering, on a display, of a map view that includes the at least one buffer point with the adjusted first elevation value. Other embodiments of this aspect include corresponding computer systems, apparatus, and computer programs recorded on one or more computer storage devices, each configured to perform the actions of the methods.

Another general aspect includes a computer-implemented that includes identifying a subject polygon defined by a first polygon and a second polygon. The computer-implemented method also includes determining a plurality of line segments within the subject polygon and that define a medial axis of the subject polygon. The computer-implemented method also includes determining a plurality of faces within the subject polygon based on the plurality of line segments. The computer-implemented method also includes assigning a first face of the plurality of faces to the first polygon. The computer-implemented method also includes updating a first boundary of the first polygon to include a first face area corresponding to the first face. The computer-implemented method also includes causing rendering, on a display, of a map view that includes the updated first boundary. Other embodiments of this aspect include corresponding computer systems, apparatus, and computer programs recorded on one or more computer storage devices, each configured to perform the actions of the methods.

Another general aspect includes a computer-implemented that includes determining, by a driver node of a distributed computing framework, an overall adjacency graph for a plurality of input polygons, the overall adjacency graph including a plurality of nodes representing the plurality of input polygons and a plurality of edges representing a plurality of boundaries between input polygons of the plurality of input polygons that are adjacent. The computer-implemented method also includes at a first worker node of the distributed computing framework, generating, for a first input polygon, a first planar graph using the overall adjacency graph, the first planar graph representing particular input polygons that are adjacent to the first input polygon; assigning, using the first planar graph, at least one of a first gap or a first overlap to the first input polygon or to a first particular input polygon that is adjacent to the first input polygon; and traverse the first planar graph to construct a first target polygon that includes at least one of a first assigned gap or a first assigned overlap. The computer-implemented method also includes causing rendering, on a display, of a map view that includes the first target polygon. Other embodiments of this aspect include corresponding computer systems, apparatus, and computer programs recorded on one or more computer storage devices, each configured to perform the actions of the methods.

Another general aspect includes a computer-implemented that includes accessing a first set of polygons of a first type and a set of polylines of a second type. The computer-implemented method also includes grouping polygons of the first set of polygons into face groups based on centroids of the polygons, a first face group including at least one polygon of the first set of polygons that is oriented in a particular direction with respect to at least one polyline of the set of polylines. The computer-implemented method also includes determining that a first polygon of a first face group is anomalous based on a perimeter of the first polygon and a first property of a first polyline of the set of polylines. The computer-implemented method also includes for the first face group, computing a set of ideal push vectors for the first polyline based on the first property of the first polyline, combining the set of ideal push vectors into a single vector, and applying the single vector to the first face group to translate at least one vertex of the first polygon with respect to the first polyline. Other embodiments of this aspect include corresponding computer systems, apparatus, and computer programs recorded on one or more computer storage devices, each configured to perform the actions of the methods.

Another general aspect includes a computer-implemented that includes identifying an intersection condition corresponding to an intersection between a first polygon of a first type and a second polygon of a second type, the first polygon including a set of edges connected by a set of vertexes. The computer-implemented method also includes selecting a first pivot point for the first polygon, the first pivot point including a vertex of the set of vertexes or a midpoint of one edge of the set of edges. The computer-implemented method also includes performing an iterative scaling operation including at least one of: scaling the first polygon with respect to the first pivot point in a first dimension corresponding to a first heading of a set of headings, or scaling the first polygon with respect to the first pivot point in a second dimension corresponding to a second heading of the set of headings. The computer-implemented method also includes determining, based on the iterative scaling operation, a polygon transformation that avoids the intersection condition. The computer-implemented method also includes causing rendering, on a display, of a map view that includes the polygon transformation. Other embodiments of this aspect include corresponding computer systems, apparatus, and computer programs recorded on one or more computer storage devices, each configured to perform the actions of the methods.

BRIEF DESCRIPTION OF THE DRAWINGS

Like reference symbols in the various drawings indicate like elements.

DETAILED DESCRIPTION

Figure 1:
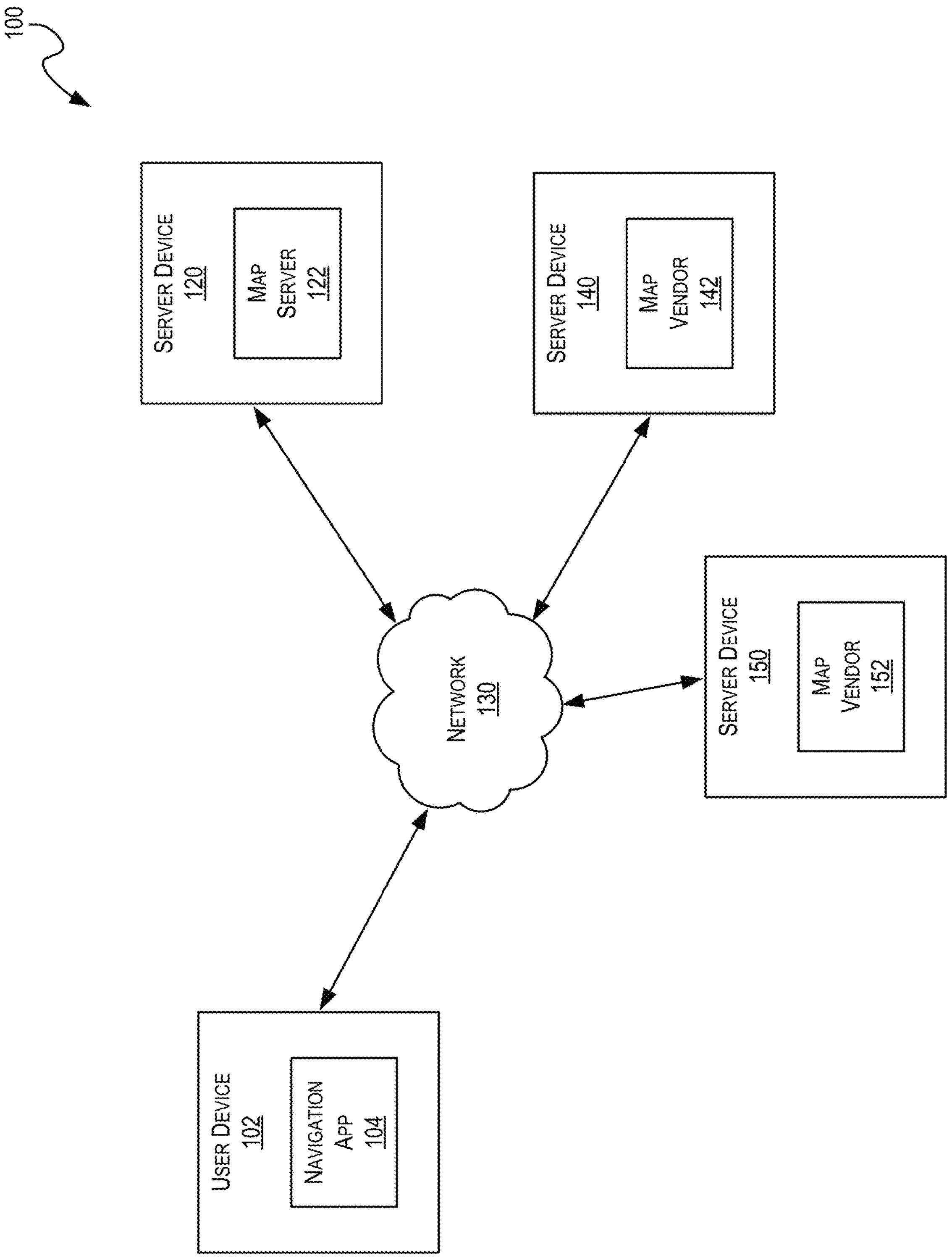
FIG. 1 is a block diagram of an example system for generating maps based on map data obtained from different sources, according to at least one example.

In the following description, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the example being described.

Examples of the present disclosure are directed to, among other things, methods, systems, devices, and computer-readable media (e.g., described technology and/or described techniques) for scaling, adjusting, clipping, smoothing, or otherwise resolving large map datasets in predictable and efficient manners. In some examples, the adjustments may be performed to correct anomalies in the datasets that have been introduced as a result of joining datasets provided by different map data vendors, collected using different techniques, and for other reasons described herein. The described technology may improve the fidelity of datasets by removing artificial elevation differences between two elevation datasets, simplifying terrain meshes, filling gaps between polygons, reassigning overlapping portions of polygons, scaling buildings to avoid overlapping roadways, and performing other similar techniques. Such improvements may be visible to users when the datasets are viewed in a map view on user devices (e.g., as presented on a display of a user device). Many of the techniques described herein have been developed for parallel processing. This achievement along with others described herein enable systems that implement the techniques to process datasets that might span the entire world or large portions thereof in a performant manner.

Turning now to a first particular example, in this example is provided a computer system that simplifies an input terrain mesh in a way that preserves the characteristics of the input terrain mesh and may be performed in parallel. For example, the computer system may access an input terrain mesh (e.g., a tile or other portion of a larger mesh), and determine a polygon boundary of the input terrain mesh. The computer system may remove any collinear points along the polygon boundary, leaving only vertices on the polygon boundary. These vertices on the polygon boundary will have three-dimensional values (e.g., X, Y, and Z). In order to enable parallel processing, the values of these vertices will remain unchanged during simplification. Thus, while a first tile of the mesh is being simplified by a first computing process, other tiles of the mesh may also be subjected to the same simplification process in parallel. When all have been simplified (or at least some) the tiles may be joined again at the boundaries, which have the shared vertices. Continuing with simplification, the computer system may then use the vertices to compute a set of triangles within the polygon boundary using Delaunay Triangulation. For example, for a rectangle having four vertices, this operation may create two triangles. The computer system may then iteratively determine a candidate point within each triangle. The candidate point is the point contained within the triangle that has a maximum vertical error across all points in the triangle as compared to corresponding points in the input terrain mesh. The computer system may then add the candidate points to an output terrain mesh and recompute new triangles within the existing triangles, so long as a maximum vertical error for each computed triangle is greater than a threshold vertical error (e.g., a minimum vertical difference between the input terrain mesh and the output terrain mesh). This results in the iterative addition of new triangles. When this threshold is met, the computer system may complete the output terrain mesh with the new triangles and new points.

The described technology, including that of the first example, provides technical solutions to solve technical problems of conventional approaches. For example, conventional approaches either did not simplify terrain meshes, or did so in a way that resulted in elevation degradation. Not simplifying terrain meshes may result in increased storage requirements at server computer systems, increased bandwidth requirements for devices accessing the terrain meshes, and increased computing requirements on both the device and the server for processing the terrain meshes. Additionally, some terrain meshes may include too many dense triangles and/or ones that are only slivers. Such an aesthetic is distracting to users and makes the maps look overly busy. The described technology addresses these problems by reducing the number of triangles, which also reduces the overall size. The reduced number of triangles makes the meshes more aesthetically pleasing to users.

Turning now to a second particular example, in this example is provided a computer system for smoothing elevation anomalies (e.g., artificial cliffs) that are created when two elevation data sets are joined (e.g., at a coastline). In some cases, these artificial cliffs may be completely vertical and very tall (e.g., greater than 1.5 kilometers). These cliffs obviously look artificial and, as such, reduce user confidence in the integrity of the data. As an example, a first elevation dataset may represent the land portion of the coastline and a second elevation dataset may represent the water portion. When these two elevation datasets are joined, certain points within a joined region of the two datasets may represent large elevation differences. In actuality, these elevation differences may not be representative of the real-world topology at these locations. The techniques described herein may take as inputs these two elevation datasets and, in some examples, other data such as a polygon that defines a coastline, to identify elevation anomalies. Anomalies within some adjacent regions can then be joined together to reduce the total number to be resolved. Afterwards, the computer system may compute a reduction factor, which, when applied, will generate a slope in a region between inland elevation points (e.g., those that can be trusted as likely actual elevations) and elevation points within the joined region (e.g., elevations of zero at the water). The computer system identifies anomalies, groups adjacent anomalies together, and determines the reduction factors in ways that are considerate of neighboring zones. This ensures that additional anomalies or other artifacts are not introduced into the visible map when the computer system implements the changes. When the reduction factors are applied using a smoothing function (e.g., linear, logistics, semi-logistics, cosine), the artificial cliffs are smoothed out to create a more natural looking change. Additionally, this smoothing more closely approximates the actual elevations between the water and the inland points than the artificial cliffs. This similar approach can be applied to reduce artificial cliffs present in bathymetry, e.g., a reduction factor can be applied to create a sloped elevation change between a negative elevation and one closer to zero near the coastline.

The described technology, including that of the second example, provides technical solutions to solve technical problems of the conventional approaches. For example, conventional approaches for resolving such anomalies have been time consuming, required user input, and/or were heavy process-consuming. For small datasets or for very limited regions, such conventional approaches may be suitable. However, as described herein, for large datasets that span large regions (e.g., an entire coastline of a continent, dense lake regions in certain countries, etc.), such conventional techniques create bottlenecks and/or may be incapable of producing suitable results in a suitable time period. The described techniques, however, provide automated technical solutions that can run across large datasets (e.g., the entire world), smooth out big elevation differences in a natural way, and are performant (as compared to conventional approaches and/or approaches that might try to smooth every point within a bounded region). These improvements are realized in the way that the computer system identifies anomalies, groups those in regions to create bigger geometries, then applies the smoothing to the bigger geometries, rather than at every point. In some examples, the described techniques may address anomalies within a few hours, as compared to a conventional approach (or an approach that analyzes every point) that might take multiple days or weeks to complete.

Turning now to a third particular example, in this example is provided a computer system for using a medial axis of a polygon gap or overlap to assign portions of the gap or overlap to adjacent polygons. The computer system may take as inputs at least two polygon datasets. The computer system may identify a subject polygon using the two polygon datasets (e.g., an overlap polygon between the two polygon datasets or a gap polygon between the two datasets). In the overlap example, the overlap polygon is bounded by the two polygon datasets. In the gap example, the gap polygon may be bounded by two polygon datasets and/or one or more other polygon datasets. The computer system may determine line segments within the subject polygon that define a medial axis of the subject polygon (e.g., a tree that extends through the subject polygon with branches extended from the tree to vertexes of the subject polygon). Areas between the branches may be defined as faces of the subject polygon, and the computer system may identify shared boundaries between the faces and the two polygon datasets. Based on these shared boundaries, the computer system may assign individual faces to one of the two polygons. In this manner, a portion of the subject polygon (e.g., faces) that is adjacently located to one of the two polygons, will be assigned to that polygon. Once assigned, the computer system can adjust the boundaries of the polygons to incorporate the assigned faces. These updates can be saved such that the boundaries of the polygons, when provided for presentation, reflect the updates.

The described technology, including that of the third example, provides technical solutions to solve technical problems of the conventional approaches. For example, a conventional approach for resolving such anomalies involves using heuristics to assign the entirety of the gap/overlap to one of its adjacent polygons. This approach may produce undesirable results when the gap is bounded by three or more polygons and when the overlap is between three or more polygons. In these situations, the assignment of the entirety of the gap or overlap may result in modified polygons that are unnatural, may less accurately represent actual regions, and/or are otherwise not aesthetically pleasing. Additionally, such heuristic-based approaches are inherently non-parallelizable for large datasets. And even naive methods of parallelization may introduce incorrect results, slivers, and numerical errors. The approaches described herein may address these technical problems by providing a deterministic algorithm to distribute the gaps/overlaps between two or more adjacent polygons in a manner that is aesthetically pleasing and that has a property that every point in the gap/overlap is assigned to the adjacent polygon. This ensures that slivers are not produced and that all gaps/overlaps are resolved.

Turning now to a fourth particular example, in this example is provided a computer system for parallelizing the identification and assignment of gaps/overlaps for large datasets. In some examples, such techniques may be suitable for parallelization by aligning each polygon independently, taking adjacent polygons as inputs. To do so, the computer system may, in parallel, identify polygons within a bounded area of a map region, identify intersections between adjacent polygons within the bounded region, and compute adjacency graphs for the polygons (e.g., a graph structure in which nodes represent polygons and edges represent borders between the polygons). Next, the computer system can combine the adjacency graphs to create an overall adjacency graph for the map region. Again, in parallel, the computer system can, for each polygon and its adjacent polygons, construct a planar graph, classify gaps/overlaps, assign gaps/overlaps to relevant polygons, traverse the planar graph to construct new polygons, and output the new polygons. These new polygons can be saved such that the new polygons, when provided for presentation, reflect the changes made to the underlying data.

The described technology, including that of the fourth example, provides technical solutions to solve technical problems of the conventional approaches. For example, a conventional approach for resolving such gaps/overlaps involves using heuristics to assign the entirety of the gap/overlap to one of its adjacent polygons. The conventional approach may produce undesirable results when the gap is bounded by three or more polygons and when the overlap is between three or more polygons. In these situations, the assignment of the entirety of the gap or overlap may result in modified polygons that are unnatural, less accurately represent actual regions, and/or are otherwise not aesthetically pleasing. Additionally, such heuristic-based approaches are inherently non-parallelizable for large datasets. Moreover, even naive methods of parallelization may introduce incorrect results, slivers, and numerical errors. The approaches described herein may address these technical problems by providing a graph-based approach for representing adjacent polygons. An overall adjacency graph for a region may then be used to align each gap/overlap independently, taking adjacent polygons as inputs. Because the described techniques may be applied in parallel, the processing load for identifying gaps/overlaps, assigning gaps/overlaps, and outputting updated polygons is significantly reduced as compared to conventional heuristic based approaches. Additionally, because the techniques described herein utilize adjacency graphs, polygons that define a gap or overlap, but do not otherwise intersect may be represented in a way that produces aesthetically pleasing polygon transformations.

Turning now to a fifth particular example, in this example is provided a computer system for automatically identifying intersections between buildings (e.g., polygons) and road networks (e.g., polygons or polylines). This particular technique may include evaluating blocks of buildings that are bounded by centerlines of roads. The computer system uses properties associated with the centerlines to determine coordinates of edges of the roadways, which the computer system then compares to the buildings to identify intersections. The computer system may assign each building in the block to a face of the block depending on coordinates of a centroid of each building with respect to coordinates of the centerlines. The computer system then computes a set of push vectors based on properties of the centerline. For example, wider roads may result in stronger push vectors. The computer system may then combine the set of push vectors into a single vector. The computer system may then apply the single vector to the corresponding face of the block in order to translate a vertex of the polygon (e.g., compress the polygon in a direction of the vector). In some examples, mean value coordinates may be computed for each vertex of the polygon, and the computer system may use these mean value coordinates as weights for each vertex of the polygon to define the single vector.

The described technology, including that of the fifth example, provides technical solutions to solve technical problems of the conventional approaches. For example, conventional approaches for resolving such anomalies have been time-consuming, required user input, and/or were resource-intensive. For example, a conventional approach involved identifying intersecting buildings and making adjustments manually. The described techniques are fully automated and result in considerable time savings. Another conventional approach involved translating the entire building away from the roadway. While this approach is suitable for some intersections, it also tends to create other issues. For example, translated buildings may move into other roadways or onto other buildings. The described techniques address this problem by using the vectors to push points from the road centerline right to the edge of the road. These push vectors, when applied as the single vector, shrink the entire block in a way that translates a portion of the buildings off of the road.

Turning now to a sixth particular example, in this example is provided a computer system for automatically identifying buildings that intersect or otherwise overlap a road, and independently scaling the buildings until they no longer overlap. The computer system selects sides on a boundary of a building that can be scaled and then walks a two-dimensional grid resulting in a sequence of candidate transformations. For example, the two-dimensional grid may correspond to a set of reduction values (e.g., 1, 0.999, 0.998, etc.) in a lateral direction and a set of similar reduction values in the opposite transversal direction. By walking through the two-dimensional grid, the computer system may evaluate whether scaling one value in one direction will avoid the overlap. If not, the computer system may continue iterating through different combinations of scaling in the two directions until a set of candidate transformations have been identified (e.g., a set of boundary changes to a building that no longer overlap). The computer system may then score each transformation in the candidate set (e.g., by comparing the area to the number of vertexes and/or to the area of the original building footprint), and then select one candidate as the resultant transformation. In some examples, the computer system may select the candidate transformation with the maximum possible area as compared to the original building footprint. The resultant transformation may be presented on a user interface for viewing. In some examples, both the original and the resultant transformation may be presented, for comparison.

The described technology, including that of the sixth example, provides technical solutions to solve technical problems of the conventional approaches. For example, conventional approaches for resolving such anomalies have been time-consuming, required user input, and/or were resource intensive. For example, a conventional approach involved identifying intersecting buildings and making adjustments manually. The described techniques are fully automated and result in considerable time savings. Another conventional approach involved translating the entire building away from the roadway. While this approach is suitable for some intersections, it also tends to create other issues. For example, translated buildings may move into other roadways or onto other buildings. The described techniques address this problem of scaling the building within the original building footprint. Because the techniques described herein can be used to evaluate a set of potential pivot points for scaling a building, the techniques can efficiently scale buildings having non-uniform or otherwise arbitrary footprints.

Turning now to the figures, FIG. 1 is a block diagram of an example system 100 for generating maps based on map data obtained from different sources, according to at least one example. For example, system 100 can be configured to obtain map data from different sources (e.g., map data vendors), stitch the map data from the different sources together, and generate a map that represents the map data received from the various sources. When stitching together, the system 100 can make adjustments to the map data to avoid errors, discrepancies, and map appearance problems, as described in detail below.

In some examples, the system 100 can include the user device 102. For example, the user device 102 can be a computing device such as a laptop computer, desktop computer, smartphone, wearable device (e.g., smartwatch, smart glasses, etc.), an in-vehicle infotainment system, and/or other computing device. The user device 102 can include a built-in display and/or may be connected to an external display (e.g., television, computer monitor, in-car system, smart glasses) using a wired and/or wireless connection. The user device 102 can present graphical user interfaces generated by various software components (e.g., operating system, user-level applications, etc.) installed and/or running on the user device 102 on the built-in display and/or the connected external display.

In some examples, the user device 102 can include a navigation application 104. For example, the navigation application 104 can generate and/or present graphical user interfaces for presenting map data on a display (e.g., built-in, external, etc.) of the user device 102. The navigation application 104 can present various types of maps that represent various types of map data. For example, the navigation application 104 can present maps that represent elevation, vegetation, coastlines, landcover, precipitation, and/or other data, as may be described herein. The navigation application 104 can provide graphical user interfaces that allow the user to specify route parameters (e.g., start location, destination location, transportation mode, etc.) and request navigation instructions based on the specified route parameters. The navigation application 104 can present recommended routes based on the user-specified route parameters and present navigation instructions for a route selected by the user.

To present the various types of maps and/or map data described above, the navigation application 104 can obtain map data from a map server. The navigation application 104 can then process the map data received from the map server to generate the graphical user interfaces presented on the display of the user device 102. For example, the navigation application 104 can obtain the map data from the map server 122 running on a server device 120 through the network 130 (e.g., a local area network, wide area network, wireless network, cellular data network, the Internet, etc.).

In some examples, the system 100 can include the server device 120. For example, the server device 120 can be a computing device configured to host the map server 122. The map server 122 can be a software server, or collection of software servers, configured to generate map data, maps, routing data, and/or routes for client devices (e.g., the user device 102) and/or client applications (e.g., the navigation application 104), along with maintaining, processing, or otherwise adjusting map data.

In some examples, the map server 122 can obtain map data from various map data vendors. For example, different map data vendors may specialize in different types of map data. For example, various different map vendors may specialize in and/or provide high quality terrain elevation data, marine elevation data, climate data, and/or land cover data, etc. Thus, the map server 122 may obtain different types of map data from different sources or vendors. The map server 122 can combine the different types of map data received from different map vendors into a combined map data that can be served to the navigation application 104 on the user device 102. The map server 122 may be configured to perform the techniques described herein relating to terrain mesh simplification, anomaly detection and resolution, assignment of gaps/overlaps, and resolution of overlapping polygons.

In some examples, the system 100 can include a server device 140 and/or a server device 150. For example, the server device 140/150 can be a computing device connected to the network 130. The server device 140/150 can be configured to communicate with the server device 120 through the network 130 to deliver vendor map data to the server device 120. For example, the server device 140/150 can include map vendor servers 142/152 (e.g., software servers) that process vendor map data and serve the vendor map data to the map server 122 on the server device 120. The map vendor 152 can, for example, manage and serve terrain elevation map data to the map server 122, while the map vendor 142 may manage and serve land cover data (e.g., vegetation, forest, urban shrubland, etc.) to the map server 122. The map vendor 142 can be associated with a different type of vendor map data than map vendor 152. The map vendor 142 can be associated with the same type of vendor map data as the map vendor 152. The map vendor 142/152 can manage and serve any type of map data, including the various types of map data as may be described herein.

Figure 2:
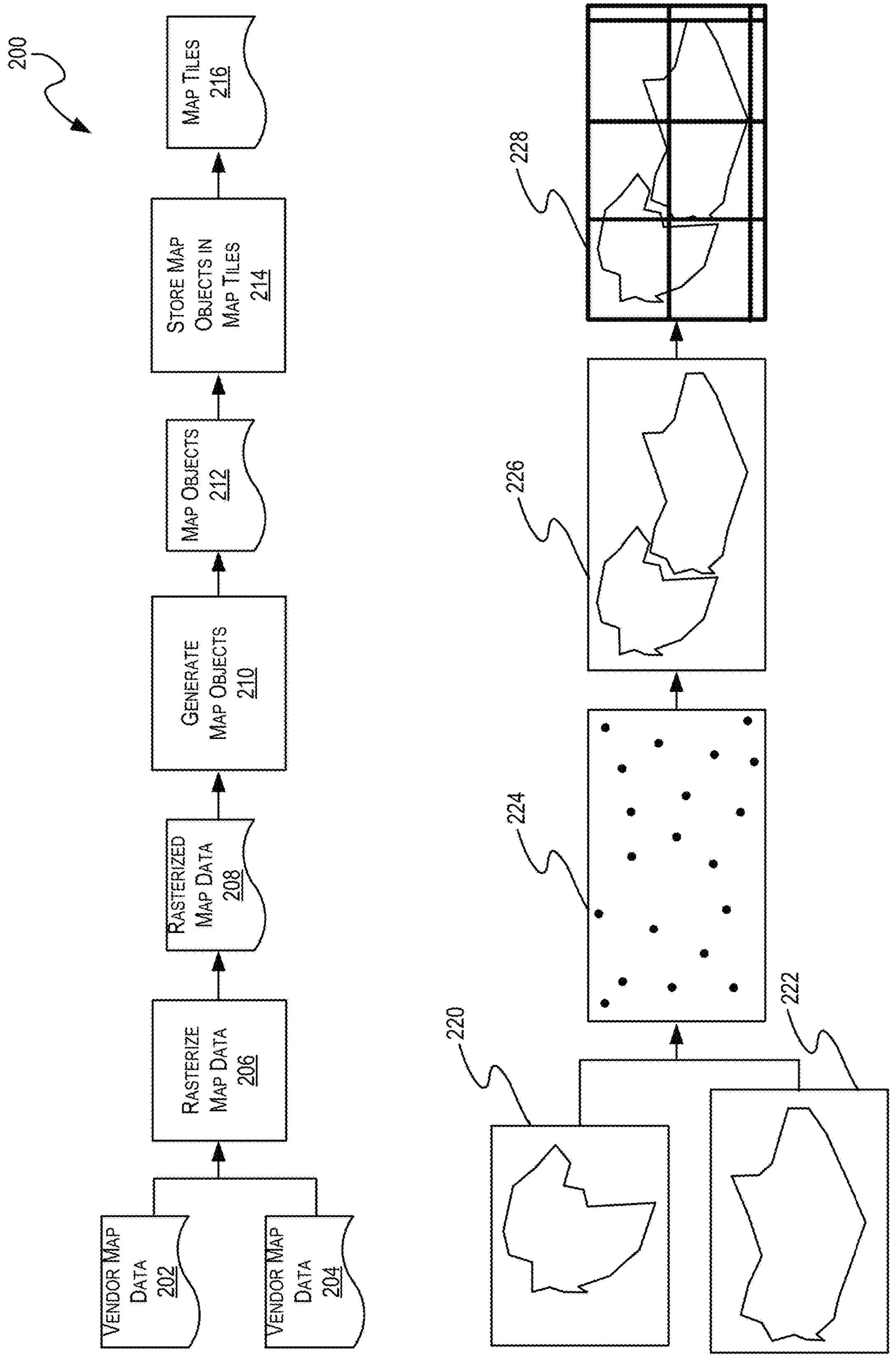
FIG. 2 is an example process for generating geographic descriptive data map tiles from vendor map data obtained from map data vendors, according to at least one example.

FIG. 2 is an example process 200 for generating geographic descriptive data map tiles from vendor map data obtained from map data vendors, according to at least one example. For example, process 200 can be performed by the map server 122 to aggregate map data received from multiple vendors into a combined map data that can be served to client devices. Process 200 provides a high-level overview of how the map server 122 processes vendor map data. Various described techniques that might be implemented and/or performed by the map server 122 during process 200 are described in further detail below.

In some examples, the map server 122 can receive vendor map data 202/204 from various map data vendors. In some cases, the vendor map data can be received as raster data that define raster points (e.g., similar to pixels in an image) where each raster point corresponds to a geographic location (e.g., coordinates) and/or some geographic descriptive data (e.g., rainfall, type of landcover, temperature, etc.) associated with the geographic location. In some cases, vendor map data can be received as vector data that define polygons and/or polylines that define areas associated with geographic descriptive data and/or linear features of a geography. For example, each vertex of a polygon or polyline can correspond to a geographic location and each polygon and/or polyline can be associated with metadata describing attributes of the polygon or polyline. For example, the metadata can indicate that the polygon is associated with a country and defines its boundaries. The metadata can indicate that the polygon is associated with a certain type of climate, or vegetation, etc. The metadata for a polyline can identify a corresponding type of road, river, or other linear map feature.

After receiving the vendor map data 202/204, the map server 122 can rasterize the vendor map data at block 206. For example, if the vendor map data 202/204 is received as raster data, then the map server 122 will not perform block 206. However, in most cases, vendor map data 202/204 will be received as vector data since the vector data requires less data storage and/or transmission. For example, the map server 122 can obtain the polygons (e.g., polygons 220, 222) from the vendor map data 202/204, convert the polygons 220/222 into rasterized data, and combine the rasterized data into rasterized map data 208, as illustrated by raster data 224.

At block 210, the map server 122 can analyze the rasterized map data 208/224 and generate polygons 226 that will be included in the final combined or composite map data that will be delivered to client devices (e.g., the user device 102). During block 210, the map server 122 can adjust and/or correct the polygons and/or polylines generated from the rasterized map data to close gaps between polygons, align polygon borders, and/or perform other map data adjustments necessary to fix errors or anomalies in the map data, as described in detail below. For example, often map data received from different vendors will not properly align when combined or aggregated. Thus, the map server 122 can be configured to find and fix anomalies in the map data to provide an improved appearance when the map data is subsequently presented to a user (e.g., the user of the user device 102).

After generating the map objects 212 from the rasterized map data, the map server 122 can store the map objects 212 in map tiles 216/228 at block 214. For example, the map server 122 can store the map objects (e.g., polygons, polylines, and associated metadata) in map tiles corresponding to a portion of geography. The map tiles can be sized according to a maximum amount of data that each map tile can contain. The map tiles can be sized according to a maximum geographic area that can be covered by a particular map tile. For example, partitioning the combined map data for an area (e.g., the whole earth, a continent, a country, etc.) into smaller map tiles reduces the amount of map data that the map server 122 and/or the user device 102 need to store and/or process at any given time. When the navigation application 104 on the user device 102 needs to present map data, the map server 122 can serve the necessary map tiles to the user device 102 and the user device 102 can rasterize the map data (e.g., polygons, polylines, and associated metadata) in the map tiles to generate images representing the underlying map data.

Simplifying Terrain Meshes

Figure 3:
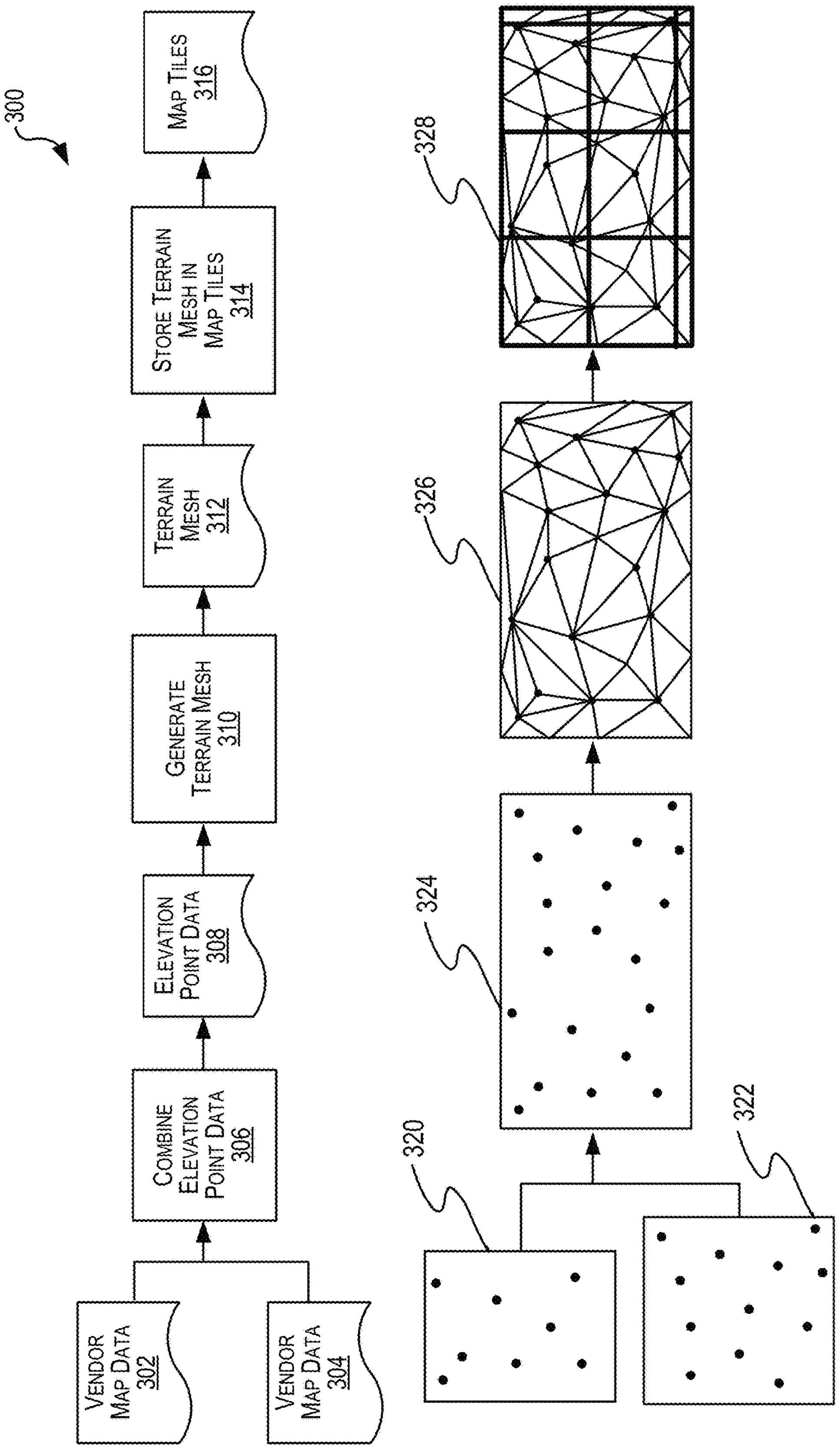
FIG. 3 is an example process for generating elevation mesh map tiles from vendor map data obtained from map data vendors, according to at least one example.

FIG. 3 is an example process 300 for generating elevation mesh map tiles from vendor map data obtained from map data vendors, according to at least one example. For example, process 300 can be performed by the map server 122 to aggregate elevation map data received from multiple vendors into combined map data that can be served to client devices. Process 300 provides a high-level overview of how the map server 122 processes vendor map data. Various error correction processes that might be implemented and/or performed by the map server 122 during process 300 are described in further detail below.

In some examples, the map server 122 can receive vendor map data 302/304 from various map data vendors. In some cases, the vendor map data can be received as raster data that defines raster points (e.g., similar to pixels in an image) where each raster point corresponds to a geographic location (e.g., coordinates) and/or some elevation data (e.g., metadata) associated with the geographic location.

After receiving the vendor map data 302/304, the map server 122 can combine the vendor map data at block 306. For example, the vendor map data 302/304 (raster data 320/322) may correspond to different respective geographic areas. Thus, the map server 122 can combine the vendor map data 302/304 to generate elevation point data 308 (e.g., raster data 324) that covers a greater geographic area (e.g., a country, a continent, the world, etc.). The raster data 324 may include raster data (e.g., equally spaced points). For illustrative purposes, an arbitrary distribution of the raster points is depicted in the raster data 324 (e.g., rather than in a grid of equally spaced points). In some examples, rather than the raster data 324, the techniques may be performed using mesh data (e.g., be formed from mesh vertices that are not equally spaced points).

At block 310, the map server 122 can generate a terrain mesh based on the elevation point data 308. For example, the map server 122 can perform a 2-dimensional (2D) Delaunay triangulation process to generate a 2D triangle mesh that has respective coordinate and elevation (e.g. latitude, longitude, elevation) values for each vertex in the 2D mesh (e.g., also may be referred to as a 2.5D mesh). The 2.5D mesh provides for a simplified representation of 3-dimensional (3D) terrain and can be used for generating 3D images of the terrain on a map.

After generating the terrain mesh 312 (e.g., triangular mesh 326) from elevation point data 308 (e.g., raster data 324), the map server 122 can store the terrain mesh 312 in map tiles 316/328 at block 314. For example, the map server 122 can store portions of the terrain mesh 312 in map tiles corresponding to a portion of geography. The map tiles can be sized according to a maximum amount of data that each map tile can contain. The map tiles can be sized according to a maximum geographic area that can be covered by a particular map tile. For example, partitioning the combined map data for an area (e.g., the whole earth, a continent, a country, etc.) into smaller map tiles reduces the amount of map data that the map server 122 and/or the user device 102 need to store and/or process at any given time. When the navigation application 104 on the user device 102 needs to present map data (e.g., elevation data, a 3D representation of a map, etc.), the map server 122 can serve the necessary map tiles to the user device 102 and the user device 102 can rasterize the 2.5D terrain mesh data in the map tiles to generate images representing the underlying elevation map data.

Figure 4:
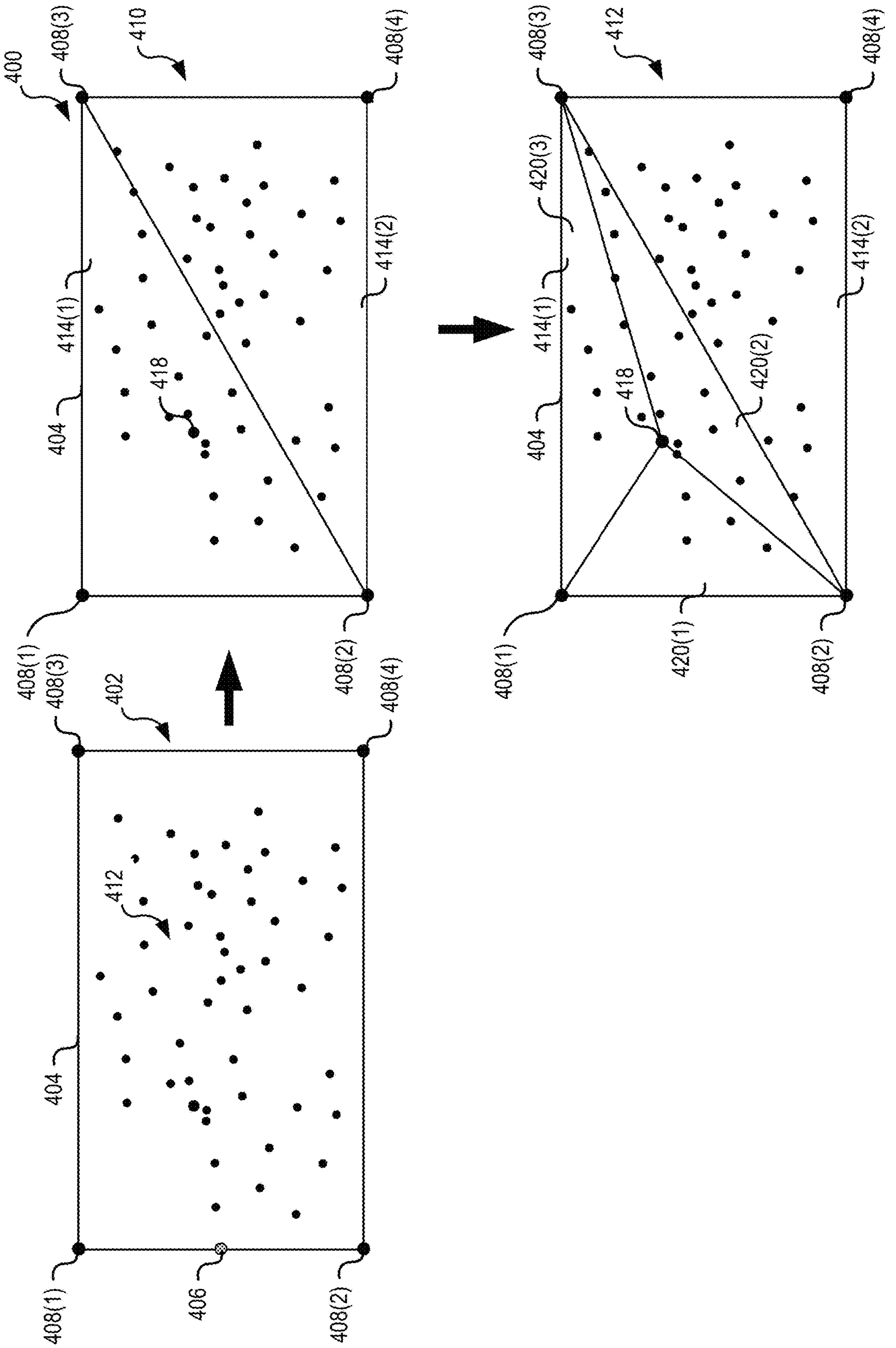
FIG. 4 is an illustration of a process for terrain mesh simplification, according to at least one example.

FIG. 4 is an illustration 400 of a process for terrain mesh simplification, according to at least one example. The illustrated process may be performed by the map server 122. For example, the map server 122 may access the map tiles 328 generated, as described in FIG. 3. The map server 122 may perform the process illustrated in FIG. 4 in parallel, e.g., on terrain meshes in map tiles of a larger terrain mesh.

The illustration 400 includes input terrain mesh 402, which may be generated by the map server 122 accessing a terrain mesh. The input terrain mesh 402 may correspond to a single map tile of a larger terrain mesh. The input terrain mesh 402, which may be formed from a terrain mesh formed from Delaunay triangulation, may include a boundary polygon 404. The input terrain mesh 402 may be generated from any suitable terrain mesh and may have any suitable shape, including a rectangular shape (as shown) and any non-uniform shape corresponding to the terrain mesh. Regardless of the shape, the input terrain mesh 402 may be bounded by a boundary polygon 404. The boundary polygon 404 may be a three-dimensional polygon, or may otherwise retain elevation values for vertices on the boundary polygon 404 that were extracted from the terrain mesh. As part of simplifying the input terrain mesh 402, the map server 122 may process the boundary polygon 404 to remove all collinear vertices such as the collinear vertex 406 that is presently illustrated. Points are collinear if three or more lie in a single straight line. When collinear points are detected, the map server 122 may remove the point(s) (e.g., 406) that lie between the two furthest points (e.g., 408(1) and 408(2)). Thus, as illustrated, the boundary polygon 404 includes vertices on the boundary polygon 404, none of which are collinear. The remaining non-boundary vertices from the input terrain mesh form a candidate set of points 412 for further processing.

The map server 122 may take the boundary polygon 404 and compute the 2D Delaunay Triangulation of all vertices 408 from the boundary polygon 404 to generate an initial terrain mesh 410. The initial terrain mesh 410 will be successively refined using points from the candidate set 412 to get a final simplified mesh. As an illustrated example, the map server 122, implementing Delaunay Triangulation, creates triangles 414(1) and 414(2). Each point of the candidate set of points 412 is disposed within one of the two triangles 414.

For each triangle 414(1) and 414(2), the map server 122 computes its candidate point, which is the point in the candidate set 412 that is contained in the respective triangle 414 and has a maximum vertical error for the respective triangle 414. For example, as illustrated in terrain mesh 416 and the input terrain mesh 402, a candidate point 418 in the triangle 414(1) has been identified. The maximum vertical error means that, of all of the points 412 in the triangle 414(1), the candidate point 418 has the largest vertical difference as compared to the input mesh.

The map server 122 may also determine a candidate point for the triangle 414(2). The map server 122 may construct a Fibonacci maxheap that stores each triangle 414 keyed by the vertical error of its candidate point. The maxheap may ensure that the maximum value element can be accessed and removed in constant time, e.g., without having to recompute these values each time the mesh is updated during the simplification process. While the top node in the heap has vertical error greater than a maximum elevation threshold, the map server 122 may perform various functions. For example, the map server 122 may remove the top node which consists of the triangle 414(1) and the candidate point 418.

The map server 122 may then add the candidate point 418 to the triangulation, which, as shown in the candidate set 412, results in triangulation based on the candidate point 418 and divides the triangle 414(1) into a new set of triangles 420. The process described herein is repeated for the triangle 414(2) and for the triangles 420, which can include dividing these triangles into smaller triangles until the condition relating to the maximum elevation threshold is met. In particular, this may include iteratively performing this process until a vertical error is less than or equal to the threshold. In some examples, a smaller threshold value may result in a mesh that more closely approximates the initial mesh, while a larger threshold value may result in a mesh less like the initial mesh. In some examples, selection of the threshold value may impact the resultant size of the final mesh, especially how it relates to the initial mesh. In some examples, the threshold value may be any suitable value, e.g., less than 1 meter, between 1 and 5 meters, more than 5 meters, and/or any other suitable value. The mesh corresponding to the candidate set 412 is not a final mesh, but may be referred to as an intermediate mesh.

In some examples, certain post-processing operations may be performed on the intermediate mesh 410, a final mesh, or any other mesh generated by the map server 122 in accordance with the techniques described herein. For example, an edge swap operation may be performed to improve the mesh. When points are selected from the candidate set 412, the map server 122 may insert them into the mesh using Delaunay Triangulation, as described herein. This approach may take into account the X and Y coordinates, but may not account for the Z coordinate. If the terrain represents a sharp ridge/valley, the edges induced by a Delaunay Triangulation in 2D may distort the ridge or valley.

To address this distortion, the map server 122 may iterate through each edge in the simplified mesh (e.g., final mesh) and compute the volume induced by the two triangles that share that edge. If the computed volume is significantly different from that of the volume induced by the triangles present in the input mesh in the same X and Y coordinates, then that edge is "swapped." For example, if the edge was between points C and D, which defined triangle CAB and triangle CDB, the edge may be swapped to extend between A and D to define triangles ACD and ABD.

An additional post-processing technique may include the map server 122 iterating through each point of the simplified mesh, and checking if the removal of that point would result in significant mesh quality degradation. In some examples, a cost function may be used. The cost function may correspond to volume displacement. For example, the algorithm may check the volume of a cone generated by the faces formed by the edges incident on the point of interest. If the point is part of a relatively flat "patch," the removal of the point would not cause any noticeable change and thus can be removed. Once a point is selected for removal, the entire patch (e.g., the faces of the mesh that had the point as one of the mesh's vertices) is re-triangulated.

FIGS. 5, 8, 14, 17, 22, and 26 illustrate example flow diagrams showing processes 500, 800, 1400, 1700, 2200, and 2600, according to at least a few examples. These processes, and any other processes described herein, are illustrated as logical flow diagrams, each operation of which represents a sequence of operations that can be implemented in hardware, computer instructions, or a combination thereof. In the context of computer instructions, the operations may represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, some, any, or all of the processes described herein may be performed under the control of one or more computer systems configured with specific executable instructions and may be implemented as code (e.g., executable instructions, one or more computer programs, or one or more applications) executing collectively on one or more processors, by hardware, or combinations thereof. As noted above, the code may be stored on a non-transitory computer-readable storage medium, for example, in the form of a computer program including a plurality of instructions executable by one or more processors.

Figure 5:
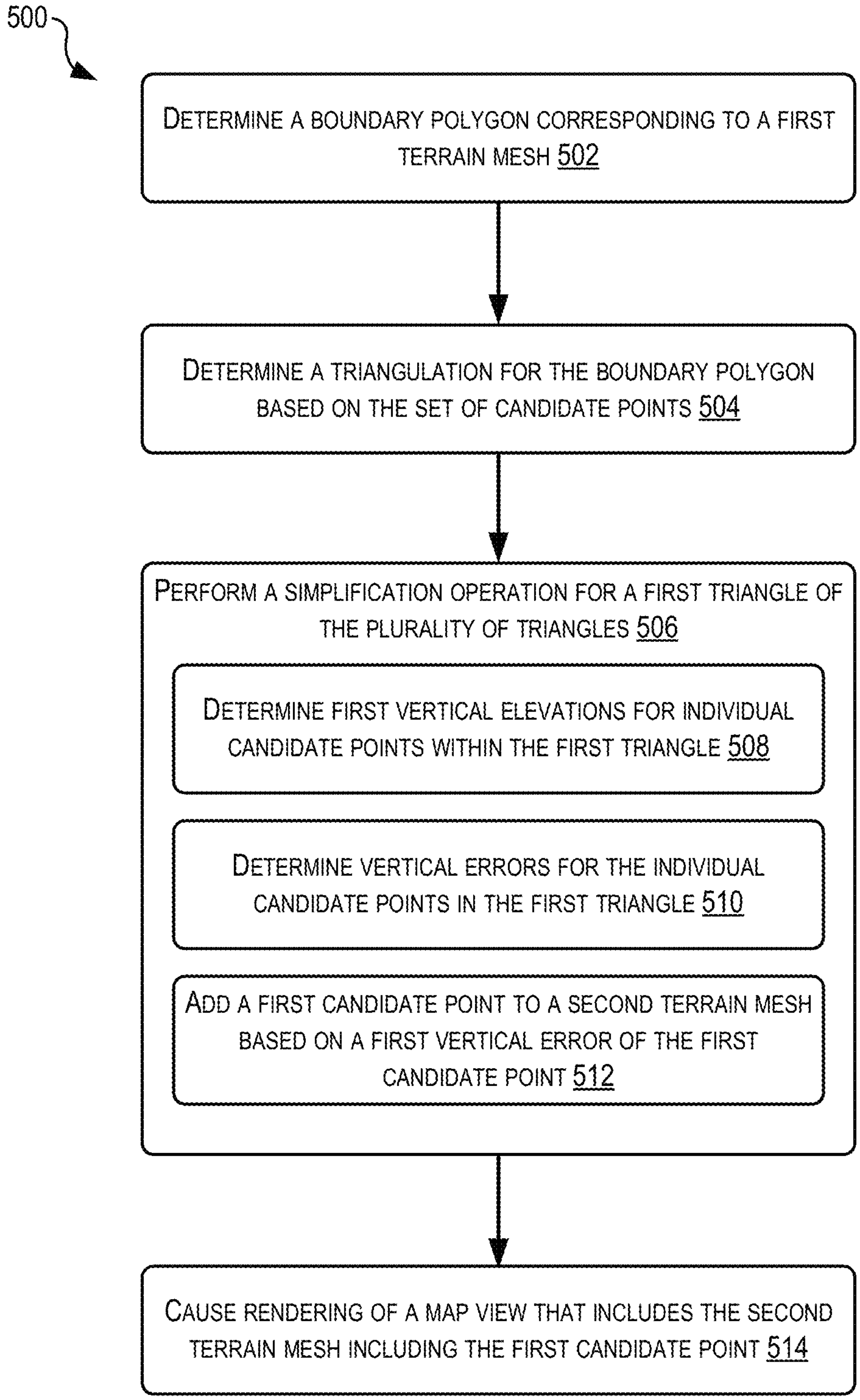
FIG. 5 is a diagram showing a flow chart corresponding to an example process for terrain mesh simplification, according to at least one example.

FIG. 5 is a diagram showing a flow chart corresponding to an example process 500 for terrain mesh simplification, according to at least one example. The process 500 may be implemented by the element(s) of the system 100, and the map server 122 in particular. The process 500 may result in one or more technical improvements including, for example, generation of simplified terrain mesh that may result in a smaller file size and may require fewer network resources for transfer and fewer processing resources for providing and displaying at run-time.

The process 500 begins at block 502 by the map server 122 determining a boundary polygon corresponding to a first terrain mesh. The boundary polygon may include a set of candidate points that excludes any collinear points. In some examples, the map server 122 may remove the collinear points.

At block 504, the process 500 includes the map server 122 determining a triangulation for the boundary polygon based on the set of candidate points. The triangulation may define a plurality of triangles within the boundary polygon. The triangulation may be performed using Delaunay triangulation. The set of candidate points may include a set of vertices on the boundary polygon and also may include points that are located within the plurality of triangles. The set of candidate points may be derived from the first terrain mesh, e.g., represent X and Y coordinates of mesh points. In some examples, the set of candidate points may include a set of vertices on the boundary polygon, with individual candidate points within the first triangle including a subset of the set of vertices.

At block 506, the process 500 includes the map server 122 performing a simplification operation for a first triangle of the plurality of triangles. Performing the simplification operation may include, for example at block 508, determining first vertical elevations for individual candidate points within the first triangle. This may include using the first triangle to determine the vertical elevations of the individual candidate points.

Performing the simplification operation may also include, for example at block 510, determining vertical errors for the individual candidate points in the first triangle. This may include comparing the first vertical elevations determined at block 508 with corresponding second vertical elevations obtained from the first terrain mesh. These second vertical elevations may represent the ground truth elevations for the first terrain mesh.

Performing the simplification operation may also include, for example at block 512, adding a first candidate point to a second terrain mesh based on a first vertical error of the first candidate point. The second terrain mesh may be a first iteration of a final simplified mesh. Adding the first candidate point may include defining the first candidate point as a point in the second terrain mesh. Adding the first candidate point based on the first vertical error of the first candidate point may include picking the candidate point from among other candidate points in the first triangle that has a maximum vertical error. In some examples, the first vertical error may include a maximum vertical error among the vertical errors. In some examples, adding the first candidate point to the second terrain mesh may include adding using Delaunay Triangulation.

At block 514, the process 500 includes the map server 122 causing rendering, on a display, of a map view that includes the second terrain mesh including the first candidate point. This may include providing the second terrain mesh to a user device (e.g., the user device 102) in response to a request from the navigation application 104 or other application on the user device 102.

In some examples, the process 500 may further include, while a vertical error of any candidate point within the plurality of triangles is greater than a vertical error threshold, iteratively: adding candidate points to individual triangles of the plurality of triangles, updating vertical errors for candidate points within the individual triangles of the plurality of triangles, and determining new triangles based on the candidate points within the individual triangles. Thus, while the process 500 is described with respect to the performing the simplification operation for the first triangle, the operation may be iteratively performed for the second triangle, then for other smaller triangles within the first triangle and the second triangle, and so on and so forth until the vertical error of any candidate point falls below the vertical error threshold.

In some examples, the process 500 may further include iteratively performing the simplification operation for each triangle of the plurality of triangles. In some examples, the simplification operation may further include determining an updated triangulation for the first triangle based on the first candidate point. The updated triangulation may define a plurality of updated triangles within the first triangle. In some examples, the process 500 may further include iteratively performing the simplification operation for each updated triangle of the plurality of updated triangles.

In some examples, the process 500 may further include determining a composite vertical error for the first triangle based on the vertical errors, and ceasing performing of the simplification operation based on a comparison of the composite vertical error with a vertical error threshold. In some examples, the vertical error threshold may include a predefined value that represents a maximum allowable elevation difference between the first terrain mesh and the second terrain mesh.

In some examples, the first terrain mesh may include a first set of triangles and the second terrain mesh comprises a second set of triangles that includes fewer triangles than the first set of triangles. In some examples, the first terrain mesh may occupy more memory than the second terrain mesh (e.g., when stored in memory of the map server 122).

In some examples, the process 500 may further include performing a post-processing action that includes edge swapping. The post-processing action may include iteratively determining edge swapping by at least identifying, from the second terrain mesh, a plurality of edges. Individual edges of the plurality of edges may be shared among two triangles of the second terrain mesh. The post-processing action may also include iteratively determining edge swapping by at least, for each individual edge, computing a first volume of the two triangles that share the respective edge. The post-processing action may also include iteratively determining edge swapping by at least, for each first computed volume, comparing the first computing volume with a second volume of triangles from first terrain mesh that are located at the same coordinates as the two triangles. The post-processing action may also include iteratively determining edge swapping by at least swapping individual edges between vertices of the two triangles based on the comparing. The post-processing action may also include iteratively determining edge swapping by at least updating the second terrain mesh with triangles having swapped edges.

In some examples, the process 500 may further include performing a post-processing action that includes removing certain points. The post-processing action may include iteratively evaluating points in the second terrain mesh by at least selecting a first point of the second terrain mesh. The post-processing action may also include iteratively evaluating points in the second terrain mesh by at least computing a volume of a cone generated by a patch comprising faces formed by edges incident the first point. The post-processing action may also include iteratively evaluating points in the second terrain mesh by at least removing the first point from the second terrain mesh based on the volume. The post-processing action may also include iteratively evaluating points in the second terrain mesh by at least recomputing triangles for the patch without the first point. The post-processing action may also include iteratively evaluating points in the second terrain mesh by at least updating the second terrain mesh based on the recomputed triangles.

Elevation Anomalies and Interpolation

Figure 6:
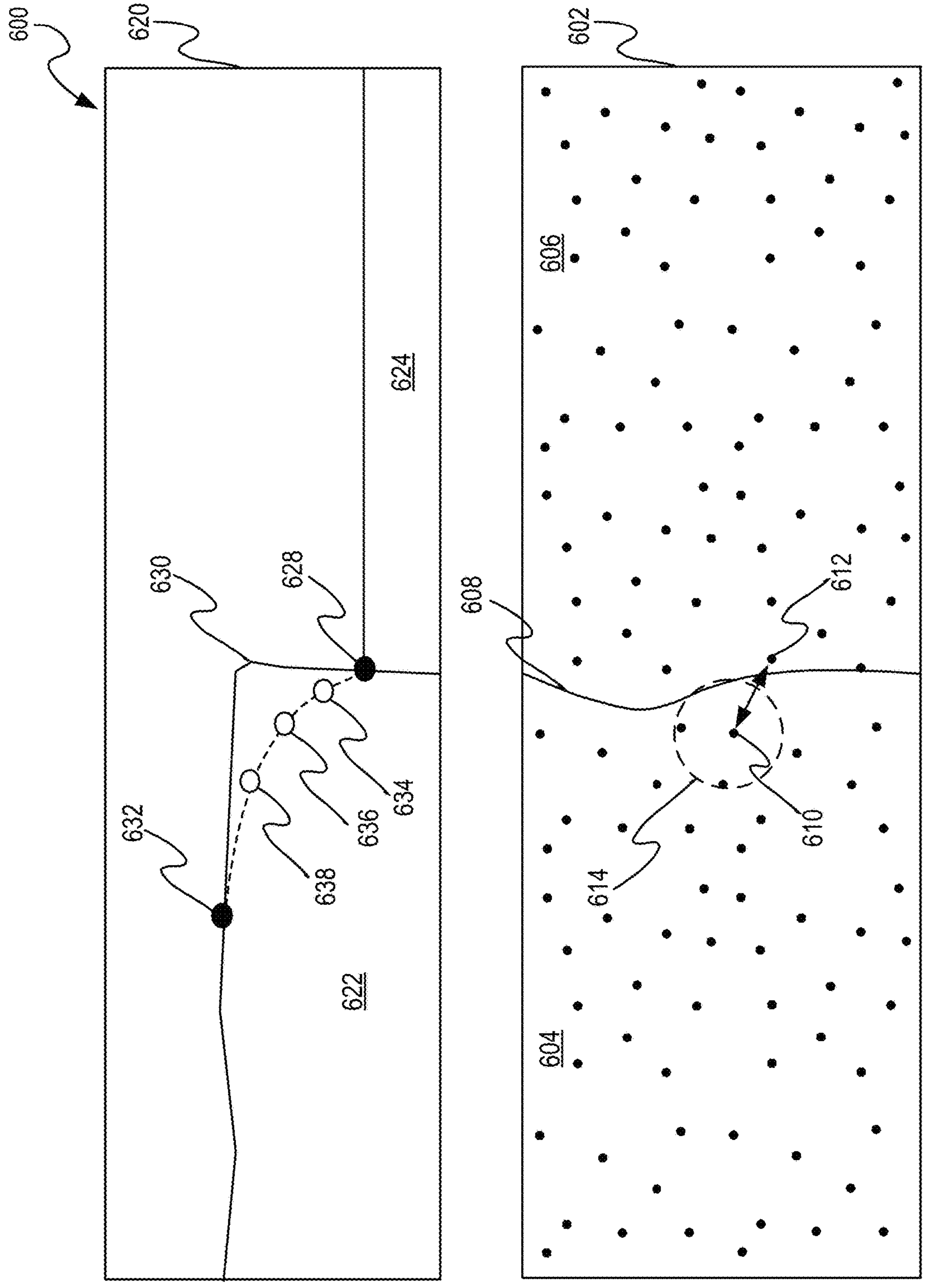
FIG. 6 is an illustration of a process for fixing coastal elevation anomalies, according to at least one example.

FIG. 6 is an illustration 600 of a process for fixing coastal elevation anomalies, according to at least one example. For example, when the map server 122 combines elevation data from different sources (e.g., different elevation map vendors), the elevation from one source may not match the elevation data from another source. For example, there may be discrepancies where the elevation map data from different sources is stitched together. If the map server 122 serves this elevation map data to a client device (e.g., the user device 102) and the client device renders an elevation map based on this combined elevation data, the rendered map may include visible anomalies (e.g., artificial cliffs) corresponding to the elevation discrepancies.

An example of this is when the map server 122 receives dry land terrain data from one source and bathymetry or water elevation data from another source. In some examples, the map server 122 can detect the elevation anomalies (e.g., large elevation differences) in the combined elevation map data and smooth the transition from a higher elevation location to a lower elevation location to remove the appearance of the artificial cliffs that might otherwise be visible when the anomalous elevation map data is rendered and presented by the client device.

The illustration 600 includes an example of rasterized elevation map data 602. Map data 602 can be generated by the map server 122 by combining dry land elevation data 604 with adjacent water elevation data 606. The elevation data 604 and the elevation data 606 may have been obtained from different map data sources (e.g., map vendors) so elevation discrepancies may exist where the elevation data 604 and the elevation data 606 were joined at line 608. The map data 602 may include raster data (e.g., equally spaced points). For illustrative purposes, an arbitrary distribution of the raster points is depicted in the map data 602 (e.g., rather than in a grid of equally spaced points). In some examples, the map data 602 may include mesh data (e.g., be formed from mesh vertices that are not equally spaced points). In some examples, the line 608 defines a joined region and the map server 122 look for elevation anomalies along the line 608. In some examples, the joined region may include an area that overlaps at least some of the elevation data 604 and at least some of the elevation data 606. For example, the line 608 may be a centerline and boundaries of a joined region may be lines that are offset from the line 608 respectively into the two elevation data 604 and 606. The line 608 may correspond to a polyline or polygon that defines a coastline, which may, in some examples, function as the source of truth for where the water meets the land.

In some examples, the map server 122 can identify elevation anomalies in combined elevation map data. For example, the map server 122 can analyze raster points in the rasterized elevation data 602 (e.g., raster data 324) to identify anomalous raster points. An anomalous raster point can be identified by comparing the elevations of neighboring raster points, which, in some examples, may be referred to as buffer points. If the elevation difference between neighboring raster points (e.g., raster point 610, raster point 612) is greater than a threshold elevation distance, then the map server 122 can determine that the neighboring raster points are anomalous raster points.

In some examples, the map server 122 can merge anomalous raster points. For example, to reduce the number of anomalous raster points that the map server 122 needs to process, the map server 122 can merge anomalous raster points that are within a threshold distance of each other (e.g., a buffer criterion). To do so, the map server 122 can create a buffer 614 a distance (e.g., 100 m, 75 m, 50 m) around an anomalous raster point. The map server 122 can then combine all of the anomalous raster points that fall within the buffer 614 (e.g., buffer points) into a single geometry (e.g., polygon) representing the anomalies. This merging process can be performed on each anomalous raster point to reduce the total number of anomalies that need to be processed by the map server 122.

The illustration 600 includes an example illustration 620 depicting smoothing anomalous elevation data. For example, the illustration 620 represents dry land elevation data 622 (e.g., corresponding to raster data 604) and water elevation data 624 (e.g., corresponding to raster data 606). In the real world the land elevation at the water's edge should be about the same as the elevation of the water. However, the land elevation data and the water elevation data from the different elevation data sources do not match and have, therefore, created an artificial cliff 630.

In some examples, the map server 122 can smooth the artificial cliff created by anomalous elevation data by applying a smoothing function to connect elevation points generated by the map server 122. For example, for every anomalous raster point (e.g., merged anomalous raster point, anomalous polygon), the map server 122 can calculate the distance from all anomalies in a small area (e.g., 100 m radius) around the anomalous raster point. For example, the map server 122 can calculate the distance between anomalous raster point 628 and anomalous raster point 632. In some examples, this may be referred to as the interpoint distances between the buffer points, which include anomalous points. Based on the distance between each anomaly (e.g., raster point 628, raster point 632), the map server 122 can calculate a reduction factor (e.g., RF) for gradually reducing the high elevation anomalous raster point (e.g., raster point 632) down to the neighboring low elevation anomalous raster point (e.g., raster point 628). For example, if the distance between raster point 628 and raster point 632 is 100 m, the map server 122 can generate 10 intermediate points at 10 m intervals between raster point 628 and raster point 632 and the reduce factor can be set to 10.

Using the elevation of raster point 632 as the maximum elevation (ME), the map server 122 can calculate an elevation for each of the intermediate points by dividing the maximum elevation by the reduction factor decrementing the reduction factor for each intermediate point between raster point 628 and raster point 632. For example, starting from anomalous raster point 628, the elevation for the first intermediate point 634 can be calculated as maximum elevation (e.g., the elevation of raster point 632) divided by the reduction factor (e.g., RF=10). The next intermediate point 636 can be calculated as maximum elevation divided by the reduction factor minus one (e.g., ME/(RF−1)). The next intermediate point 636 can be calculated as maximum elevation divided by the reduction factor minus two (e.g., ME/(RF−2)) and so on until the reduction factor equals one at raster point 632. The map server 122 can connect anomalous raster points 628, 632 and intermediate raster points 634, 636, 638 using a smoothing function to create a natural looking slope down from raster point 632 to raster point 628 (e.g., cosine, linear, logistics, semi-logistics, and/or any other suitable smoothing function may be implemented). This process described with respect to FIG. 6 can be repeated for the entire length of the line 608 and/or otherwise for the joined region between the two elevation data 604 and 606.

Figure 7:
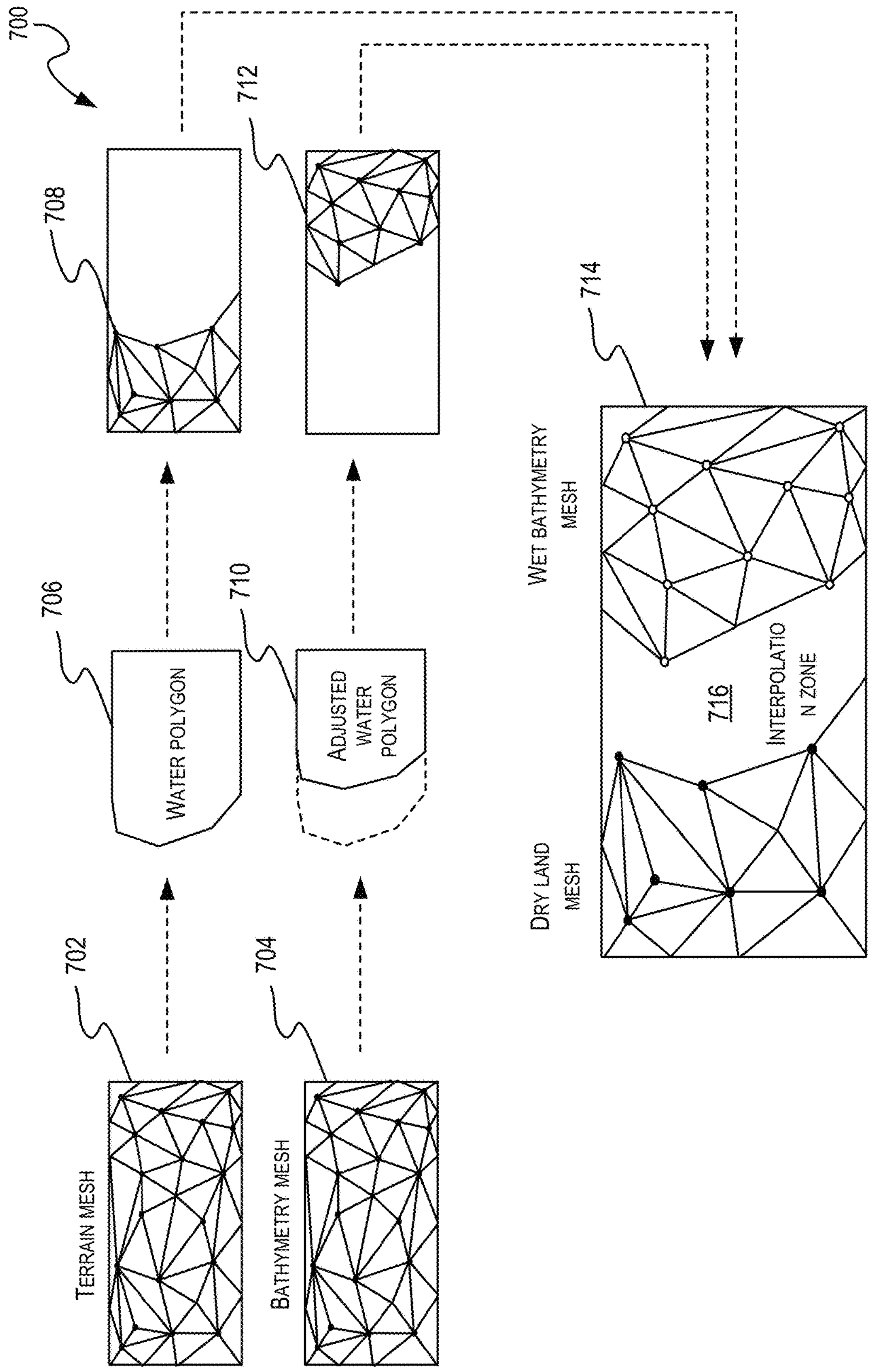
FIG. 7 is an illustration for stitching mixed terrain data obtained from different map data vendors, according to at least one example.

FIG. 7 is an illustration 700 for stitching mixed terrain data obtained from map data vendors, according to at least one example. For example, when dealing with mixed terrain data from different vendors, the map server 122 may need to address mismatches in both resolution as well as significant elevation differences between the terrain data from different sources. When combining the different terrain data into a single terrain, the map server 122 may use an error tolerant process for stitching the different terrain data together so that a terrain map rendered from the combined terrain data blends together smoothly and is visually pleasing to the user.

In some examples, the map server 122 can generate triangulated meshes from source input data (e.g., raster point maps). For example, the map server 122 can combine the terrain data from different sources into a combined terrain mesh. The map server 122 can then copy the combined terrain mesh to generate a triangulated mesh 702 for terrain elevation and a separate triangulated mesh for bathymetry 704.

In some examples, the map server 122 can generate a dry terrain mesh 708. For example, the map server 122 can overlay water polygon data 706 (e.g., representing an ocean, lake) on the terrain mesh 702 to determine which portions of the terrain mesh 702 correspond to water. The map server 122 can remove the water portions of the terrain mesh 702 to generate dry the terrain mesh 708. For example, the map server 122 can remove any sections of the dry portions of the terrain mesh 702 that are within the water polygon data 706.

In some examples, the map server 122 can generate a wet bathymetry mesh 712. For example, the map server 122 can reduce water polygon 706 by some buffer distance (BD) to generate adjusted water polygon 710. For example, the buffer distance can be 5 meters, 10 meters, or 12 meters. The map server 122 can overlay adjusted water polygon data 710 (e.g., representing an ocean, lake) on bathymetry mesh 704 to determine which portions of bathymetry mesh 704 correspond to water. The map server 122 can remove the dry portions of bathymetry mesh 704 to generate bathymetry terrain mesh 712.

In some examples, the map server 122 can fill the gap between the bathymetry terrain mesh 712 and dry terrain mesh 708. For example, because the map server 122 extracted the dry terrain mesh 708 using the full-sized water polygon 706 and extracted the bathymetry terrain mesh 712 with the adjusted water polygon 710, the map server 122 now has two meshes, a dry land mesh and a wet bathymetry mesh, with a gap between them (as represented by adjusted terrain mesh 714). The map server 122 can use the terrain mesh 708, bathymetry mesh 712 and water polygon 706 to fill the gap (e.g., interpolation zone 716) by sampling points and interpolating using a quadratic function, as described below.

In some examples, the map server 122 can repeat (e.g., iterate through) the following blocks N times, where N is the number of intermediate samples to take (e.g., 6 samples, 7 samples, 10 samples, etc.). Block 1: the map server 122 can dissolve the original water polygon by some dissolve amount (DA). For example, DA can equal (BD)*i/(N+1), where 'i' is the iteration index. Block 2: the map server 122 can sample the bathymetry and water surface elevation at a point corresponding to the edge of the water polygon and blend between them with a quadratic function to create a smooth bowl shape. For example, the map server 122 can use the quadratic function (1−BD)^2, where BD is the buffer distance. Block 3: the map server 122 may perform some basic error filtering at this point by discarding obviously bad elevation values. This allows the map server 122 to blend between multiple datasets from different vendors with significant errors between them in a visually appealing way. The quadratic bowl also allows the map server 122 to represent faux bathymetry in certain other areas. In some examples, the blocks may be iterated based on a vector used to represent aspects of the map data.

Figure 8:
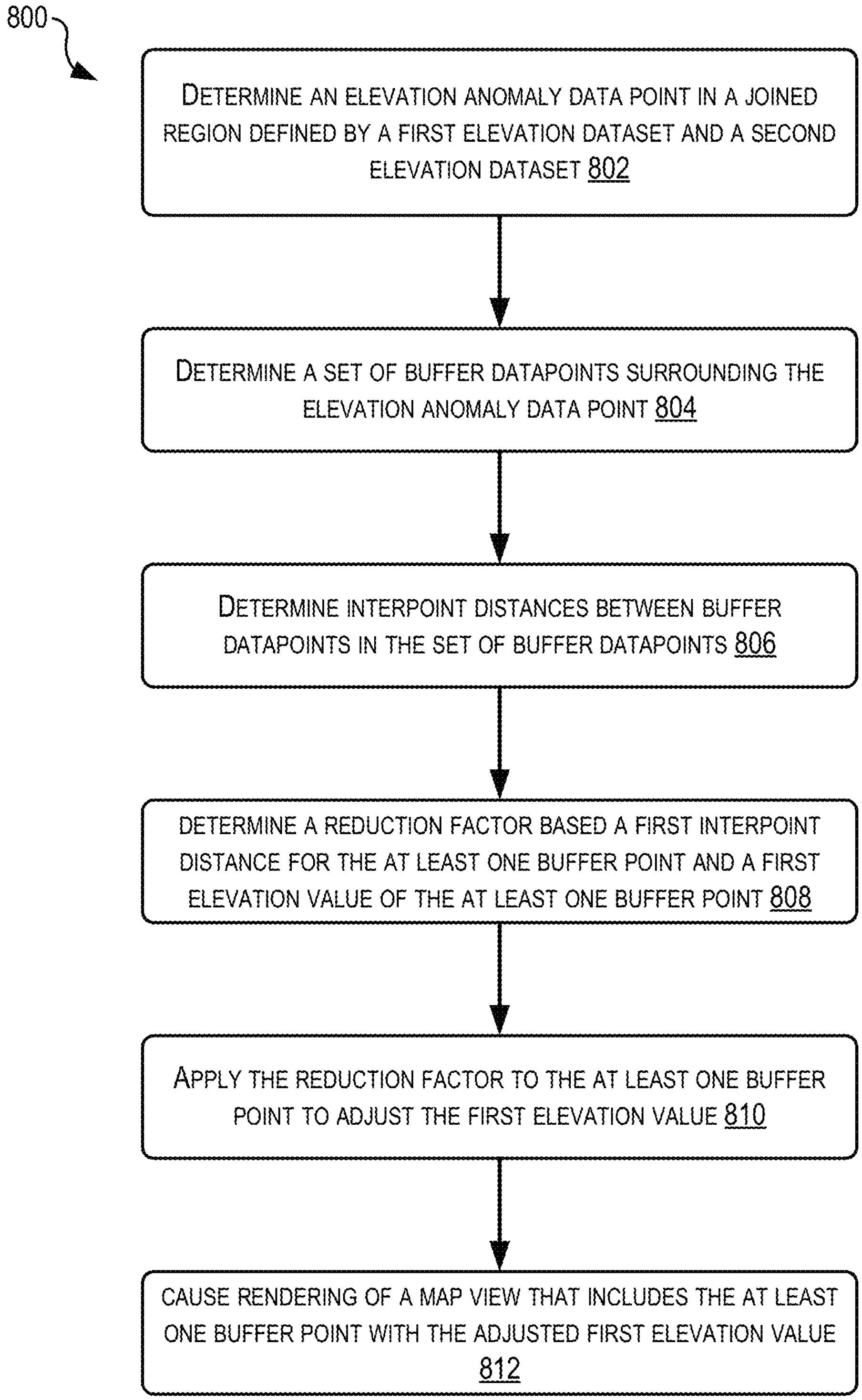
FIG. 8 is a diagram showing a flow chart corresponding to an example process for elevation anomaly detection and rectification, according to at least one example.

FIG. 8 is a diagram showing a flow chart corresponding to an example process 800 for elevation anomaly detection and rectification, according to at least one example. The process 800 may be implemented by the element(s) of the system 100, and the map server 122 in particular. The process 800 may result in one or more technical improvements including, for example, a more aesthetically pleasing map and one that more closely represents actual real-world conditions.

The process 800 begins at block 802 by the map server 122 determining an elevation anomaly data point in a joined region defined by a first elevation dataset and a second elevation dataset. In some examples, the first elevation dataset and the second elevation dataset were joined together using a merge function to define the joined region. In some examples, determining the elevation anomaly data point may be performed in accordance with an elevation criterion. In some examples, the elevation criterion may correspond to a threshold elevation difference between the first elevation dataset and the second elevation dataset. In some examples, the elevation anomaly data point may include a first three-dimensional point on the first elevation dataset that has an elevation value that meets or exceeds the threshold elevation difference as compared to a second three-dimensional point on the second elevation dataset that corresponds to the first three-dimensional point.

The elevation criterion may define how much of an elevation difference between the first elevation dataset and the second elevation dataset is needed to constitute an anomaly. In some examples, the elevation criterion may be a value expressed in any suitable unit. The amount of the value may be configurable and may depend on the elevation datasets. For example, when the anomalies are more severe (e.g., larger differences), the elevation criterion may be larger, but may be smaller for less sever anomalies. For example, the elevation criterion may be 10 meters, 25 meters, 50 meters, 100 meters, less than 10 meters, more than 100 meters, and/or any other suitable amount.

In some examples, the process 800 may further include accessing a polygon dataset that defines a boundary between the first elevation dataset and the second elevation dataset in the joined region. In some examples, the elevation anomaly data point may be defined at a portion of the polygon dataset. For example, the polygon dataset may define the joined region. In some examples, the first elevation dataset may include a land digital elevation model, the second elevation dataset may include a bathymetry dataset, and the polygon dataset may define a coastline.

At block 804, the process 800 includes the map server 122 determining a set of buffer points surrounding the elevation anomaly data point. Determining the set of buffer points may be performed in accordance with a buffer criterion. The buffer criterion may be correspond to a radius surrounding the elevation anomaly data point, which can be used to identify other points surrounding the elevation anomaly data point.

In some examples, the set of buffer points may include a set of elevation anomaly points that include the elevation anomaly data point and at least one other elevation anomaly data point. The value of the buffer criterion may be configurable and may depend on the elevation datasets. For example, when the anomalies are more severe (e.g., larger differences), the buffer criterion may be smaller, but may be larger for less sever anomalies. For example, the buffer criterion may be 10 meters, 25 meters, 50 meters, 100 meters, less than 10 meters, more than 100 meters, and/or any other suitable amount.

At block 806, the process 800 includes the map server 122 determining interpoint distances between buffer point in the set of buffer points. In some examples, the interpoint distances may include computing distances between the set of buffer points and other points outside the set of buffer points.

In some examples, the process 800 may further include merging the set of buffer points into a first geometry representing the set of buffer points. In some examples, the process 800 may further include determining a different set of buffer points surrounding a different elevation anomaly data point, merging the set of buffer points into a second geometry representing the different set of buffer points, determining the interpoint distance comprises determining an interpoint distance between the first geometry and the second geometry.

At block 808, the process 800 includes the map server 122 determining a reduction factor based a first interpoint distance for the at least one buffer point and a first elevation value of the at least one buffer point. In some examples, determining the reduction factor may be performed for at least one buffer point of the set of buffer points.

At block 810, the process 800 includes the map server 122 applying the reduction factor to the at least one buffer point to adjust the first elevation value. In some examples, the reduction factor may include a value that is greater than or equal to one. In this example, applying the reduction factor to the at least one buffer point to adjust the first elevation value may include reducing the first elevation value by the value. The reduction factor may get smaller and smaller as distance from the anomaly data point increases.

In some examples, the process 800 may include applying a different reduction factor to other buffer points to adjust elevation values of the other buffer points based on the reduction factor. In this example, applying the reduction factor and applying the different reduction factor may include applying a cosine smoothing function to at least one buffer point the other buffer points to create a slope between the first elevation dataset and the second elevation dataset surrounding the elevation anomaly data point.

In some examples, the process 800 may further include iteratively applying the reduction factor to other buffer points in the set of buffer points to adjust elevation values of the other buffer points. As noted, this may include adjusting the reduction factor with respect to distance from the anomaly data point. In some examples, iteratively applying the reduction factor to the other buffer points may produce a smooth transition between first elevation values of the first elevation dataset corresponding to elevation anomaly data points and second elevation values of the second elevation dataset corresponding to the set of buffer points.

In some examples, the process 800 may further include iteratively repeating the process 800 for other elevation anomaly data points in the joined region.

At block 812, the process 800 includes the map server 122 causing rendering of a map view that includes the at least one buffer point with the adjusted first elevation value. In some examples, this may include causing rendering on a display of a user device. In some examples, the map view may include a three-dimensional map that includes the at least one buffer point with the adjusted first elevation value. In this example, causing rendering, on the display, of the map view may include providing a portion of the three-dimensional map to a user device for the user device to render the map view on the display of the user device.

Alignment Using Medial Axis

Polygon alignment is the process of taking a set of polygons and aligning the edges of neighboring polygons so that all of the polygons fit together perfectly with no gaps or overlaps. For example, polygons can be used to represent the geometry of lower 48 state in the USA. These polygons should fit together perfectly with no gaps or overlaps. However, misalignments are common, due to different data sources or different methods of digitization.

Figure 9:
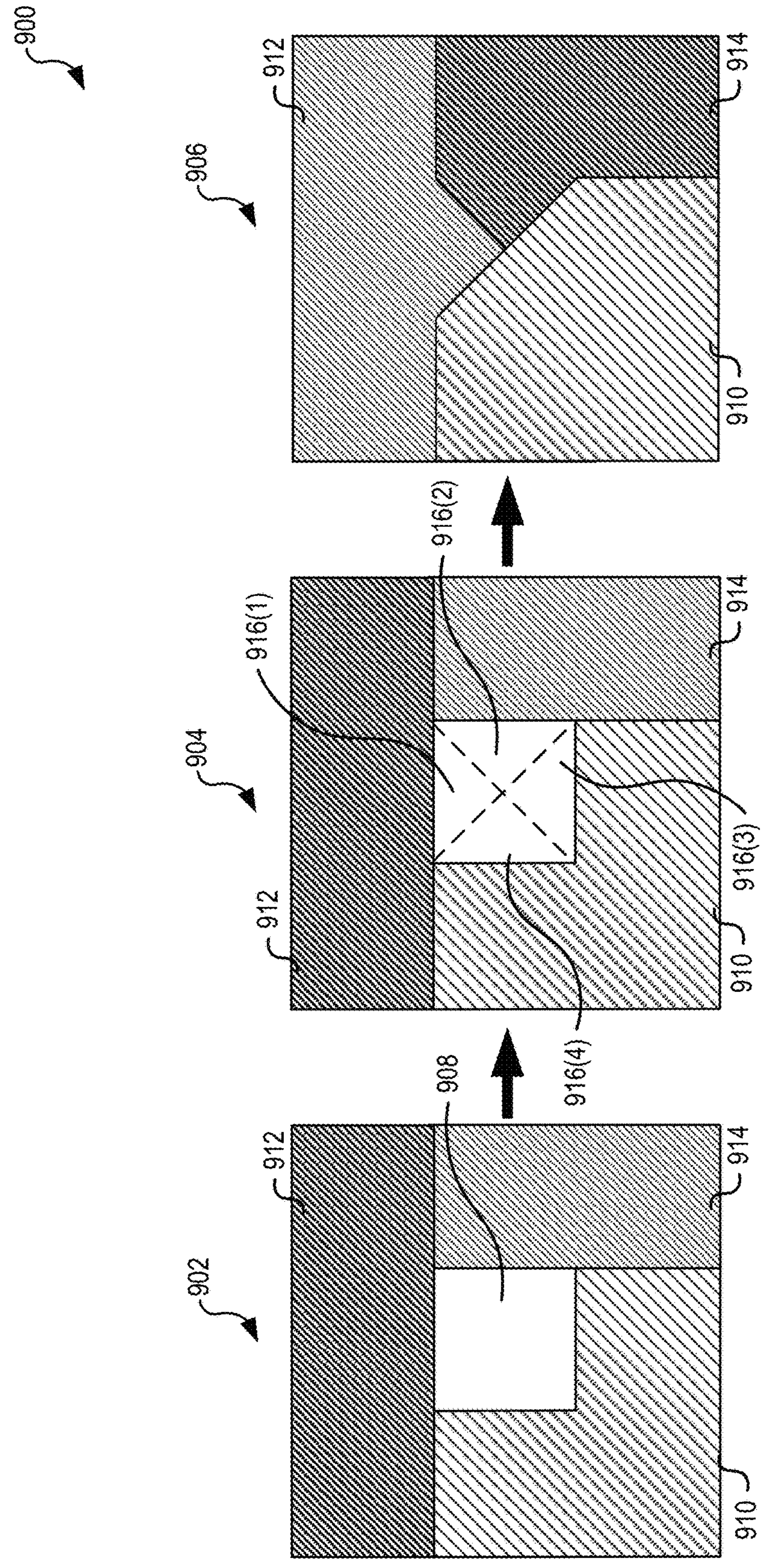
FIG. 9 is an illustration of an example process for aligning a gap defined by multiple polygons using a medial axis, according to at least one example.

FIG. 9 is an illustration 900 of an example process for aligning a gap defined by multiple polygons using a medial axis, according to at least one example. The described process may represent a deterministic algorithm to distribute gaps/overlaps between two or more polygons in a manner that is aesthetically “right” and has the property that every point in the gap/overlap is assigned to the polygon that is closest to it. The illustration 900 in particular illustrates three states 902-906 as they relate distributing a gap 908 formed by three polygons 910, 912, and 914.

As illustrated in the state 902, the gap 908 is a “closed” gap because it is completely bounded, which in this case includes three polygons 910, 912, and 914. A gap may also be bounded by at least two polygons. In some examples, overlaps between two polygons may be treated similar to a gap bounded by two polygons.

As illustrated in the state 904, the map server 122 has divided the gap 908 into four faces 916(1)-916(4) along line segments that define a medial axis. The medial axis of a polygon (e.g., the gap 908 in this example) is defined as the set of all points in the polygon that have more than one closest point on the polygon. So, in this example, the medial axis extends from each vertex of the gap 908 and meets in the middle of the gap 908. This defines the four faces 916(1)-916(4).

The map server 122 may assign each face 916 to one of the adjacent polygons 910, 912, or 914. This may be performed by identifying boundaries between the faces 916 and the polygons 910, 912, and 914. The faces 916 that touch the boundary of the gap 908 are first assigned to the corresponding polygon making up that part of the boundary. For faces 916 that touch multiple boundaries (e.g., multiple polygons), the polygon with the highest length of shared boundary segments is assigned to that face. In this example, the face 916(1) is assigned to the polygon 912, and, as shown in the state 906, the polygon 912 is expanded to incorporate the face 916(1) assigned to it. This process is repeated for all faces 916 until all have been assigned. For example, the face 916(2) is assigned to the polygon 914, and, as shown in the state 906, the polygon 914 is expanded to incorporate the face 916(2) assigned to it. The faces 916(3) and 916(4) are assigned to the polygon 910, and, as shown in the state 906, the polygon 910 is expanded to incorporate the faces 916(3) and 916(4). Thus, the polygons 910-914 shown in the state 906 have been changed to incorporate the faces 916.

Figure 10:
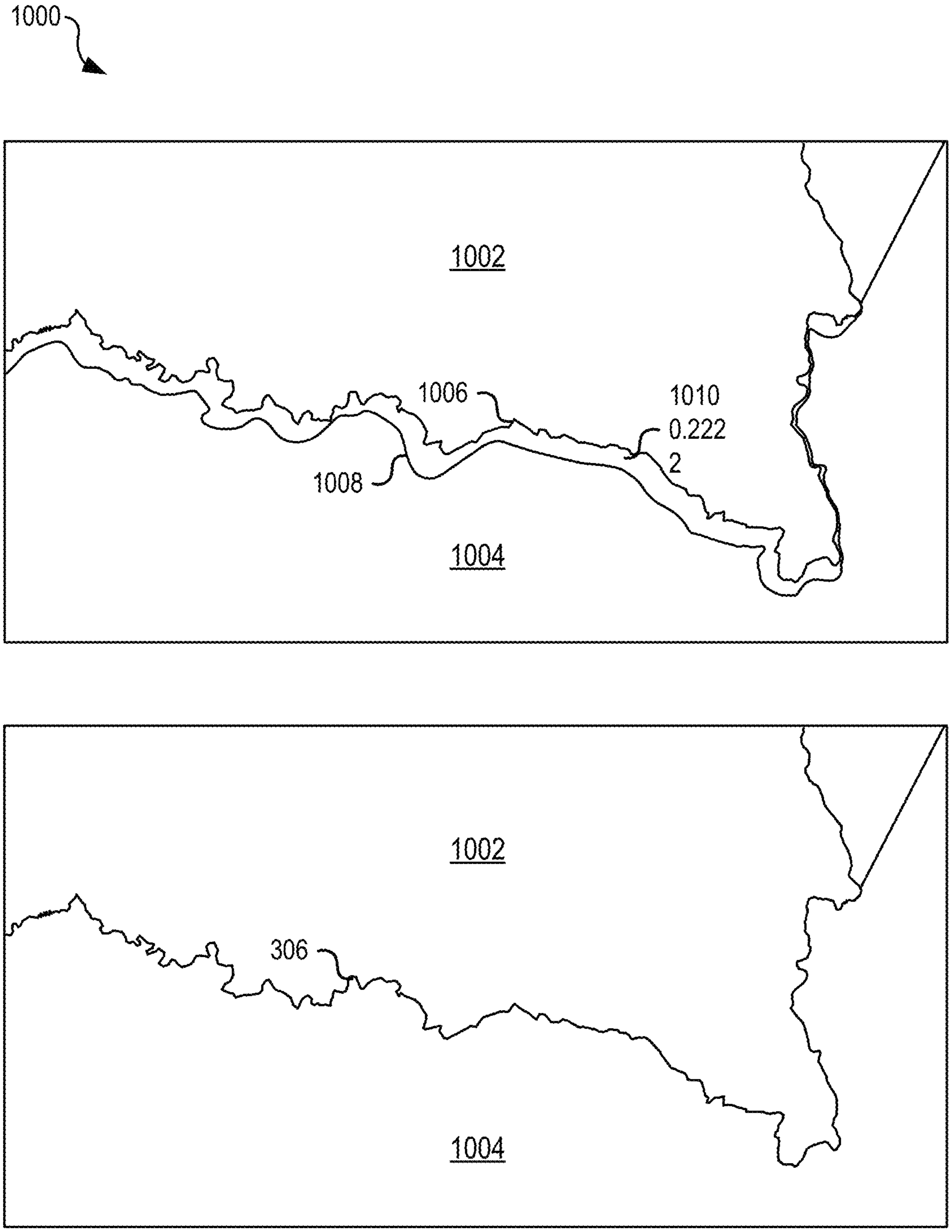
FIG. 10 is an illustration of a process for polygon alignment based on priority, according to at least one example.

FIG. 10 is an illustration 1000 of a process for polygon alignment based on priority, according to at least one example. For example, open gaps between polygons may be closed and/or boundaries of polygons aligned based on a priority assigned to a data source based on the trustworthiness of the data source and/or the precision observed in the data source.

The illustration 1000 depicts polygon 1002 and polygon 1004. For example, these polygons can represent countries and the boundaries 1008 and 1006 of the polygons 1002/1004 can represent borders of the countries that should be aligned. However, the map data for polygon 1002 may come from a different source than the map data for polygon 1004. Thus, overlap 1010 may be apparent when polygons 1102 and 1104 are presented on a map display (e.g., the boundary 1008 of the polygon 1002 extends beyond the boundary 1006 of the polygon 1004). The process can also be applied to a gap between the two polygons 1102 and 1104.

In some examples, the map server 122 can align polygons based on a priority assigned to the source of map data. For example, if map vendor A that provides the map data for polygon 1004 is known to be a higher quality source than map vendor B that provides the map data for polygon 1002, then the map server 122 can be configured with priority data that indicate that map data from map vendor A has a higher priority than map data from map vendor B. The map server 122 can then adjust polygon 1002 provided by low priority map vendor B to share the border of polygon 1002 provided by high quality map vendor A. In this example, the polygon 1004 may have a higher priority because its depiction of the boundary 1006 includes much more detail than the boundary 1008 of the polygon 1002.

In some examples, the map server 122 can align polygons based on a priority determined by the map server 122 based on the precision of the map data. For example, map vendor A may provide map data for polygon 1004 that is very detailed with a high number of vertices. Map vendor B may provide the map data for polygon 1002 that is not very detailed as demonstrated by a low number of vertices. The map server 122 can determine that the map data from map vendor A has a higher priority than map data from map vendor B because polygon 1004 has a higher number of vertices per unit of distance (e.g., 1 mile, 2 miles, 10 miles) than polygon 1002. The map server 122 can then adjust polygon 1002 provided by low priority map vendor B to share the border of polygon 1002 provided by high quality map vendor A, as illustrated in the illustration 1000.

Figure 11:
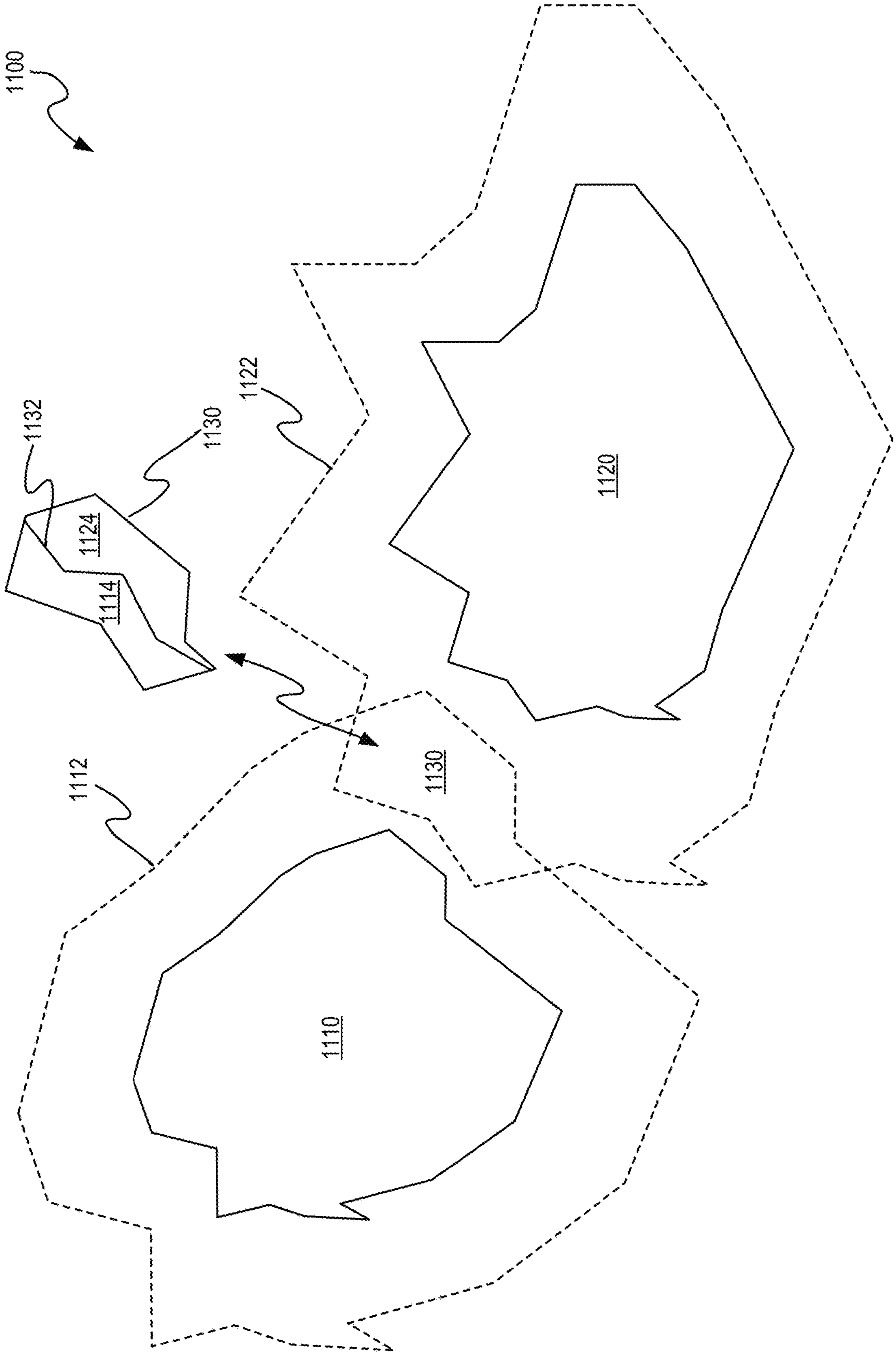
FIG. 11 is an illustration of an example process for aligning overlapping polygons in map data using a medial axis, according to at least one example.

FIG. 11 is an illustration 1100 of an example process for aligning overlapping polygons in map data using a medial axis, according to at least one example. For example, sometimes the map server 122 will receive map data from different vendors that, when combined, cause polygons that should not overlap to overlap.

The illustration 1100 depicts an example of overlapping polygons related to the ownership or jurisdiction of waters surrounding two island countries where the polygons that define the water jurisdictional boundaries overlap. However, the process for aligning overlapping polygons can be applied to polygons defining areas or borders of countries, states, landcover, climate, or any other map data that can be described using polygons.

As depicted by the illustration 1100, two island countries (polygons 1110 and 1120) may have territorial waters (polygons 1112 and 1122) that overlap (polygon 1130). The map server 122 can be configured to allocate portions of the overlap polygon 1130 to the respective countries (polygons 1110 and 1120). The map server 122 can determine a medial axis 1132 of polygon 1130, divide polygon 1130 along medial axis 1123, and assign the portions of polygon 1130 nearest the country polygons 1110 and 1120 to the respective countries. For example, polygon 1124 can be assigned to country polygon 1120 and become a part of territorial waters polygon 1122. Polygon 1114 can be assigned to country polygon 1110 and become a part of territorial waters polygon 1112.

In some examples, the territorial waters may correspond to influence boundaries. An influence boundary may be a buffer of given distance from the shore. Influence boundary may be used by reverse geocoding to identify whether a user is within a territory, even if the user is outside the designated land mass. For example, when taking a photo 20 m off the coast from Barcelona, the photo should be tagged as Barcelona, Spain, not in the ocean. To achieve this functionality, each island has a corresponding influence boundary computed and stored in the tile data that is queried when reverse geocoding needs to be used for tagging pictures. Computing influence boundaries may include applying a buffer around the island polygon geometry by a given distance. The areas 1112 and 1122 may correspond to influence boundaries. In order for reverse geocoding to work correctly, the polygon 1130 may be divided and assigned to the respective areas 1112 and 1122, as described herein.

The medial axis of a polygon is defined as the set of all points in the polygon that have more than one closest point on the polygon boundary. Using the medial axis of a polygon, the map server 122 can "distribute" the overlaps (or gaps) between two or more polygons in a manner that is aesthetically "right" and more importantly, has the property that every point in the gap/overlap is assigned to the polygon that is closest to it.

In some examples, the map server 122 can use the medial axis of overlap polygon 1130 corresponding to an overlap area of overlapping polygons 1112 and 1122 to assign portions of the overlap polygon 1130 to the overlapping polygons 1112/1122. To do so, the map server 122 can compute the line segments comprising the medial axis of the overlap polygon 1130. For example, the line segments may divide the interior of overlap polygon 1130 into faces. For example, in FIG. 11, the medial axis 1132 divides polygon 1132 into 2 polygons 1114 and 1124.

In some examples, the map server 122 can assign each face to one of the polygons 1112 or 1122. For example, the map server 122 can assign the faces that touch the boundary of the overlap polygon 1130 to the corresponding polygon 1112 or polygon 1122 making up that part of the boundary. Each polygon 1112 or 1122 is expanded to incorporate the faces assigned to it. With more complex overlap polygons, some of the faces that were previously in the interior of the overlap polygon will now be touching the expanded boundaries of polygons 1112 and/or 1122. These faces can now be assigned to polygons 1112 and/or 1112 in the same manner until all faces of the overlap polygon are assigned.

In some examples, closed gaps between two polygons can be distributed to adjacent polygons in a similar way as described above for overlapping polygons. For example, since a closed gap between polygons can be represented as polygon similar to an overlap polygon, the medial axis method can applied to fill gaps between polygons in the same manner as described above for overlapping polygons.

In some examples, the map server 122 can distribute a closed gap to three or more adjacent polygons. For example, with map data a gap may exist between three or more polygons (e.g., countries). These multi-gaps can be "filled" in a similar manner as the simple gaps or overlaps described above, with one additional consideration while assigning faces to the adjacent polygons. When there are more than two polygons, a face may be touching more than one adjacent polygon boundary. In this case, the adjacent polygon with the greatest length of shared boundary segments is assigned to that face. For example, a gap polygon may share a boundary with adjacent polygon 'A' and adjacent polygon 'B'. However, if A shares a greater length of the boundary than B, then the face of the gap polygon can be assigned to adjacent polygon A.

In some examples, the map server 122 can distribute an overlap polygon to three or more adjacent polygons. For example, an overlap polygon made from two overlapping polygons can be described as a simple overlap. An overlap polygon made from three or more polygons can be described as a multi-overlap. Overlaps can be defined in terms of degrees. An overlap polygon that is associated with 2 adjacent polygons has a degree of 2. An overlap polygon that is associated with 3 adjacent polygons has a degree of 3. A multi-overlap polygon of degree N is usually surrounded by overlaps of degree N−1 or degree N+1. For example, a degree 4 overlap may be surrounded by degree 3 overlaps, which are otherwise surrounded by degree 2 (simple) overlaps. The most desirable assignment for a multi-overlap is when it is attached to its neighbors. To accomplish this, the map server 122 can assign degree 2 (simple) overlaps first, using the method described above. For degree three multi-overlaps, the map server 122 may analyze the assignments of the surrounding degree 2 overlaps, and use a heuristic to make the assignment. An example of this heuristic can be the ratio of perimeter that has been assigned to each overlapping (e.g., adjacent) polygon. When degree three multi-overlaps are finished, the map server 122 can process degree 4 multi-overlaps, using the assignments of the surrounding degree 3 multi-overlaps. The map server 122 can iterate through all multi-overlaps, increasing in degree, until the faces of all overlap polygons are assigned.

Figure 12:
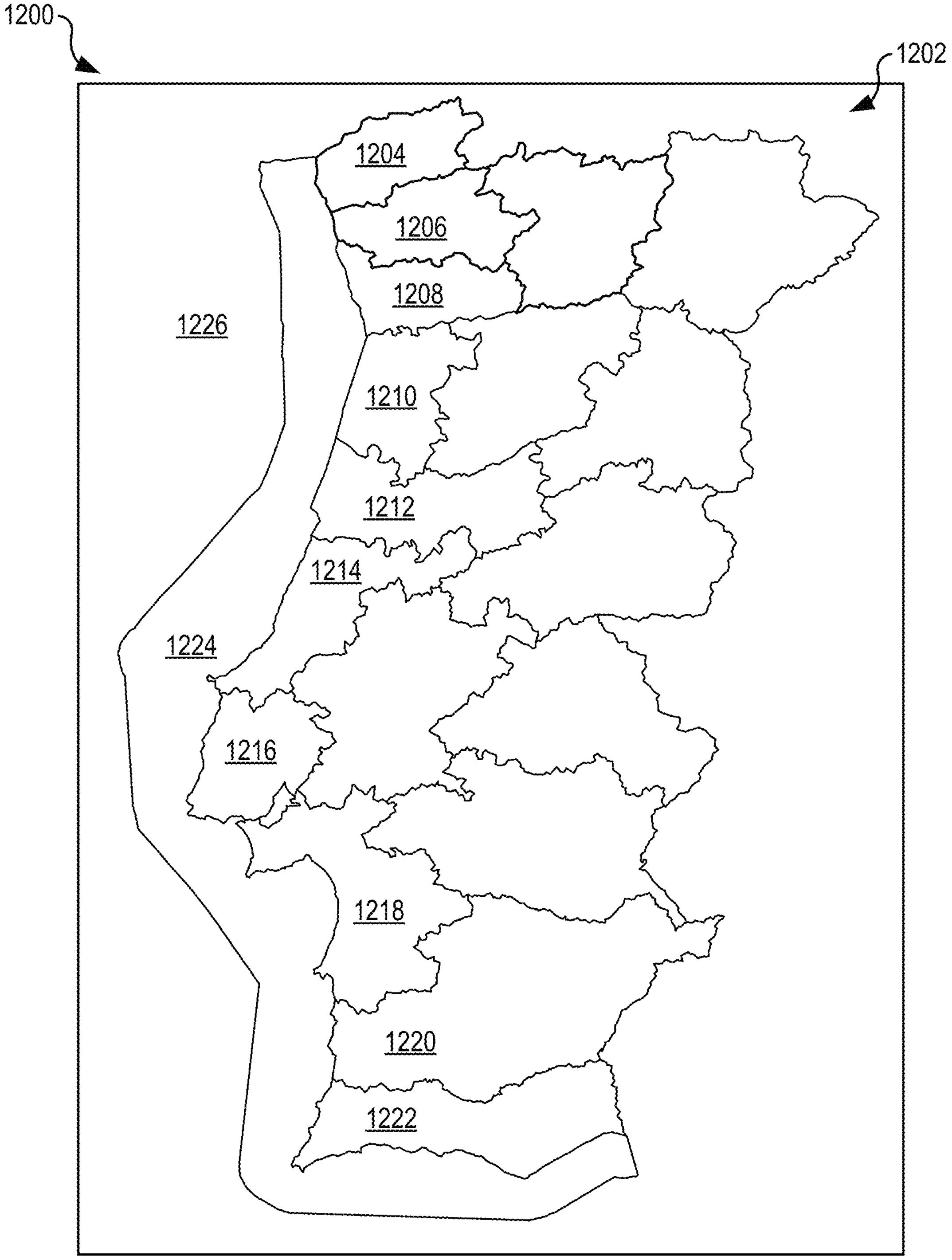
FIG. 12 is an illustration of an example process for aligning overlapping polygons in map data using a medial axis, according to at least one example.
Figure 13:
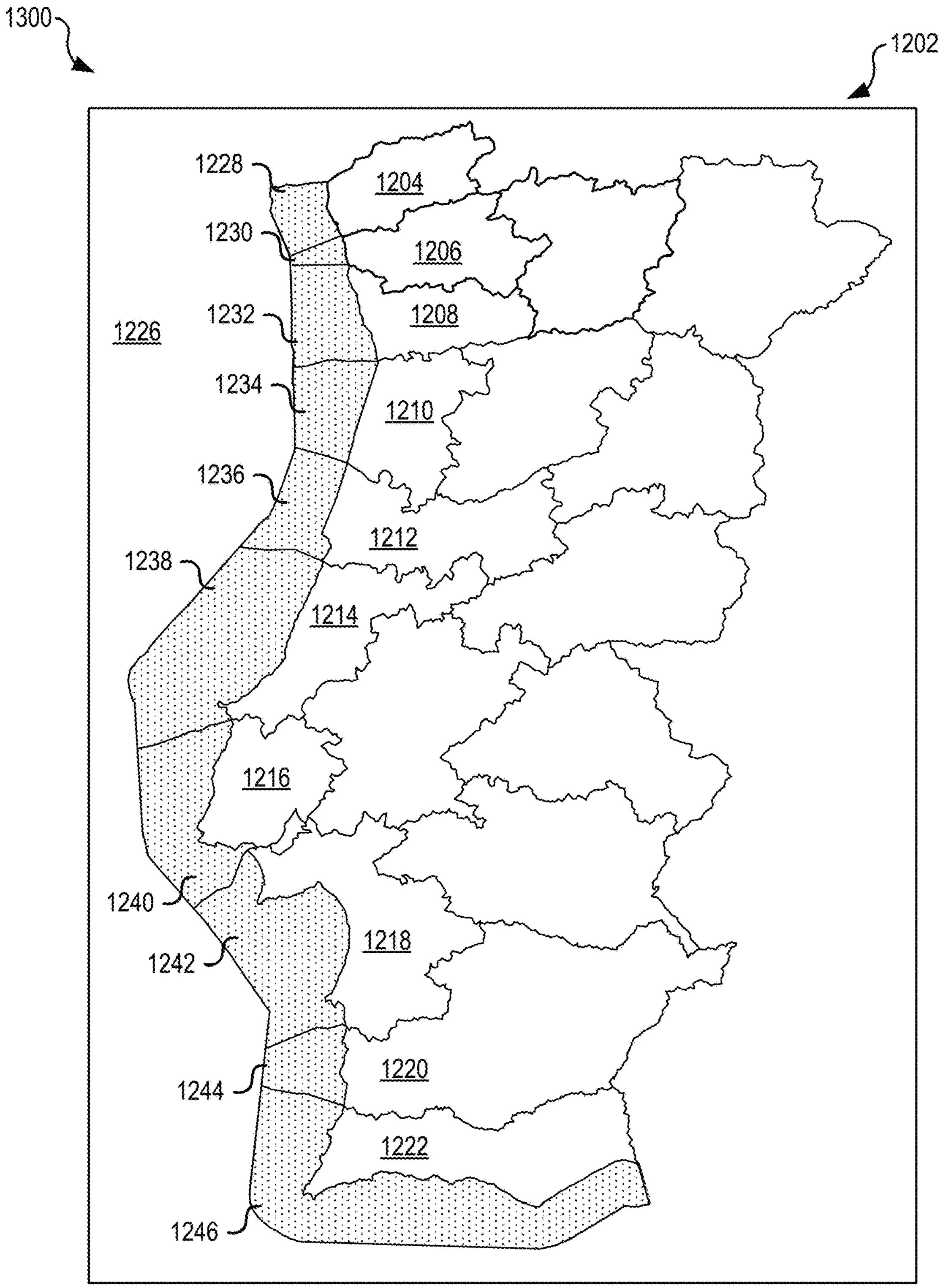
FIG. 13 is an illustration of an example process for aligning overlapping polygons in map data using a medial axis, according to at least one example.

FIGS. 12 and 13 are illustrations 1200 and 1300 of an example process for aligning overlapping polygons in map data using a medial axis, according to various examples. The illustration 1200 in particular depicts a view of a geographic region 1202 before alignment and the illustration 1300 depicts a view of the geographic region 1202 after alignment. The geographic region 1202 may correspond to a region that is adjacent to water. The geographic region 1202 may include a plurality of administrative territory polygons (e.g., of the country Portugal). A few of these administrative territory polygons 1204-1222 are labeled. The illustration 1200 also includes influence boundary polygon 1224 that extends away from the administrative territory polygons 1204-1222. The influence boundary polygon 1224 is bounded by the administrative territory polygons 1204-1222 on one side and a bounding polygon 1226 on the other side. The bounding polygon 1226 may be included such that the influence boundary polygon 1224 is a closed gap.

The techniques described herein may be implemented to assign various portions of the influence boundary polygon 1224 to the adjacent administrative territory polygons 1204-1222, as shown in the illustration 1300. This may be done by aligning the administrative territory polygons 1204-1222 with the influence boundary polygon 1224. The influence boundary polygon 1224 may be designated as a priority polygon, as described with reference to FIG. 10. The alignment between the illustrations 1200 and 1300 may be performed using the medial axis, as described herein. Such an operation may yield a coastline influence boundary subdivision, as depicted in the illustration 1300. Thus, as shown in the illustration 1300, the influence boundary polygon 1224 may be divided to define influence polygons 1228-1246. In this example, the influence polygon 1228 is associated with the administrative territory polygon 1204, the influence polygon 1230 is associated with the administrative territory polygon 1206, the influence polygon 1232 is associated with the administrative territory polygon 1208, the influence polygon 1234 is associated with the administrative territory polygon 1210, the influence polygon 1236 is associated with the administrative territory polygon 1212, the influence polygon 1238 is associated with the administrative territory polygon 1214, the influence polygon 1240 is associated with the administrative territory polygon 1216, the influence polygon 1242 is associated with the administrative territory polygon 1218, the influence polygon 1244 is associated with the administrative territory polygon 1220, and the influence polygon 1246 is associated with the administrative territory polygon 1222.

Figure 14:
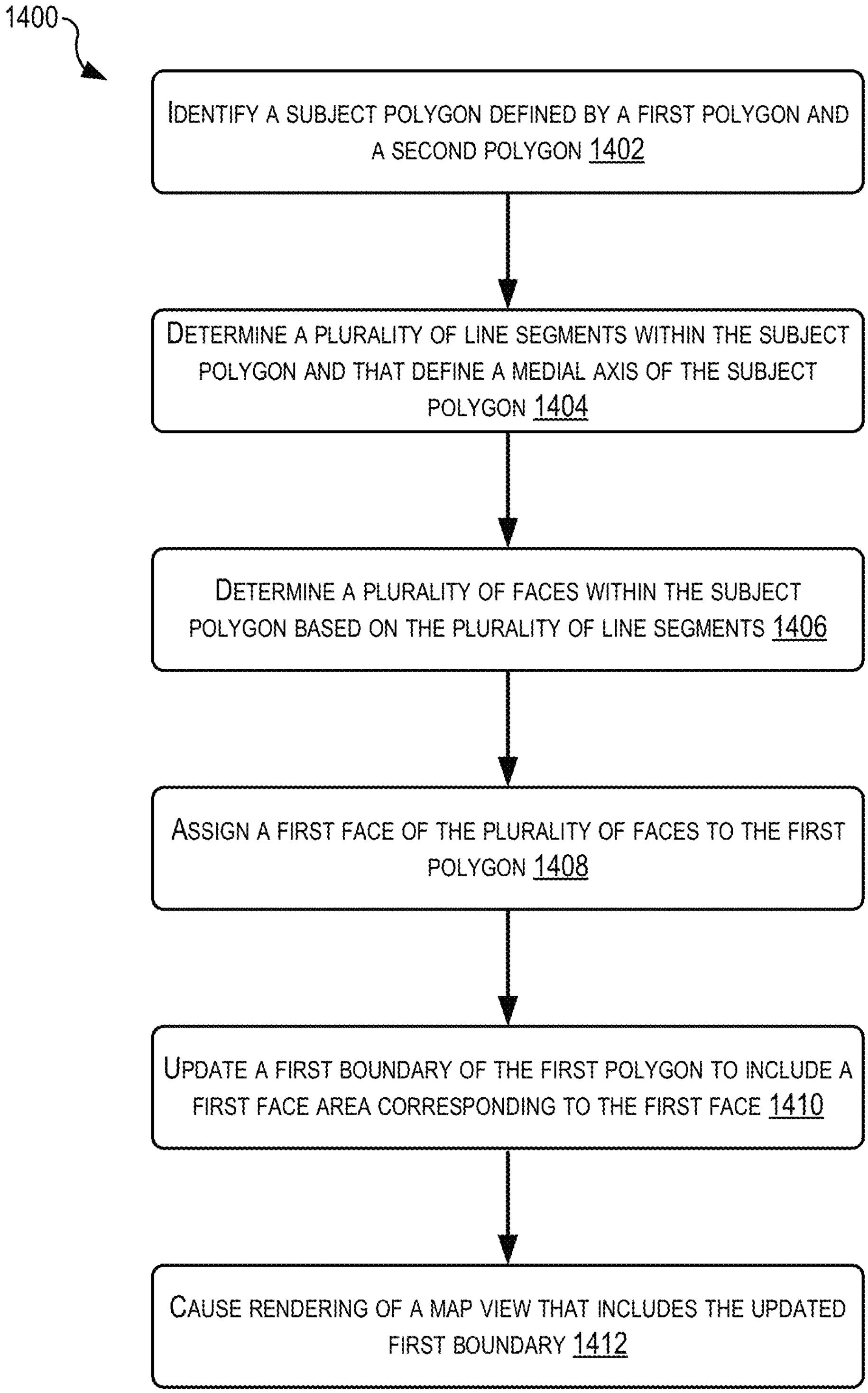
FIG. 14 is a diagram showing a flow chart corresponding to an example process for polygon alignment using a medial axis, according to at least one example.

FIG. 14 is a diagram showing a flow chart corresponding to an example process 1400 for polygon alignment using a medial axis, according to at least one example. The process 1400 may be implemented by the element(s) of the system 100, and the map server 122 in particular.

The process 1400 begins at block 1402 by the map server 122 identifying a subject polygon defined by a first polygon and a second polygon. The subject polygon may include a closed gap between the first polygon and the second polygon or an overlap between the first polygon and the second polygon. In some examples, wherein the first polygon corresponds to a first influence boundary of a first island and a second polygon corresponds to a second influence boundary of a second island. In some examples, the subject polygon may include an overlap between the first influence boundary and the second influence boundary.

At block 1404, the process 1400 includes the map server 122 determining a plurality of line segments within the subject polygon that define a medial axis of the subject polygon. The medial axis of the subject polygon may include a set of all points in the subject polygon that have more than one closest point on a polygon boundary of the subject polygon. At least some of the line segments may extend from vertices of the subject polygon.

At block 1406, the process 1400 includes the map server 122 determining a plurality of faces within the subject polygon based on the plurality of line segments. In some examples, each face of the plurality of faces may include a distinct face area within a subject polygon boundary of the subject polygon.

The subject polygon boundary may define a subject polygon area. In this example, determining the plurality of faces within the subject polygon based on the plurality of line segments may include dividing the subject polygon area into the distinct face areas using the plurality of lines segments.

At block 1408, the process 1400 includes the map server 122 assigning a first face of the plurality of faces to the first polygon. In some examples, the first polygon has a first priority and the second polygon has a second priority. In this example, assigning the first face to the first polygon of block 1408 may include assigning the first face based on the first priority being higher than the second priority.

In some examples, the subject polygon may be defined by the first polygon, the second polygon, and a third polygon. In this example, the first face may include a first shared boundary with the first polygon and a second shared boundary with the second polygon. In this example, assigning the first face of the plurality of faces to the first polygon of block 1408 may include determining that a first length of the first shared boundary is greater than a second length of the second shared boundary, and assigning the first face to the first polygon based on the first length being greater than the second length.

At block 1410, the process 1400 includes the map server 122 updating a first boundary of the first polygon to include a first face area corresponding to the first face. In some examples, updating the first boundary of the first polygon may include expanding the first boundary of the first polygon along a first face boundary corresponding to the first face and defining the first face area.

Assigning the first face to the first polygon of block 1408 may include identifying a shared boundary between a portion of a subject polygon boundary of the subject polygon that includes the first face and a portion of the first polygon boundary. In this example, updating the first boundary of the first polygon of block 1410 may include updating the first boundary based on the shared boundary.

At block 1412, the process 1400 includes the map server 122 causing rendering, on a display, of a map view that includes the updated first boundary. This may include providing the map view at a user device in communication with the map server 122.

In some examples, the process 1400 may further include assigning a second face of the plurality of faces to the second polygon. The process 1400 may further include updating a second boundary of the second polygon to include a second face area corresponding to the second face. In this example, causing rendering, on the display, of the map view of block 1412 may include causing rendering of the map view that includes the updated first boundary and the updated second boundary.

In some examples, blocks 1408 and 1410 can be iteratively repeated until all faces of the plurality of faces have been assigned to at least one adjacent polygon. As faces are assigned to polygons, the boundaries of the polygons can be updated to include the assigned faces.

Parallelization of Polygon Alignment

Figure 15:
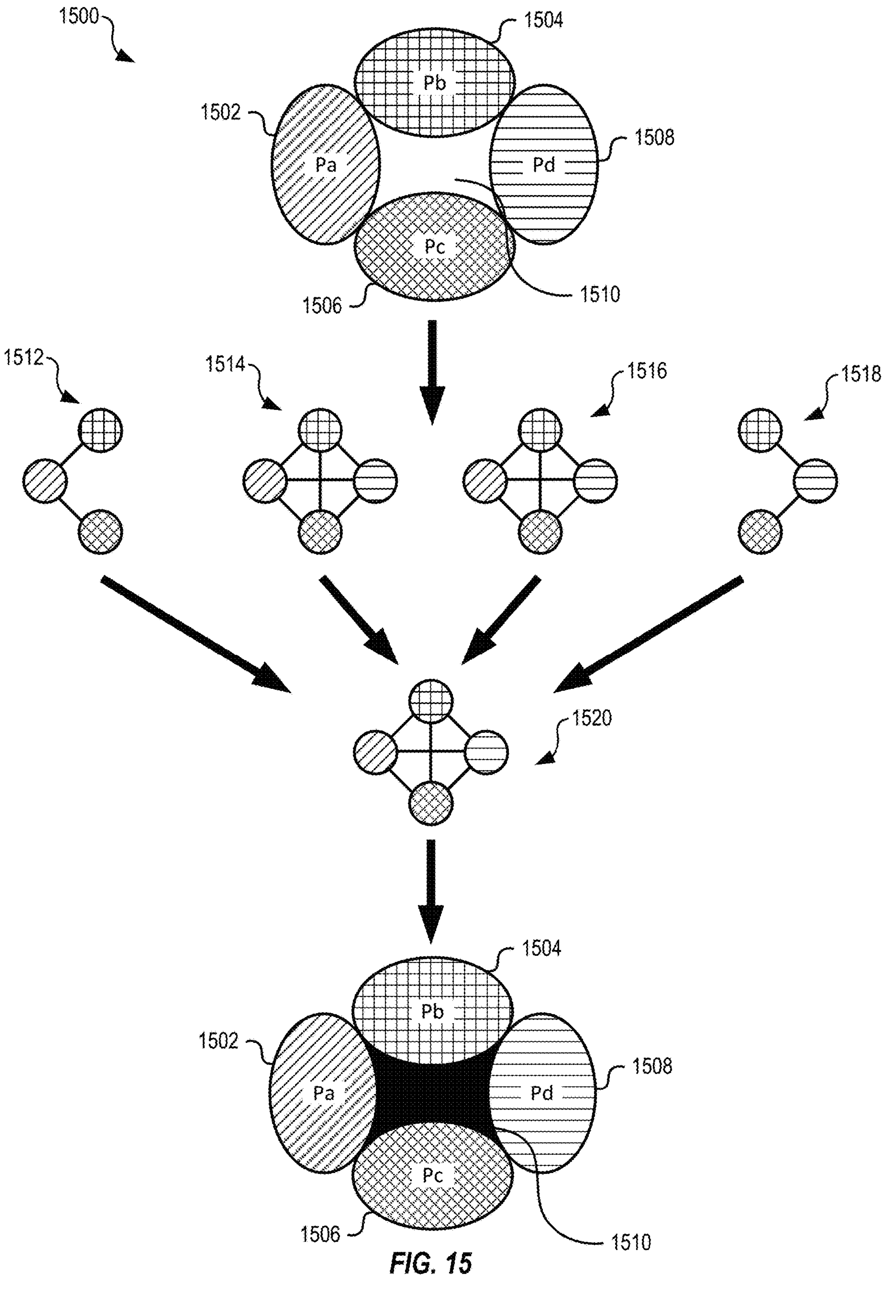
FIG. 15 is an illustration of an example process for parallelization of alignment of polygon gaps, according to at least one example.

FIG. 15 is an illustration 1500 of an example process for parallelization of alignment of polygon gaps, according to at least one example. The process may be performed by the map server 122, as described herein. A naive approach to assigning multi-gaps is to load all polygons into a single planar graph, assign gaps and overlaps, and extract the resulting polygons. However, the memory requirements of this planar graph are prohibitive. The example of aligning all state polygons in the USA would approach the memory limits of a typical machine. A naive distributed approach may include first identifying all the gaps and overlaps, computing their assignments in parallel, and using a Boolean union operation to combine them into the assigned polygon. This approach leads to numerical robustness errors and slivers, due to rounding of coordinates on an intermediate data set. The technique described herein overcomes these limitations by aligning each polygon independently, taking adjacent polygons as inputs. The results of each alignment is a perfect fit, which means that the gaps/overlaps are assigned consistently. For example, a degree N gap/overlap may be processed by N polygons, the result may be exactly the same every time. Adjacencies between polygons may be represented as a graph that are computed before alignment begins. Nodes in this graph represent polygons and edges represent borders. The alignment jobs for each polygon will use this graph to determine the other polygons that are inputs.

The illustration 1500 depicts a process for representing gaps formed by multiple polygons for parallelized identification, alignment, and assignment. The illustration 1500 depicts a gap 1510 formed between polygon Pa 1502, polygon Pb 1504, polygon Pc 1506, and polygon 1508. The gap 1510 is long, and polygon Pa 1502 and polygon Pd 1508 are separated by a significant distance, so in most gap assignment systems they may not be considered neighbors. Polygon Pb 1504 and polygon Pc 1506 are between polygons Pa 1502 and Pd 1508, such that they are both aware of all four polygons 1502-1508. The techniques described herein make sure that polygon Pa 1502 is aware of polygon Pd 1508 (and vice versa), by computing an adjacency list and using the list to define the inputs to the polygon Pa 1502 alignment job.

To begin, the map server 122 may identify the gap 1510 and the polygons 1502-1508 that define the gap 1510. The map server 122, or worker node of a distributed framework, may then generate individual adjacency graphs 1512-1518 corresponding to each polygon 1502-1508. Each adjacency graph 1512-1518 may include nodes that correspond to the respective polygons and edges that represent boundaries between polygons. Beginning with the adjacency graph 1512, the adjacency graph 1512 represents polygon Pa 1502 and includes a first node corresponding to polygon Pa 1502 connected between two nodes corresponding to polygons Pb 1504 and Pc 1506. The adjacency graph 1512 on its own does not represent the relationship with polygon Pd 1508. The adjacency graph 1514 represents polygon Pb 1504 and includes four nodes corresponding to polygons 1502-1508 and their interconnected boundaries. Similarly, the adjacency graph 1516 represents polygon Pc 1506 and includes four nodes corresponding to polygons 1502-1508 and their interconnected boundaries. The adjacency graph 1518 represents polygon Pd 1508 and includes a first node corresponding to polygon Pd 1508 connected between two nodes corresponding to polygons Pb 1504 and Pc 1506. The adjacency graph 1518 on its own does not represent the relationship with polygon Pa 1502.

Once adjacency graphs 1512-1518 have been generated, the map server 122 or a driver node of a distributed framework may merge the adjacency graphs 1512-1518 into an overall adjacency graph 1520. With the overall adjacency graph 1520, the polygon Pa 1503 will be aware of the polygon Pd 1508 during alignment, and will partition and assign the gap 1510 appropriately.

Figure 16:
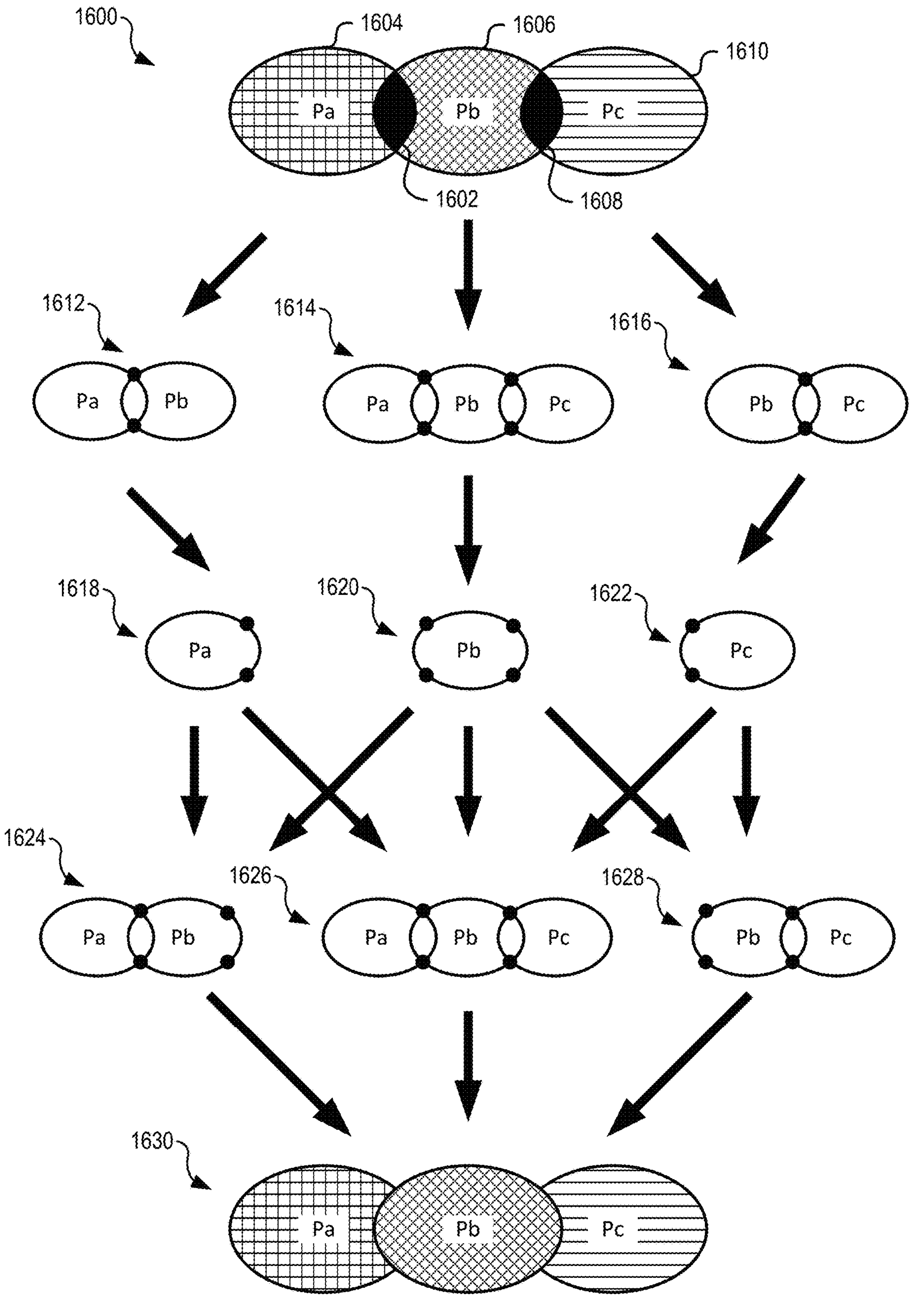
FIG. 16 is an illustration of an example process for parallelization of alignment of polygon overlaps, according to at least one example.

FIG. 16 is an illustration 1600 of an example process for parallelization of alignment of polygon overlaps, according to at least one example. The process may be performed by the map server 122, as described herein. Conventional systems may introduce polygon degeneracies in intersections where polygons overlap. These degeneracies can be different for different sets of input data. The techniques described herein including the map server 122 creating a node-based graph for line intersections between a polygon and all of its neighbors, as described with respect to FIG. 16.

The illustration 1600 depicts a process for representing overlaps formed by multiple polygons for parallelized identification, alignment, and assignment. The illustration 1600 depicts overlap 1602 formed between polygon Pa 1604 and polygon Pb 1606, and overlap 1608 formed between polygon Pb 1606 and polygon Pc 1610. Conventionally, the assignment of overlap 1602 may be performed for both polygons 1604 and 1606, and the assignment of the overlap 1608 may be performed for both polygons 1606 and 1610. Thus, when the polygon 1604 is being aligned this polygon is unaware of the polygon 1610, and vice-versa, because they are not adjacent. However, the polygon 1606 is aware of both polygons 1604 and 1610, and the presence of polygon 1610 can cause a different assignment result for the overlap 1602. The techniques described herein, pre-node intersections for all polygons to ensure that the polygon 1606 in the planar graphs (e.g., from FIG. 15) for each alignment job are identical.

For example, as shown in the illustration 1600, the polygons 1604, 1606, and 1610, including the defined overlaps 1602 and 1608, can be broken into initial node graphs 1612, 1614, and 1616. The initial node graph 1612 represents the intersections (shown as nodes) between the two polygons 1604 and 1606. Similarly, the initial node graph 1614 represents intersections between the three polygons 1604, 1606, and 1610. Finally, the initial node graph 1616 represents intersections between the two polygons 1606 and 1610. Each initial node graph 1612-1616 may be assigned to a different worker node in the distributed framework. From the initial node graphs 1612-1616, the map server 122 (e.g., a worker node under control of the map server 122) can determine the individual node graphs 1618-1622. The individual node graphs 1618-1622 represent the nodes associated with each polygon, as a single polygon. Thus, the polygon 1604 is represented by 1618 as having two nodes, representative of the two intersections with the polygon 1606. Next, the map server 122 may take the individual node graphs 1618-1622 and cross reference with the other individual node graphs 1618-1622 to generate pre-noded graphs 1624-1628. Each of the pre-noded graphs 1624-1628 represents a polygon and the nodes associated with its immediately adjacent polygons. Thus, for the polygon 1604, the pre-noded graph 1624 includes the polygon 1604, nodes between 1604 and 1606 and nodes on 1608 as a result of its connection with the polygon 1610. In this manner, the map server 122 and the work nodes in particular are aware that polygon 1606 has a shared connection with the polygon 1604 and the polygon 1610. Similar pre-noded graphs 1626 and 1628 are illustrated. These pre-noded graphs 1624-1628 are then used by the map server 122 to assign the overlaps to the appropriate polygons, as shown in output 1630.

As part of assigning the gap 1510 and/or overlaps 1602 and 1608, the map server 122 may create a spatial query structure (e.g., an index) to quickly search for polygons in a dataset (e.g., the continental USA) by bounding box. For example, for each polygon, the index may store a unique polygon identifier and a polygon bounding box associated with the polygon. Once built, the map server 122 can query the index with a query bounding box, and the index will return all polygons that intersect the query bounding box. In a distributed computer framework, the index may be distributed to each worker node in the distributed framework of computers.

The input polygons may be distributed amongst the worker nodes, so that each worker node has enough memory to store the polygons. For each polygon in each worker node, the worker node may use the query structure to identify neighboring polygons. For example, for any polygon A, the query structure may be used to determine Nbr(A) which is the list of other polygons that intersect A.

In parallel, the map server 122 (e.g., each worker node in the framework) may compute adjacency graphs (e.g., 1512-1518) for each polygon and its neighboring polygons. Each worker node computes the neighbors of each of its neighboring polygons and sends them to the driver node, which is the single node that controls the parallel operations of the worker nodes. The driver may then merge the adjacency graphs into a single adjacency graph (e.g., 1520). In some examples, the adjacency graph may also represent the information from the pre-noded graphs 1624-1628.

In parallel, the map server 122 may compute, for each polygon its adjacent polygons, a planar graph from all polygons, classify gaps and overlaps, and determine their degree. The map server 122 may detect a multi-gap by computing the cycles in the adjacency graph. The map server 122 may partition multi-gaps as described with reference to FIG. 15. The map server 122 may assign gaps and simple overlaps. The map server 122 may assign multi-overlaps as described with reference to FIG. 16. The map server 122 may traverse the planar graph to constructed an aligned and targeted polygon, including assigned gaps and overlaps. The map server 122 may output these polygons as final results.

Figure 17:
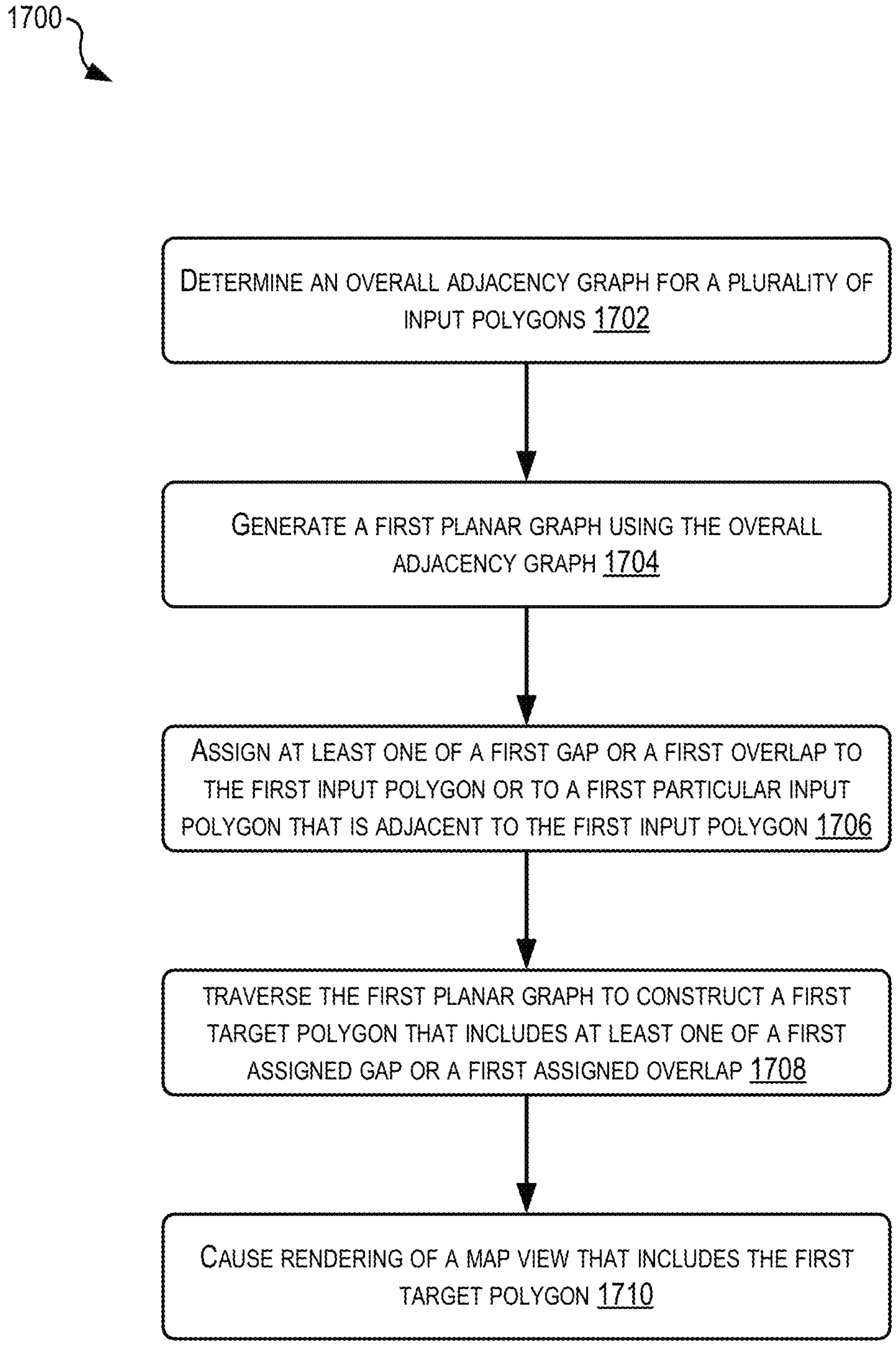
FIG. 17 is a diagram showing a flow chart corresponding to an example process for parallelization of alignment of polygon overlaps, according to at least one example.

FIG. 17 is a diagram showing a flow chart corresponding to an example process 1700 for parallelization of alignment of polygon overlaps, according to at least one example. The process 1700 may be implemented by the element(s) of the system 100, and the map server 122 in particular. In some examples, aspects of the process 1700 may be performed by a distributed computing framework that is implemented under the control of the map server 122. For example, the map server 122 may be include a plurality of individual compute nodes capable of performing parallel processing.

The process 1700 begins at block 1702 by the map server 122 determining an overall adjacency graph for a plurality of input polygons. In some examples, this may include determining by a driver node of a distributed computing framework. The overall adjacency graph may include a plurality of nodes representing the plurality of input polygons and a plurality of edges representing a plurality of boundaries between input polygons of the plurality of input polygons that are adjacent. The overall adjacency graph may correspond to the overall adjacency graph 1520. In some examples, the plurality of input polygons may represent a plurality of governmental boundaries or any other boundary between polygons.

At block 1704, the process 1700 includes the map server 122 generating a first planar graph using the overall adjacency graph, the first planar graph representing particular input polygons that are adjacent to the first input polygon. In some examples, the first planar graph may be generated for a first input polygon of the plurality of input polygons. The block 1704 may be performed at a first worker node of the distributed computing framework.

At block 1706, the process 1700 includes the map server 122 assigning at least one of a first gap or a first overlap to the first input polygon or to a first particular input polygon that is adjacent to the first input polygon. In some examples, the assigned may be based on using the first planar graph. The block 1706 may be performed at a first worker node of the distributed computing framework. In some examples, the first gap may include an area that is defined between the first input polygon and the particular input polygons and may be unassigned to either of the first input polygon or any of the particular input polygons.

At block 1708, the process 1700 includes the map server 122 traversing the first planar graph to construct a first target polygon that includes at least one of a first assigned gap or a first assigned overlap. This may be performed by the driver node. In some examples, traversing the first planar graph to construct the first target polygon may include changing a perimeter boundary of one of the first input polygon or the first particular input polygon to include at least one of the first assigned gap or the first assigned overlap.

At block 1710, the process 1700 includes the map server 122 causing rendering of a map view that includes the first target polygon. Causing rendering may be on a display of a user device.

In some examples, determining the overall adjacency graph at block 1702 may include distributing, by the driver node, the plurality of input polygons to a set of worker nodes of the distributed computing network. The set of worker nodes may include the first worker node. Determining the overall adjacency graph may also include determining, by individual worker nodes, a plurality of adjacent polygons for each input polygon of the plurality of input polygons. Determining the overall adjacency graph may also include determining, by the individual worker nodes, a plurality of individual adjacency graphs corresponding to the plurality of adjacent polygons. Determining the overall adjacency graph may also include determining, by the driver node, the overall adjacency graph by combining the plurality of individual adjacency graphs. In some examples, determining the plurality of adjacent polygons by the individual worker nodes may be performed in parallel by the individual worker nodes. In some examples, determining the plurality of adjacency graphs by the individual worker nodes may be performed in parallel by the individual worker nodes. In some examples, the process 1700 may further include, prior to determining the overall adjacency graph, receiving, by the driver node from the individual worker nodes, the plurality of individual adjacency graphs.

In some examples, determining the plurality of adjacent polygons for each input polygon of the plurality of input polygons may include querying, by individual worker nodes, an index using a query bounding box to identify neighboring polygons corresponding to a single input polygon of the plurality of input polygons. In some examples, the query bounding box may be specific to each worker node and corresponds to a predefined area of a map that includes the plurality of input polygons. In some examples, querying the index using the query bounding box may return the neighboring polygons that intersect the query bounding box. In some examples, the neighboring polygons intersect the single input polygon. In some examples, querying the index by the individual worker nodes may be performed in parallel by the individual worker nodes.

In some examples, the process 1700 may further include, at a second worker node of the distributed computing framework and in parallel with the first worker node, generating, for a second input polygon, a second planar graph using the overall adjacency graph. The second planar graph representing other input polygons that are adjacent to the second input polygon. In this example, the process 1700 may further include assigning, using the second planar graph, at least one of a second gap or a second overlap to the second input polygon or to a second other input polygon that is adjacent to the second input polygon. In this example, the process 1700 may further include traversing the second planar graph to construct a second target polygon that includes at least one of a second assigned gap or a second assigned overlap.

Block Shrinkage Using Push Vectors

As described above, digital maps are typically built from data sets that come from various providers and sources. These data sets can be of varying degrees of quality, accuracy, and consistency. A typical problem that appears when merging different data sets from different vendors is that building polygons sometimes encroach the road network. This can be due to an overestimated road width, or an insufficient accuracy in the road network data set and/or the building data set, for example. The processes described herein for adjusting buildings assumes that both the road network and the buildings data sets are already aligned, in the sense that there does not exist consistent shifts between them.

Figure 18:
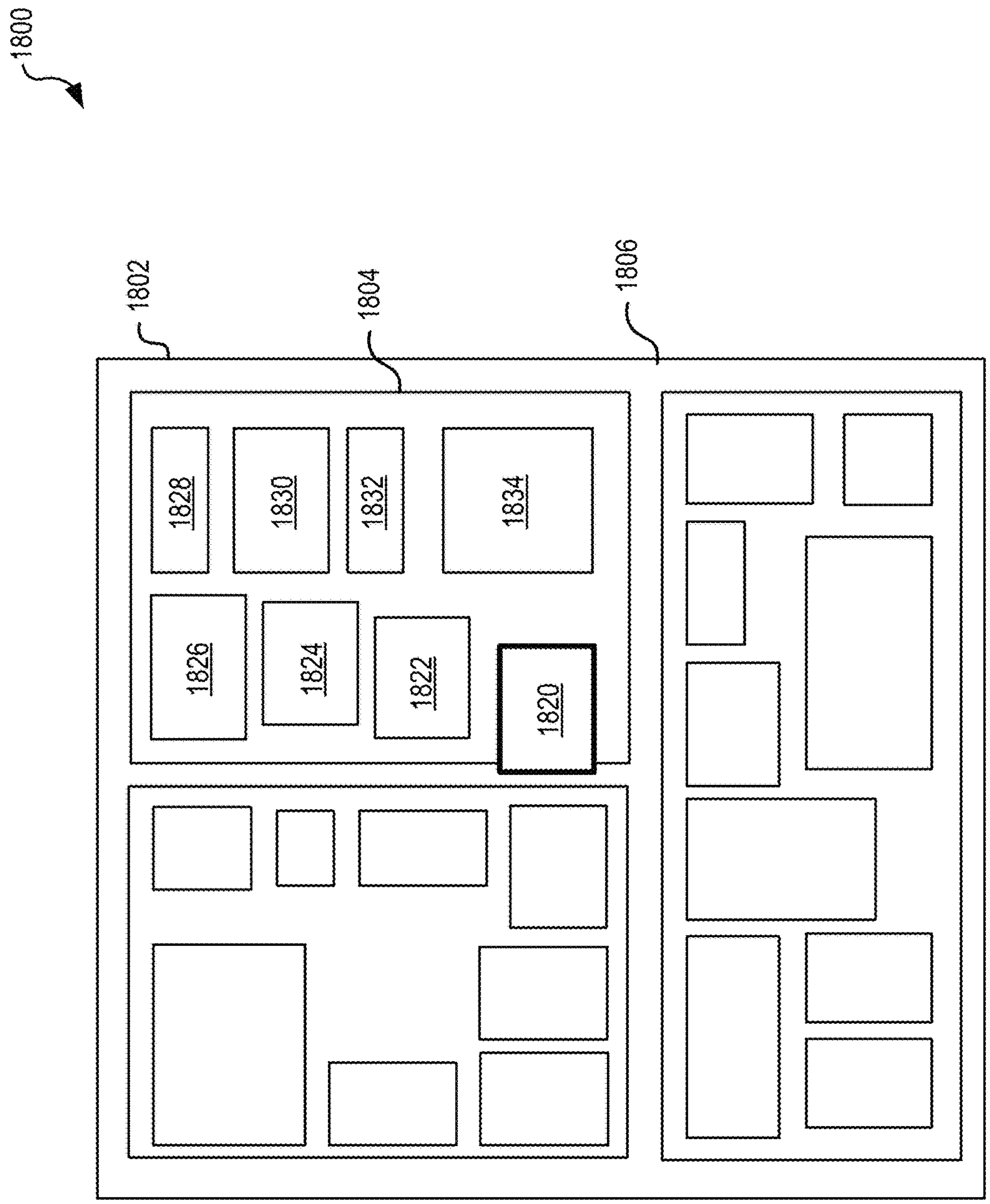
FIG. 18 is an illustration of a map rendering error where a building is rendered overlapping an adjacent road, according to at least one example.

FIG. 18 is an illustration 1800 of a map rendering error where a building is rendered overlapping an adjacent road, according to at least one example. The illustration 1800 in particular corresponds to a process of identifying blocks and one or more buildings that need to be adjusted. For example, the illustration 1800 depicts a rendered map 1802. The rendered map 1802 includes several blocks 1804 of buildings (e.g., buildings 1820-1834) and road networks (e.g., road 1806) running between the blocks. The road network data used for rendering map 1802 may be obtained from a different source (e.g., vendor) than the building data used to render the buildings on map 1802. Thus, in some cases, a building (e.g., building 1820) may be rendered overlapping an adjacent or nearby road. For example, building 1820 is rendered overlapping the border of block 1804 and overlapping the adjacent road.

To fix this problem, the map server 122 may compute the arrangement of the road network using the obtained road network data (e.g., polylines corresponding to roads and properties defining road edges, centerlines, class of road). In order to achieve scalability, the map server 122 may implement the described process in a framework of MapReduce parallel computation or similar framework. In some examples, centerlines of roads may be used to identify defined closed faces.

The map server 122 can group buildings in the same face (e.g., block 1804) together. A block or face can be a grouping of buildings, or an area, bounded by roads of the road network. For example, a building belongs to the face its centroid is contained within. For buildings not in a closed face, grouping can be done based on the roads at a certain fixed distance away from the buildings. In some examples, a rectangular block may include four faces, each of which are associated with one side of the block.

Figure 19:
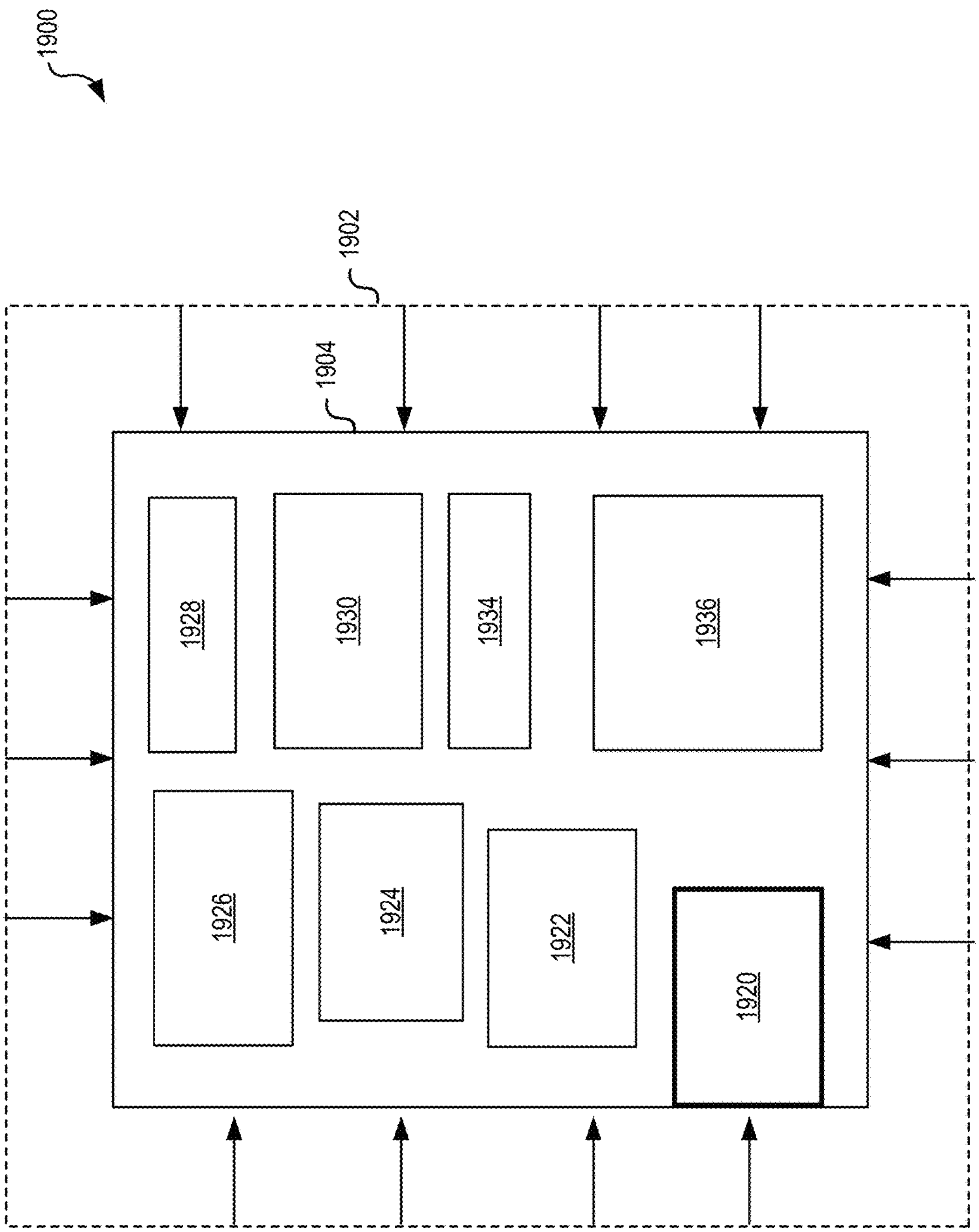
FIG. 19 is an illustration of a process for determining adjustment vectors for buildings within a block to prevent rendering buildings over roads, according to at least one example.

FIG. 19 is an illustration 1900 of a process for determining push vectors for buildings within a block to prevent rendering buildings over roads, according to at least one example. In some examples, after grouping buildings into blocks (e.g., faces), the map server 122 can perform a block shrinkage algorithm with respect to each building in each face. For example, the map server 122 can apply the block shrinkage algorithm in parallel to each building in each face. The map server 122 can, for example, displace the vertices of all buildings within a block according to a "push vector." The set of all push vectors can be a vector field that is continuous almost everywhere (e.g., to avoid generating overlaps between displaced buildings). This vector field can be interpolated from values defined at the road polyline vertices. For example, the vectors can be perpendicular to the road segment, have a length that is half the road width, and point towards the inside of the block (face of the road network arrangement). Thus, the vectors may have decreasing magnitude with respect to distance from road centerlines. Each road surrounding the block may have an assigned class property, which may correspond a size of the road (e.g., width, number of lanes) and may be used weight the vectors. For example, for a larger road, a stronger vector may be computed and used to push the building.

Figure 20:
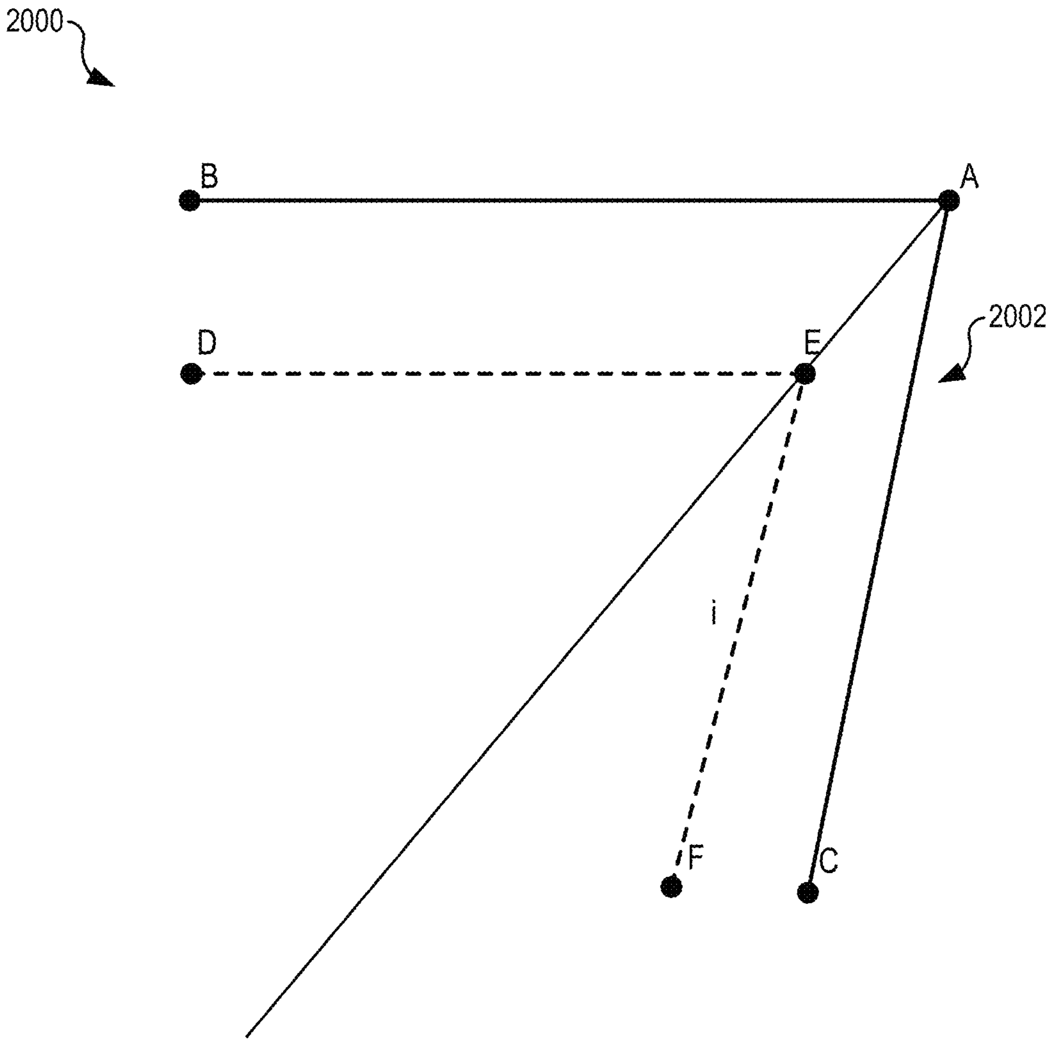
FIG. 20 is an illustration of an example push vector, according to at least one example.

Turning to FIG. 20, this figure provides an illustration 2000 of an example push vector 2002, according to at least one example. In the illustration 2000, AB and AC are centerlines of two roads that are part of a road face (the remaining roads are not shown in this figure). The road widths of AB and AC are different, as is visibly depicted (BD>CF). For this example, AE is the ideal push vector computed by the map server 122 first computing the point E (the corner of the intersection of roads whose centerlines are AB and AC). The map server 122 then iterates over all corners of the road face and creates the ideal push vector at each vertex of the road face. Once all the ideal push vectors of a face are computed, the map server 122 creates the continuous vector field.

Creating the continuous vector field may include the map server 122 using Mean Value Coordinates, which is a generalization of Barycentric Coordinates for a triangle. For buildings in a simple face, mean value coordinates may be used to interpolate weights to the push vectors formed at the vertices of the road polygon. For buildings not in a simple face, the map server 122 may use the projections of the building vertices on its neighboring roads to determine the location of the push vectors, which are then combined together (e.g., in an adhoc manner) to get the final push vectors. Once the final push vectors have been created, they may be applied to the corresponding face to push the overlapping building.

Returning now to FIG. 19, the map server 122 can determine road polylines 1902 that bound buildings 1920-1936 that are grouped into a block 1904 (e.g., face). The map server 122 can extend push vectors (e.g., arrows in FIG. 19) that start at points along the road polylines 1902 (e.g., the centerlines of corresponding roads) and extend toward the center of block 1904. The map server 122 can extend the push vectors from the road polyline to a length that is half the width of the road corresponding to the road polyline (e.g., to the edge of the corresponding road). For pushing points not on the centerline, the map server 122 can scale the push vectors starting at these points corresponding to the distance between the road centerline and the point.

Figure 21:
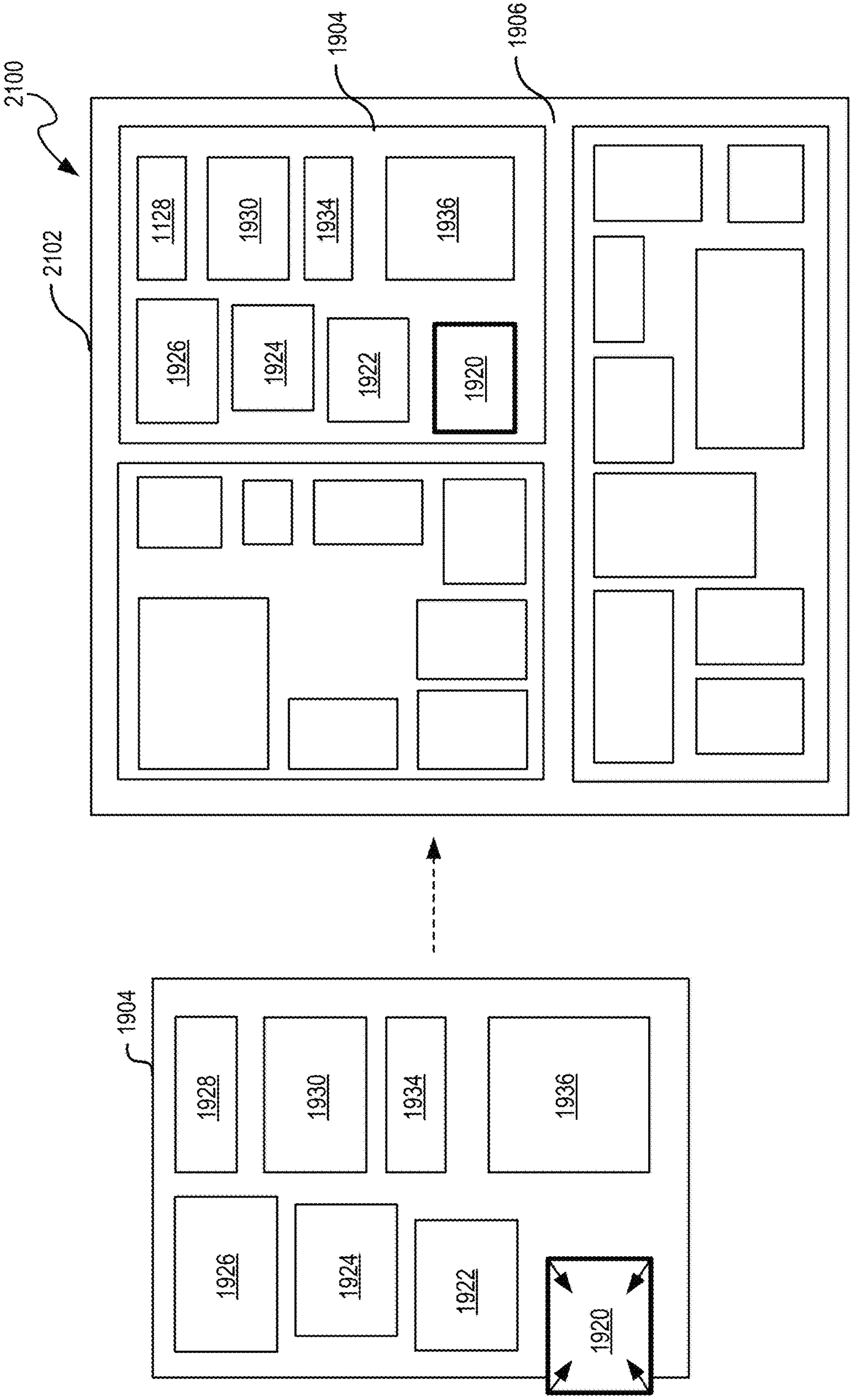
FIG. 21 is an illustration of a process for adjusting buildings within a block using push vectors, according to at least one example.

FIG. 21 is an illustration 2100 of a process for adjusting buildings within a block using push vectors, according to at least one example. In some examples, the map server 122 can generate adjustment vectors for adjusting buildings within a block so that buildings within the block do not overlap adjacent roads and do not overlap other buildings within the block. For example, after generating the push vectors, the map server 122 can generate building adjustment vectors based on a weighted combination of the push vectors described with reference to FIG. 19. For example, the push vectors extending from the road polyline can be combined to generate vertex push vectors that extend from the vertices of the road polygon that bounds the block. The map server 122 can then apply weights to the vertex push vectors to generate the building adjustment vectors.

In some examples, the map server 122 can apply the building adjustment vectors to each building vertex to adjust the building within the corresponding block. For example, the map server 122 can use the building adjustment vectors to shrink each building within the corresponding block.

In some examples, the map server 122 can adjust buildings in a simple face. For example, a simple face can be a face with straight edges, right angles, a regular shape, or conforming to a grid. For buildings in a simple face, the map server 122 can use generalized barycentric coordinates to interpolate weights to the push vectors formed at the vertices of the road polygon. For example, when adjusting buildings in a simple face, the map server 122 can generate ideal vectors at each vertex of the road polygon. Then, for each building vertex in a block, the map server 122 can determine the normalized barycentric coordinates at the road polygon vertex. For example, each road polygon vertex can be assigned a weight such that the sum of all weights over all points is one (1). The map server 122 can then use the coordinates as weights to combine the push vectors into a single building adjustment vector and use the single building adjustment vector to translate the building vertex. For example, the map server 122 can generate building adjustment vectors for building 1920 of FIG. 19 to reduce the size of building 1920 so that it fits within block 1904 without overlapping a road (e.g., road 1906), as illustrated by map 2102.

For buildings not in a simple face, the map server 122 can use the projections of the building vertices on its neighboring roads to determine the location of the push vectors, which are then combined together in an adhoc manner to get the final push vectors (e.g. building adjustment vectors). For example, the map server 122 can project each building vertex on surrounding roads and create ideal vectors at those points on the surrounding roads. The map server 122 can then scale the push vectors according to the point's distance from each road centerline and use a weighted combination of the scaled push vectors to generate the final building adjustment vector.

Figure 22:
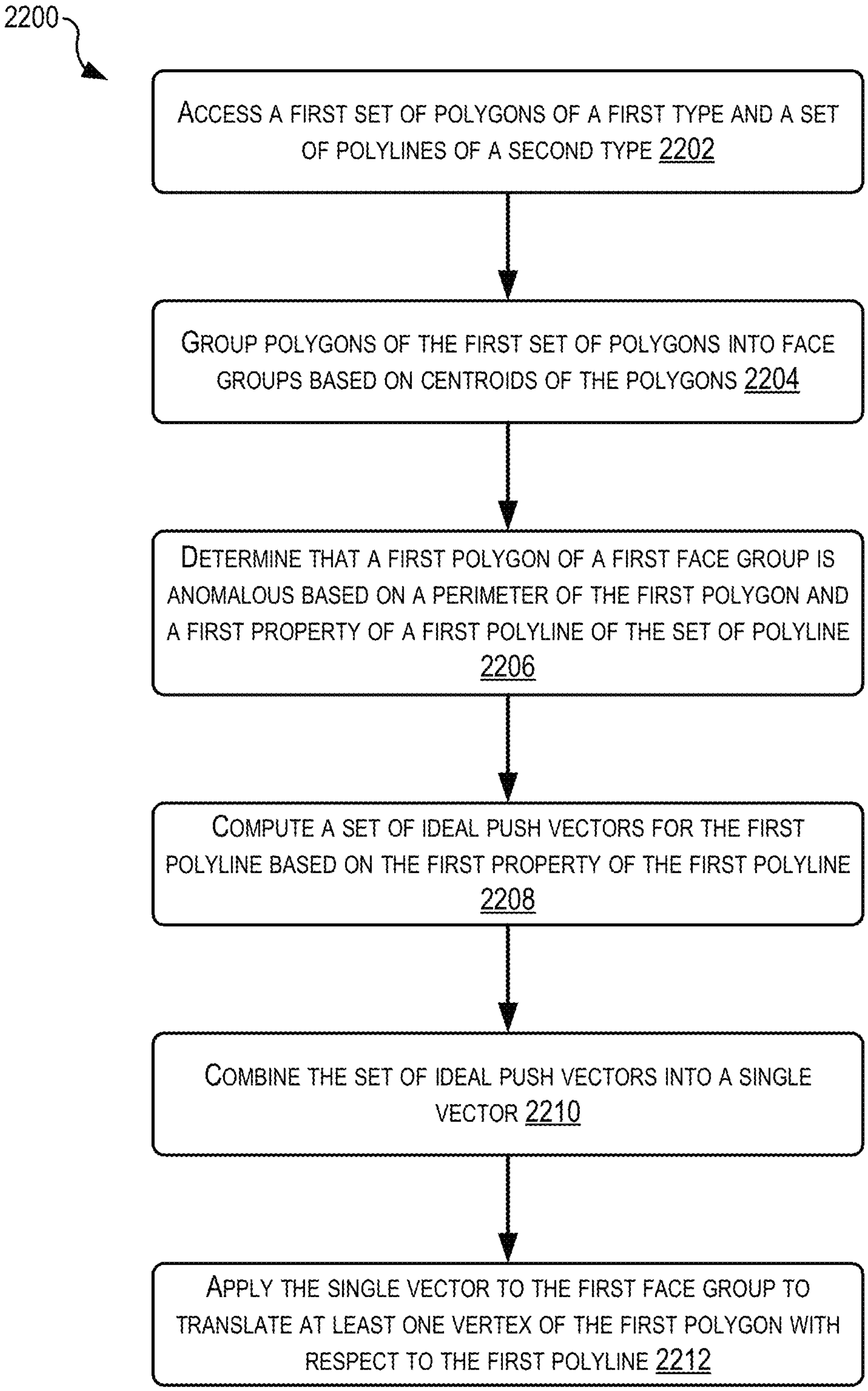
FIG. 22 is a diagram showing a flow chart corresponding to an example process for adjusting buildings within a block using push vectors, according to at least one example.

FIG. 22 is a diagram showing a flow chart corresponding to an example process 2200 for adjusting buildings within a block using push vectors, according to at least one example. The process 2200 may be implemented by the element(s) of the system 100, and the map server 122 in particular. In some examples, aspects of the process 2200 may be performed by a distributed computing framework that is implemented under the control of the map server 122. For example, the map server 122 may include a plurality of individual compute nodes capable of performing parallel processing (e.g., using the Hadoop MapReduce parallel framework).

The process 2200 begins at block 2202 by the map server 122 accessing a first set of polygons of a first type and a set of polylines of a second type. In some examples, the first type may be a building type and the second type may be a road type.

At block 2204, the process 2200 includes the map server 122 grouping polygons of the first set of polygons into face groups based on centroids of the polygons. A first face group may include at least one polygon of the first set of polygons that is oriented in a particular direction with respect to at least one polyline of the set of polylines. In some examples, the first face group may include first polygons of the first of polygons that are located within a block that is bounded by at least two polylines of the set of polylines.

At block 2206, the process 2200 includes the map server 122 determining that a first polygon of a first face group is anomalous based on a perimeter of the first polygon and a first property of a first polyline of the set of polylines. As described herein, an anomalous polygon may be one that extends into a roadway. In some examples, the first polyline may include a centerline of a road and the first property may include a centerline offset value that defines a road edge with respect to the centerline.

In some examples, determining that the first polygon is anomalous may include determining that a portion of the perimeter of the first polygon intersects a polyline that is offset from the first polyline.

At block 2208, the process 2200 includes the map server 122 computing a set of ideal push vectors for the first polyline based on the first property of the first polyline. Computing the set of ideal push vectors may be for the first face group. In some examples, computing the set of ideal push vectors may include determining the set of ideal push vectors based on a second property of first polyline. The second property may include a road class value for the road. In some examples, each ideal push vector of set of ideal push vectors may be perpendicular to a segment of the first polyline, includes a length substantially equal to a road width, and may be oriented towards an inside of a block that includes the first face group.

In some examples, computing the set of ideal push vectors for the first polyline may include computing an ideal push vector at each vertex of the first polyline that is opposite the first face group based on the first property of the first polyline.

At block 2210, the process 2200 includes the map server 122 combining the set of ideal push vectors into a single vector. Combining the set of ideal push vectors may be for the first face group. In some examples, the single vector may be oriented perpendicular with respect to the first polygon. In some examples, the single vector may include a vector field that is substantially continuous across the first polygon.

In some examples, the process 2200 may further include the map server 122, for the first face group, determining mean value coordinates for each vertex of the first polygon. In this example, combining the set of ideal push vectors into the single vector from block 2210 may include using the mean value coordinates as weights for each vertex to define the single vector.

At block 2212, the process 2200 includes applying the single vector to the first face group to translate at least one vertex of the first polygon with respect to the first polyline.

Applying the single vector may be for the first face group. In some examples, applying the single vector to the first face group may translate the first polygon away from a road centerline and to a point that is beyond a road edge.

In some examples, the first polygon may belong to the first face group and a second face group. In this example, the process 2200 may further include the map server 122 determining that the first polygon of the second face group is anomalous based on a perimeter of the first polygon and a second property of a second polyline of the set of polylines. The process 2200 may further include the map server 122, for the second face group, computing a different set of ideal push vectors for the second polyline based on the second property of the second polyline, combining the different set of ideal push vectors into a different single vector, and applying the different single vector to the second face group to translate the first polygon with respect to the second polyline.

Polygon Scaling

Figure 23:
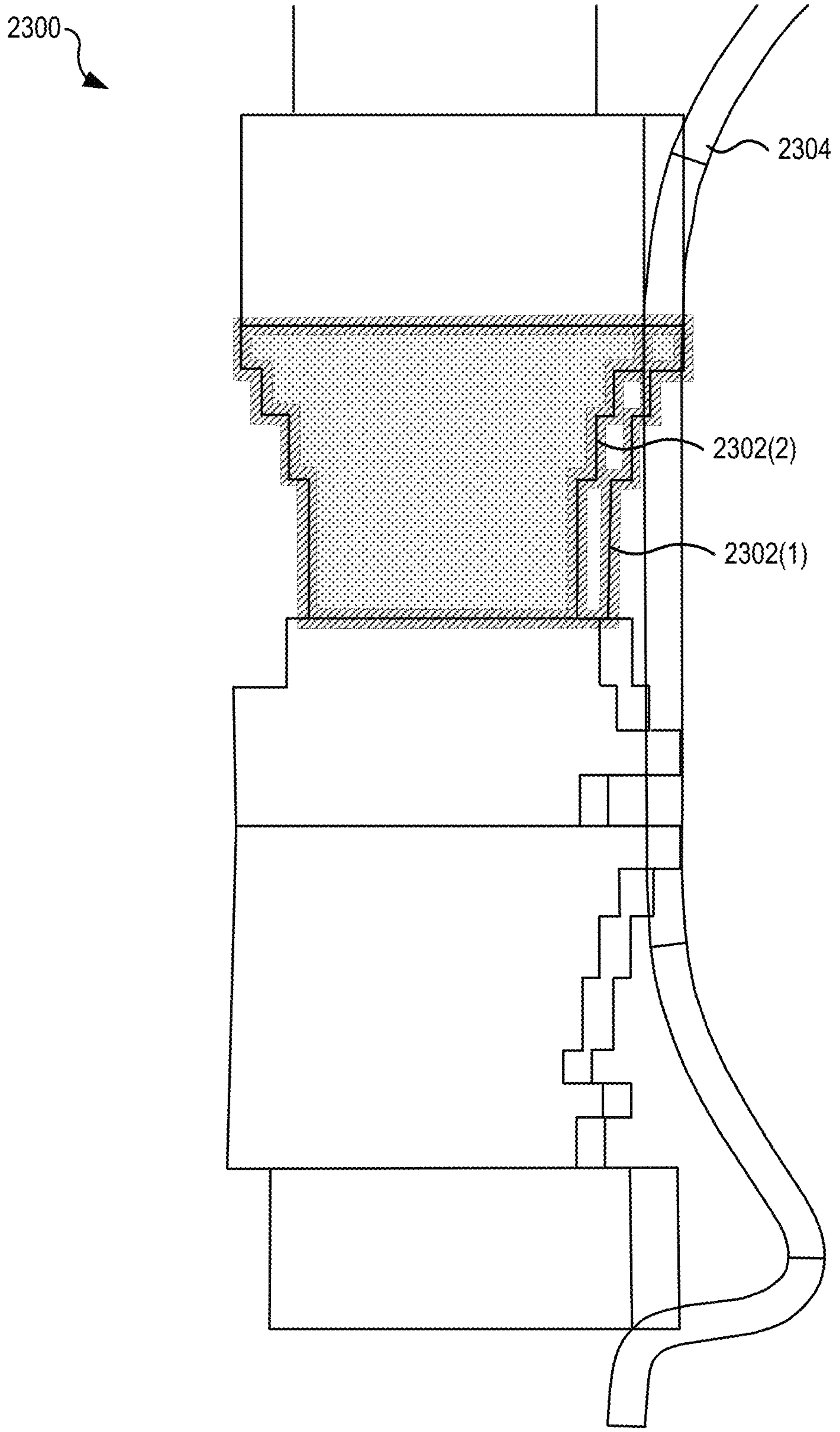
FIG. 23 is an illustration introducing a process for scaling individual polygons to avoid overlaps with other polygons, according to at least one example.

FIG. 23 is an illustration 2300 introducing a process for scaling individual polygons to avoid overlaps with other polygons, according to at least one example. The process may be applied to individually scale building polygons such as building 2302 to avoid overlapping roads (e.g., road 2304). The shapes of roads and sidewalks are often idealized without reference to the surrounding building footprints. The result is that sometimes they overlap. In these cases, in order to achieve an aesthetic look on the screen, the building may be shrunk but in a way that preserves its shape. The described algorithm involves selecting sides on the boundary of the building and then walking a two-dimensional grid resulting in a sequence of candidate transformations. Each point on the grid represents a longitudinal shrink and transversal shrink relative to the side of the building chosen. The final transformation is selected based on retaining the maximum possible area of the original footprint. Thus, in the illustration 2300, the original building footprint 2302(1) has been shrunk transversally to define a new building footprint 2302(2) that avoids the road 2304.

Initially, the described process may use the road centerline to determine if the road intentionally runs through the building, which happens at times, or whether the overlap is inadvertent.

Figure 24:
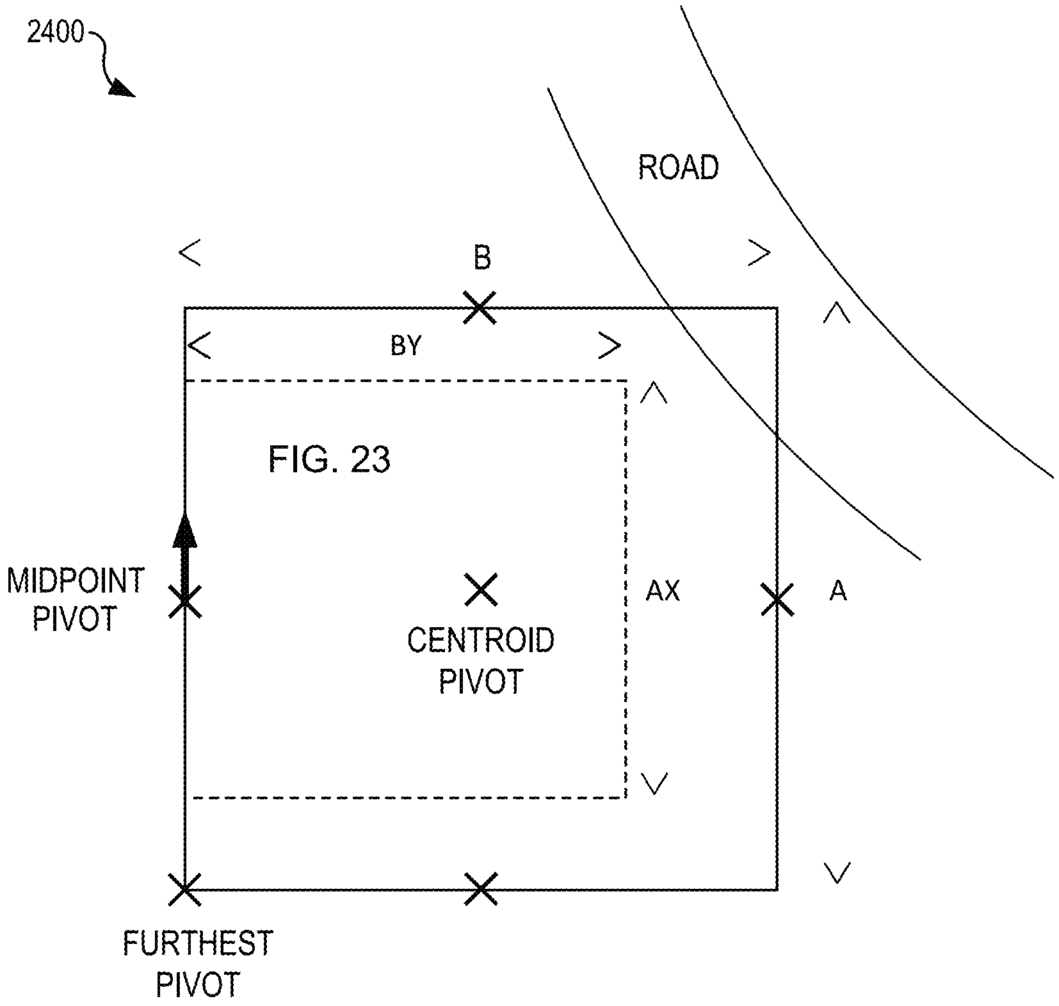
FIG. 24 is an illustration corresponding to an example building and corresponding terminology relating to shrinking buildings to avoid overlaps with other polygons, according to at least one example.

FIG. 24 is an illustration 2400 corresponding to an example building and corresponding terminology relating to shrinking buildings to avoid overlaps with other polygons, according to at least one example. The described process, at times referred to as a transformation algorithm, may be based on longitudinal (X) and transversal (Y) scaling of the building relative to some building perimeter pivot point and some building edge heading. As shown in the illustration 2400, longitudinal scaling occurs along AX and transversal scaling occurs along BY. The building may be scaled/shrunk according to a pivot point. The pivot points considered may, in some examples, include the midpoint of some portion (e.g., six) of the longest line segments greater than some fixed length (e.g., 1 meter) on the perimeter of the building, the point on the building perimeter that is furthest from the transport network polygons and the centroid of the building. Each midpoint pivot is paired with the heading of the associated segment. The furthest pivot and centroid pivot are paired with every midpoint heading. Part of the algorithm includes picking the best pivot point to maximize the footprint of the building or according to any other suitable metric.

In an example process, the map server 122 may evaluate intersections in the dataset(s). This may include evaluating intersections between each building and the transport network polygons to give a collection of intersection polygons.

In the example process, the map server 122 may evaluate pivots. This may include evaluating pivot points at the building vertex, building edge midpoint that is furthest away from the intersections, and at any other location described herein.

In the example process, the map server 122 may evaluate headings. This may include evaluating the headings as the collections of Easterly angles from due North that the building edges are pointing. In some examples, only the longest building edges that are greater than or equal to one meter in length may be considered.

Figure 25:
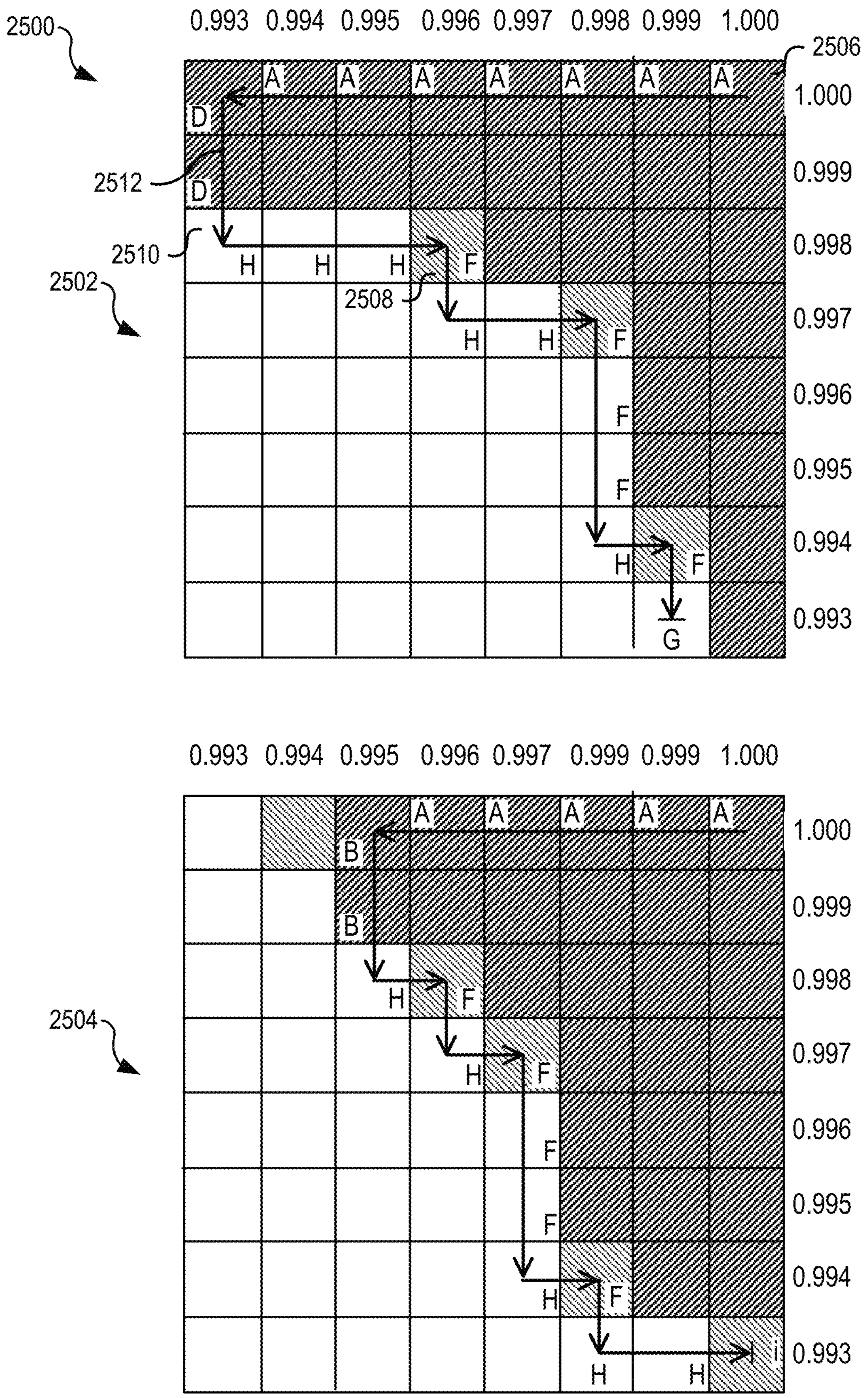
FIG. 25 is an illustration of two example transformation grids, according to at least one example.

In the example process, the map server 122 may evaluate transformations. FIG. 25 is an illustration 2500 of two example transformation grids 2502 and 2504, according to at least one example. The transformation grids 2502 and 2504 represent example walks by the algorithm through two-dimensional space. The vertical axes of the grids 2502 and 2504 correspond to shrinkage in the X axis, with each box representing a scaling value corresponding to a scaling factor parameter value (e.g., 1.000 to 0.993). Similarly, the horizontal axes of the grids 2502 and 2504 correspond to shrinkage in the Y axis, with each box representing a scaling value corresponding to a scaling factor parameter value (e.g., 1.000 to 0.993). As there are likely millions of transformations in the search space for each heading, the described process is employed involving a linear walk through the search space resulting in far fewer potential transformations (e.g., less than a thousand). At each step in the algorithm, there are nine possible moves, some of which are labeled in the grids 2502 and 2504 as A, B, C, D, E, F, G, H and I. The example grids 2502 and 2504 represent only 64 scalings with 8 in each dimension. This would be the scenario if the scaling factor minimum parameter value was set to 0.993, but, of course, larger or smaller scaling factors may be utilized. Cells with top-right to bottom-left diagonal fill (e.g., cell 2506) represent building scalings that intersect with a network transport polygon. Cells with top-left to bottom-right diagonal fill (e.g., cell 2508) represent candidate transformations output by the algorithm. The candidate transformations (e.g., three cell 2508 in the grid 2502) represent transformations that avoid the intersection with the road. The process, at further steps, evaluates the transformations to pick a suitable one. The white cells 2510 represent walks that avoid the intersection but are not candidates. Linked arrows 2512 represent the steps in the linear walk followed by the algorithm.

The example walk by the algorithm shown in the grid 2502 indicates that no amount of scaling in the X direction (at least to 0.993) is sufficient for avoiding the intersection. However, scaling in the X direction (0.996) and scaling in the Y direction (0.998) is sufficient. Similarly, 0.998 in X and 0.997 in Y and 0.999 in X and 0.994 in Y would work.

In some examples, transforming each polygon may include converting the polygon to Mercator coordinates, translating the polygon using coordinates of pivot (decided previously), rotating the polygon using angle of heading, scaling longitudinally (X) by a factor from 0.001 to 0.999, scaling transversally (Y) by a factor from 0.001 to 0.999, inverse rotating using angle of heading, inverse translating using coordinates of pivot, converting back from Mercator coordinates, and clipping using the original geometry of the polygon.

Returning to the example process, the map server 122 may pick a transformation. Picking a transformation may include scoring each transformation and picking the one with the highest score. The score for a transformation may be computed by taking an area of the transformation divided by a number of vertices in the transformation.

In the example process, the map server 122 may provide an edit opportunity. This may include providing the selected transformation for review/edit by a human user. In some examples, if the building display geometry has been manually adjusted or the building geometry is completely inside a transport network polygon or the building geometry is overly entangled with the surrounding transport network polygons then a manually job may be created no edit suggestion.

Figure 26:
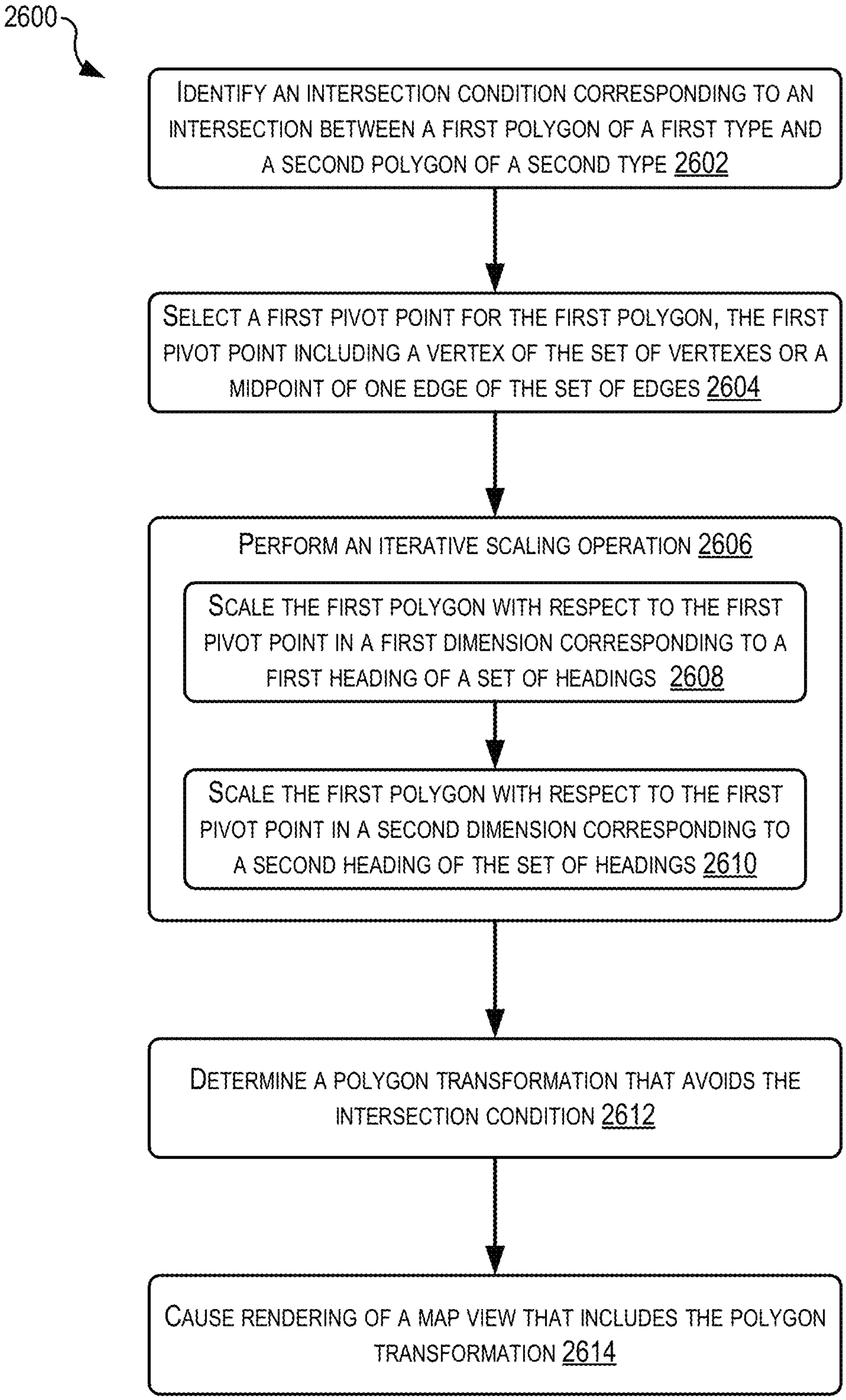
FIG. 26 is a diagram showing a flow chart corresponding to an example process for building scaling, according to at least one example.

FIG. 26 is a diagram showing a flow chart corresponding to an example process 2600 for building scaling, according to at least one example. The process 2600 may be implemented by the element(s) of the system 100, and the map server 122 in particular. In some examples, aspects of the process 2600 may be performed by a distributed computing framework that is implemented under the control of the map server 122.

The process 2600 begins at block 2602 by the map server 122 identifying an intersection condition corresponding to an intersection between a first polygon of a first type and a second polygon of a second type. The first polygon may include a set of edges connected by a set of vertexes. In some examples, the first polygon may be a building and the second polygon may be a road. In some examples, wherein the first type of polygon may include a structure type and the second type of polygon may include a transport type.

At block 2604, the process 2600 includes the map server 122 selecting a first pivot point for the first polygon, the first pivot point including a vertex of the set of vertexes or a midpoint of one edge of the set of edges.

At block 2606, the process 2600 includes the map server 122 performing an iterative scaling operation. The iterative scaling operation, as illustrated in FIG. 25, may include at least one of the map server 122, at block 2608, scaling the first polygon with respect to the first pivot point in a first dimension corresponding to a first heading of a set of headings, or the map server 122, at block 2610, scaling the first polygon with respect to the first pivot point in a second dimension corresponding to a second heading of the set of headings.

In some examples, performing the iterative scaling operation of block 2606 may include comprises performing a linear walk through a two-dimensional search space that is based on the first set of headings and the second set of headings. wherein performing the linear walk through the two-dimensional search space identifies the polygon transformation that avoids the intersection condition and identifies other polygon transformations that avoid the intersection condition. In this example, performing the linear walk through the two-dimensional search space may identify certain polygon transformations that do not avoid the intersection condition.

In some examples, the process 2600 may further include determining a set of pivot points for the first polygon, determining the set of headings corresponding to the set of pivot points, and determining a set of pivot-heading pairs by at least combing the set of pivot points with the set of headings. In this example, selecting the first pivot point of block 2604 may include selecting a first pivot-heading pair. In this example, performing the iterative scaling operation of block 2606 may include performing the iterative scaling operation using the first pivot-heading pair.

At block 2612, the process 2600 includes the map server 122 determining a polygon transformation that avoids the intersection condition. This may be based on the iterative scaling operation. In some examples, the first polygon may have a first measured area and the polygon transformation may have a second measured area that is less than the first measured area.

In some examples, the process 2600 may further include generating the polygon transformation based on an output of the iterative scaling operation that indicates that the first input polygon be scaled in at least one dimension of the first dimension or the second dimension.

In some examples, generating the polygon transformation may include converting the first polygon to Mercator coordinates, translating the first polygon using coordinates of the first pivot point, rotating the first polygon using an angle of a heading associated with the first pivot point, scaling the first polygon longitudinally according to first output from the iterative scaling operation relating to the first dimension, scaling the first polygon transversally according to second output from the iterative scaling operation relating to the second dimension, rotating the first polygon inversely using the angle of the heading, translating the first polygon inversely using the coordinates of the first pivot, converting the first polygon from Mercator coordinates, and clipping using the first polygon as input to define the polygon transformation.

In some examples, the iterative scaling operation of block 2606 may be a first iterative scaling operation. In this example, the process 2600 may further include the map server 122 selecting a second pivot point for the first polygon and performing a second iterative scaling operation with respect to the second pivot point. In this example, determining the polygon transformation of block 2612 may include determining the polygon transformation based on a comparison of first output from the first iterative scaling operation and second output from the second iterative scaling operation.

In some examples, performing the iterative scaling operation of block 2606 may include iteratively scaling the first polygon in the first dimension and the second dimension, respectively, according to a first set of predefined scaling factor parameter values for the first dimension and a second set of predefined scaling factor parameter values for the second dimension. In some examples, the first set of predefined scaling factor parameter values may be the same as the second set of predefined scaling factor parameter values. In some examples, the first set of predefined scaling factor parameter values may include values between 0.500 and 1.0. In some examples, the first dimension, the second dimension, the first set of predefined scaling factor parameter values, and the second set of predefined scaling factor parameter values are represented in a two-dimensional search space. In some examples, performing the iterative scaling operation comprises performing a linear walk through the two-dimensional search space. In this example, determining, based on the iterative scaling operation, the polygon transformation that avoids the intersection condition of block 2612 may include identifying a cell in the two-dimensional search space that corresponds to a first parameter value of the first set of predefined scaling factor parameter values and a second parameter value of a second set of predefined scaling factor parameter values.

At block 2614, the process 2600 includes the map server 122 causing rendering of a map view that includes the polygon transformation. This may be on a display of a user device. In some examples, causing rendering of the polygon transformation at block 2614 may include presenting the polygon transformation for user review and approval, and causing rendering may further include causing rendering of the first polygon and the second polygon.

In some examples, the process 2600 further includes generating a score for the polygon transformation based on an area of the polygon transformation divided by a number of vertices in the polygon transformation, and prior to causing rendering, selecting the polygon transformation from among a set of potential polygon transformations based on the score.

Color Adjustments

Figure 27:
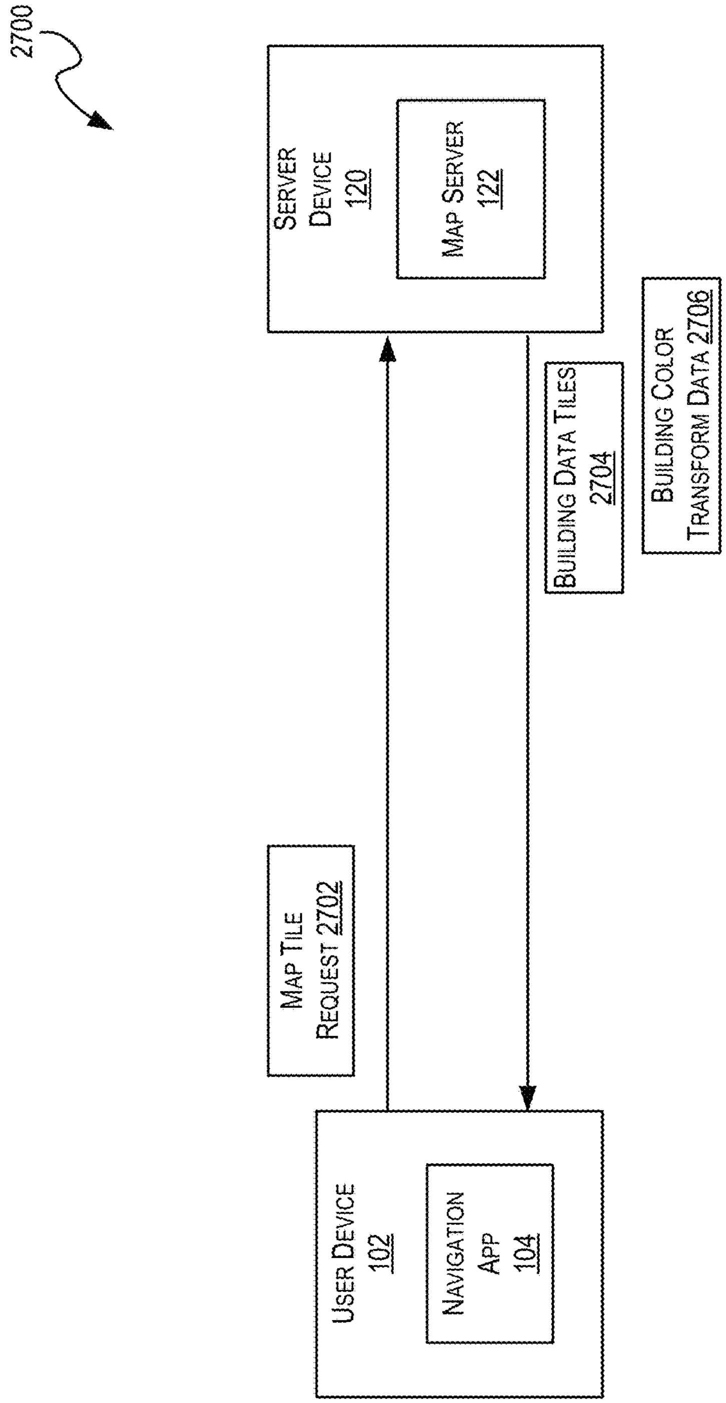
FIG. 27 is a block diagram of an example system for adjusting building colors for different map modes, according to at least one example.

FIG. 27 is a block diagram of an example system 2700 for adjusting building colors for different map modes, according to at least one example. For example, the system 2700 can correspond to the system 100 described above. The system 2700 can be configured to add building colors (e.g., to buildings, houses, offices, bridges, other structures) to building map data that are both realistic and visually appealing when presented on a map. This can be done by using real-world color data for buildings and adjusting the real-world color data in visually appealing way according to the map mode and/or context.

Like the system 100, the system 2700 can include the server device 120 and the map server 122. The map server 122 can obtain ground truth building data representing real-world building wall colors. The ground truth data can be obtained from mapping vehicles, aerial imagery, satellite imagery, etc. After obtaining the ground truth building data, the map server 122 can generate building data tiles having geometries and materials representing the buildings described in the ground truth building data. For example, the geometries can be polygons describing the shapes of buildings. The materials can provide textures and/or coloring for the different types of buildings described in the ground truth data. For example, there may be a number of base materials (e.g., default, commercial, venue) that affect the appearance of a building when presented on a map. The map server 122 can encode the real-world building wall colors obtained from the ground truth building data as material modifiers for each building in the building data tiles, in addition to the base materials. These color modifiers can be stored as quantized RGB values and can be efficiently compressed in the building data tiles. By using material modifiers instead of materials, the map server 122 can avoid creating a separate material for each building, which would increase tile size and may hurt client-side performance.

In some examples, the navigation application 104 may send a map tile request 2702 to the map server 122. For example, the map tile request 2702 may include a request for building data tiles. A request for building data tiles may be inherent in the map tile request 2702. In response to the map tile request 2702, the map server 122 can send building data tiles 2704 to the navigation application 104.

In some examples, the navigation application 104 can download building color transform data 2706. For example, the building data tiles 2704 can include building color transform data 2706. The navigation application 104 may download building color transform data 2706 separately from building data tiles 2704. Building color transform data 2706 can, for example, include a stylesheet that describes how to transform the saturation range, brightness range, and albedo factor of the building colors (e.g., the real-world building colors defined in the building data tiles 2704), as well as how to transform the colors for different map modes (transit, day, night, etc.). These color transformations can done in YCbCr color space because YCbCr color space is efficient and perceptually uniform, which avoids accumulating errors when rendering on the user device 102. In some examples, the navigation application 104 on the user device 102 can obtain the building colors from each tile and create a palette texture based on building color transform data 2706 so that the navigation application 104 can render all the building colors in a single draw call.

Figure 28:
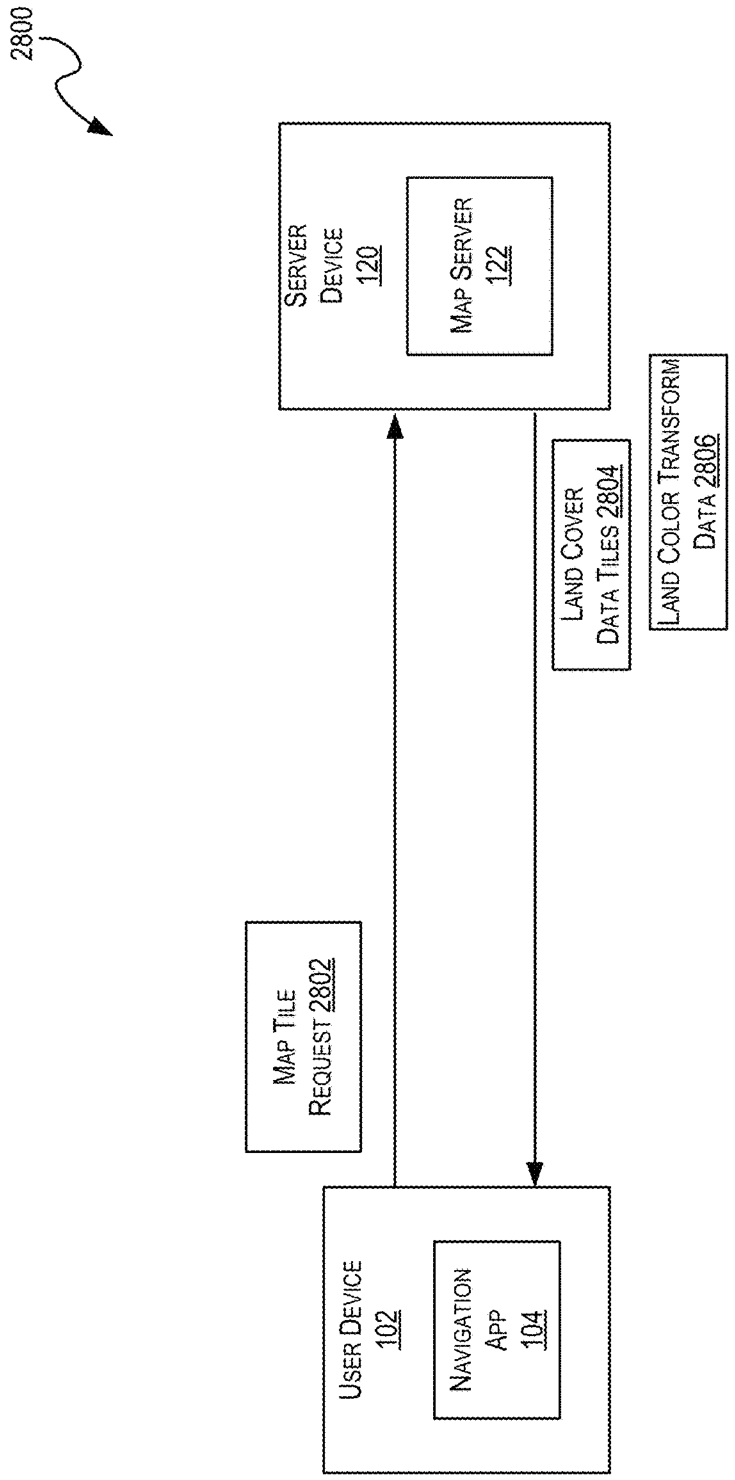
FIG. 28 is a block diagram of an example system for applying color shifts to land cover presented on a map, according to at least one example.

FIG. 28 is a block diagram of an example system 2800 for applying color shifts to land cover presented on a map, according to at least one example. For example, system 2800 can correspond to the system 100 described above. System 2800 can be configured to apply color shifts (e.g., shifts in color, saturation, brightness) to ground cover to make the ground cover look cooler or warmer, or wetter or drier, based on temperature data and/or precipitation data. For example, system 2800 can combine temperature and precipitation data to modify land cover data for rendering on a client device (e.g., the user device 102).

System 2800 can include the server device 120. The server device 120 can include the map server 122. In some examples, the map server 122 can obtain global data for land cover (forest, urban shrubland, etc.), annual precipitation (very wet, wet, moist, dry, etc.), and annual temperature (very cold, cold, cool, warm, etc.). The global data can be obtained from one or more map data vendors, as described above. The land cover data, precipitation data, and/or temperature data can be described using polygons. For example, a particular polygon can be used to describe land cover, annual precipitation, or temperature data for a corresponding geographic area. The map server 122 can rasterize the polygons and compress them into vector tiles. Land cover may be encoded at a high resolution, while temperature and precipitation data may be encoded at lower resolutions.

System 2800 can include the navigation application 104. In some examples, the navigation application 104 may send a map tile request 2802 to the map server 122. For example, the map tile request 2802 may include a request for land cover data tiles. A request for land cover data tiles may be inherent in the map tile request 2802. A request for land cover data tiles may be sent separately from map tile request 2802. In response to the map tile request 2802, the map server 122 can send land cover data tiles 2804 to the navigation application 104.

In some examples, the navigation application 104 can download land color transform data 2806. For example, the land cover data tiles 2804 can include land color transform data 2806. The navigation application 104 may download land color transform data 2806 separately from land cover data tiles 2804. Land color transform data 2806 can, for example, include a stylesheet that maps land cover types to representative colors. For example, the colors representing each land cover type can be defined in the RGB (red, green, blue,) color space. In some examples, the stylesheet can include color shifts in HSV (hue, saturation, value) color space for different temperature and precipitation values. For example, the navigation application 104 can convert the RGB land cover colors to HSV colors and then apply the color shifts for temperature and precipitation. For example, the navigation application 104 can render hot and dry land cover with warmer, redder colors, while the navigation application 104 can render cool and wet land cover with cooler, bluer colors. Because the climate is a coarse raster, the navigation application 104 can interpolate between the raster values to create smooth transitions between different climate zones.

By applying color shifts to land cover types, the navigation application 104 can render a map with a more interesting and appealing look. For example, since there are only a few land cover types, the typical map looks dull and lifeless if the typical one-to-one mapping of land cover to color is used. For example, barren land in the Sahara Desert would look the same as barren land in the Himalaya Mountains, or shrubland in Siberia would look the same as shrubland in the African Serengeti. By applying color shifts based on temperature and precipitation to typical land cover colors, the navigation application 104 can render a map that is more dynamic, interesting, and informative to the user.

Adjusting Terrain Appearance

In some examples, the map server 122 and/or the navigation application 104 can perform zoom based elevation scaling. For example, a configuration file can including data specifying what scale factor should be applied to the terrain for each integer camera zoom level. If the current zoom level is non-integer, the zoom level is interpolated between the two nearest defined scale factors. At a certain zoom level where the map server 122 and/or the navigation application 104 do not have any elevation data, the terrain elevation is scaled to zero over a time period until it is flat. During that period, vertex normals are correspondingly scaled to smoothly fade out the shading detail.

In some examples, the map server 122 and/or the navigation application 104 can perform selective terrain exaggeration. For example, buildings and instanced assets can be considered height-preserving (i.e. no exaggerated scaling should be performed). All non-instanced geometry is considered to be exaggerated.

In some examples, building vertex elevations can be separated into two components (1: a 'scaling' elevation and 2: a 'fixed' elevation offset from this point. Final vertex elevation can be determined by summing the former elevation by the exaggeration scale and adding this latter fixed offset. For example, buildings can be composed of building sections, for which a vertex loop, defining the lower vertices of a building cross-section in the XY plane, exactly one 'top elevation' and one terrain pivot elevation is provided. The terrain pivot elevation can be calculated to be the maximum terrain elevation of all the section's vertices.

The building section can be considered 'floating' when the maximum elevation of a section's loop vertices is above its terrain pivot elevation. The building section can be rendered as an extruded polygonal section, considering of a floor polygon extruded to a ceiling polygon (whose vertices all have the top elevation when no scaling is applied). The ceiling polygon 'scaling' elevation of each vertex are set to the section's terrain pivot elevation and the fixed component is set to the difference between the sections 'top elevation' and this pivot elevation. The elevation of each floor polygon vertex can be set to the section's terrain pivot elevation. If the section is considered floating (see above), the fixed offset is set to the difference between the sections 'top elevation' and this pivot elevation. Otherwise, it is set to the difference between the sections 'top elevation' and the vertex loops elevation.

The above logic allows buildings to seamlessly sit on top of exaggerated terrain, even if they are on sloping terrain. It also allows floating sections to float at the correct elevation relative to their chosen scaling pivot. Landmarks/Trees are instanced assets: the instance transformation translation Z is scaled only; the vertices themselves do not undergo any additional 'exaggeration' scaling.

In some examples, the map server 122 and/or the navigation application 104 can perform selective terrain normal smoothing. For example, terrain normal smoothing can be performed such that peaks and/or ridges are preserved. Whether the edge is considered 'hard' or 'soft' is based on the angle between the normals of adjacent faces which share that edge. If the angle is below a configuration threshold, the edge is considered 'soft'. For a given vertex of a mesh, the incident edges which are 'hard' provide boundaries to weighted averaging of the face normals (according to their area) used to generate that vertex normal. Thus each input vertex will generate potentially multiple 'rendering vertices' with potentially different normals.

The normals of the rendering vertices are linearly interpolated along an edge by conventional shading rules (and normalized per pixel in the shader). This means triangles which share soft edges have normals which are continuous and 'hard edges' (which are more likely to represent peaks since peaks tend to have larger angles between adjacent faces) have a discontinuous boundary between adjacent faces. For example, the normals of the faces are taken into consideration when the terrain is simplified at lower detail tile levels.

Graphical User Interfaces

This disclosure above describes various Graphical User Interfaces (GUIs) for implementing various features, processes or workflows. These GUIs can be presented on a variety of electronic devices including but not limited to laptop computers, desktop computers, computer terminals, television systems, tablet computers, e-book readers and smart phones. One or more of these electronic devices can include a touch-sensitive surface. The touch-sensitive surface can process multiple simultaneous points of input, including processing data related to the pressure, degree or position of each point of input. Such processing can facilitate gestures with multiple fingers, including pinching and swiping.

When the disclosure refers to "select" or "selecting" user interface elements in a GUI, these terms are understood to include clicking or "hovering" with a mouse or other input device over a user interface element, or touching, tapping or gesturing with one or more fingers or stylus on a user interface element. User interface elements can be virtual buttons, menus, selectors, switches, sliders, scrubbers, knobs, thumbnails, links, icons, radio buttons, checkboxes and any other mechanism for receiving input from, or providing feedback to a user.

Privacy

As described above, one aspect of the present technology is the gathering and use of data available from various sources to provide map information and/or navigation instructions to the user. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to provide map information and/or navigation instructions to the user. Further, other uses for personal information data that benefit the user are also contemplated by the present disclosure. For instance, health and fitness data may be used to provide insights into a user's general wellness or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for keeping personal information data private and secure. Such policies should be easily accessible by users and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, when providing map information and/or navigation instructions to the user, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, provision of map information and/or navigation instructions to the user can be based on non-personal information data or a bare minimum amount of personal information, such as the content being requested by the device associated with a user, other non-personal information available to the navigation and/or map services, or publicly available information.

Example System Architecture

Figure 29:
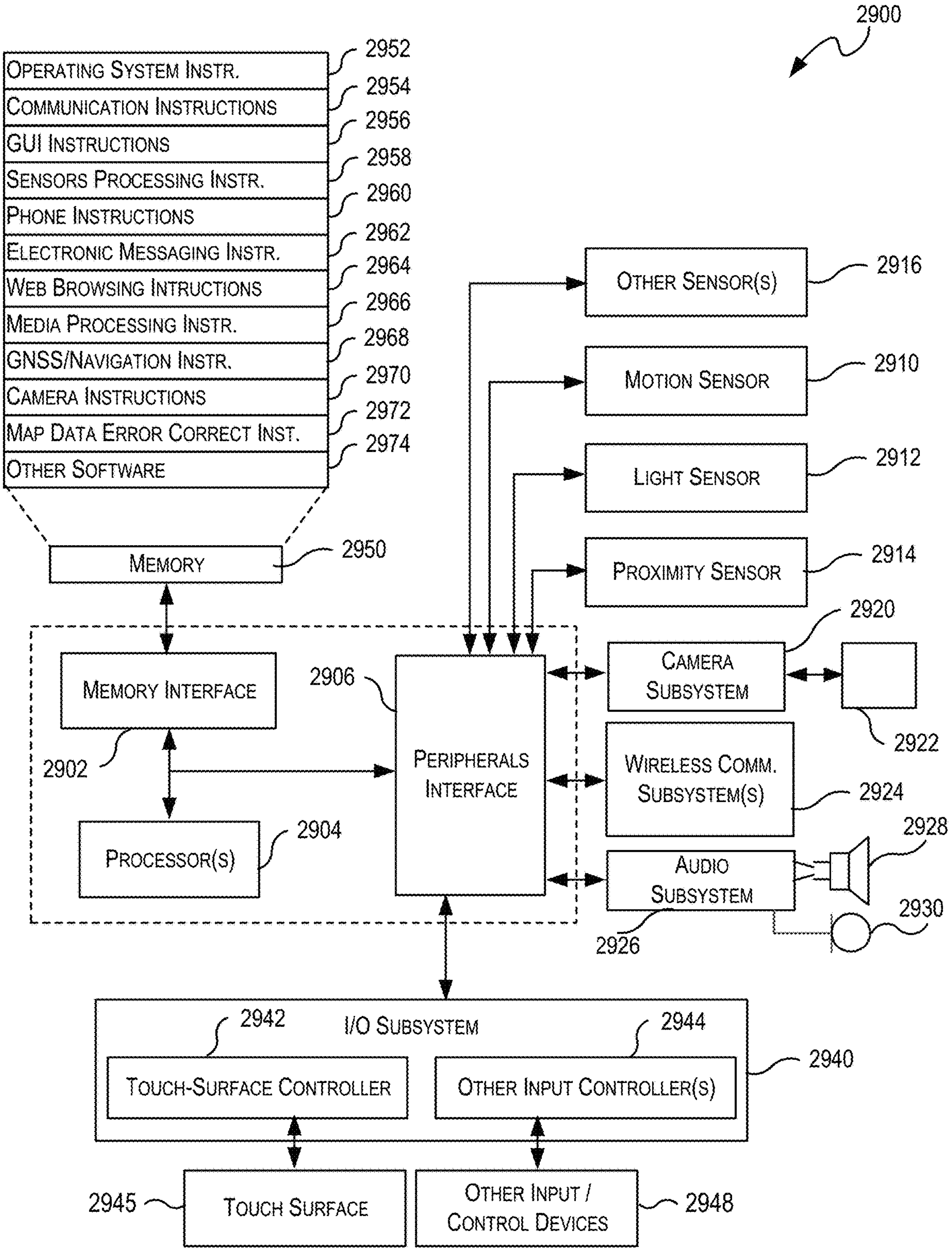
FIG. 29 is a block diagram of an example computing device configured to implement techniques described herein, according to at least one example.

FIG. 29 is a block diagram of an example computing device 2900 that can implement the features and processes of FIGS. 1-28, according to at least one example. The computing device 2900 is an example of the user device 102, the server device 120, the server device 140, and the server device 150. The computing device 2900 can include a memory interface 2902, one or more data processors, image processors and/or central processing units 2904, and a peripherals interface 2906. The memory interface 2902, the one or more processors 2904 and/or the peripherals interface 2906 can be separate components or can be integrated in one or more integrated circuits. The various components in the computing device 2900 can be coupled by one or more communication buses or signal lines.

Sensors, devices, and subsystems can be coupled to the peripherals interface 2906 to facilitate multiple functionalities. For example, a motion sensor 2910, a light sensor 2912, and a proximity sensor 2914 can be coupled to the peripherals interface 2906 to facilitate orientation, lighting, and proximity functions. Other sensors 2916 can also be connected to the peripherals interface 2906, such as a global navigation satellite system (GNSS) (e.g., GPS receiver), a temperature sensor, a biometric sensor, magnetometer or other sensing device, to facilitate related functionalities.

A camera subsystem 2920 and an optical sensor 2922 (e.g., a charged coupled device (CCD) or a complementary metal-oxide semiconductor (CMOS) optical sensor) can be utilized to facilitate camera functions, such as recording photographs and video clips. The camera subsystem 2920 and the optical sensor 2922 can be used to collect images of a user to be used during authentication of a user (e.g., by performing facial recognition analysis).

Communication functions can be facilitated through one or more wireless communication subsystems 2924, which can include radio frequency receivers and transmitters and/or optical (e.g., infrared) receivers and transmitters. The specific design and implementation of the communication subsystem 2924 can depend on the communication network(s) over which the computing device 2900 is intended to operate. For example, the computing device 2900 can include communication subsystems 2924 designed to operate over a GSM network, a GPRS network, an EDGE network, a Wi-Fi or WiMax network, and a Bluetooth™ network. In particular, the wireless communication subsystems 2924 can include hosting protocols such that the device 100 can be configured as a base station for other wireless devices.

An audio subsystem 2926 can be coupled to a speaker 2928 and a microphone 2930 to facilitate voice-enabled functions, such as speaker recognition, voice replication, digital recording, and telephony functions. The audio subsystem 2926 can be configured to facilitate processing voice commands, voice printing and voice authentication, for example.

The I/O subsystem 2940 can include a touch-surface controller 2942 and/or other input controller(s) 2944. The touch-surface controller 2942 can be coupled to a touch surface 2946. The touch surface 2946 and touch-surface controller 2942 can, for example, detect contact and movement or break thereof using any of a plurality of touch sensitivity technologies, including, but not limited to, capacitive, resistive, infrared, and surface acoustic wave technologies, as well as other proximity sensor arrays or other elements for determining one or more points of contact with the touch surface 2946.

The other input controller(s) 2944 can be coupled to other input/control devices 2948, such as one or more buttons, rocker switches, thumbwheel, infrared port, USB port, and/or a pointer device such as a stylus. The one or more buttons (not shown) can include an up/down button for volume control of the speaker 2928 and/or the microphone 2930.

In one implementation, a pressing of the button for a first duration can disengage a lock of the touch surface 2946; and a pressing of the button for a second duration that is longer than the first duration can turn power to the computing device 2900 on or off. Pressing the button for a third duration can activate a voice control, or voice command, module that enables the user to speak commands into the microphone 2930 to cause the device to execute the spoken command. The user can customize a functionality of one or more of the buttons. The touch surface 2946 can, for example, also be used to implement virtual or soft buttons and/or a keyboard.

In some examples, the computing device 2900 can present recorded audio and/or video files, such as MP3, AAC, and MPEG files. In some examples, the computing device 2900 can include the functionality of an MP3 player, such as an iPod™.

The memory interface 2902 can be coupled to memory 2950. The memory 2950 can include high-speed random-access memory and/or non-volatile memory, such as one or more magnetic disk storage devices, one or more optical storage devices, and/or flash memory (e.g., NAND, NOR). The memory 2950 can store an operating system 2952, such as Darwin, RTXC, LINUX, UNIX, OS X, WINDOWS, or an embedded operating system such as VxWorks.

The operating system 2952 can include instructions for handling basic system services and for performing hardware dependent tasks. In some examples, the operating system 2952 can be a kernel (e.g., UNIX kernel). In some examples, the operating system 2952 can include instructions for performing map data error correction. For example, operating system 2952 can implement the map data error correction features as described with reference to FIGS. 1-29.

The memory 2950 can also store communication instructions 2954 to facilitate communicating with one or more additional devices, one or more computers and/or one or more servers. The memory 2950 can include graphical user interface instructions 2956 to facilitate graphic user interface processing; sensor processing instructions 2958 to facilitate sensor-related processing and functions; phone instructions 2960 to facilitate phone-related processes and functions; electronic messaging instructions 2962 to facilitate electronic-messaging related processes and functions; web browsing instructions 2964 to facilitate web browsing-related processes and functions; media processing instructions 2966 to facilitate media processing-related processes and functions; GNSS/Navigation instructions 2968 to facilitate GNSS and navigation-related processes and instructions; and/or camera instructions 2970 to facilitate camera-related processes and functions.

The memory 2950 can store software instructions 2972 to facilitate other processes and functions, such as the map data error correction processes and functions as described with reference to FIGS. 1-28.

The memory 2950 can also store other software instructions 2974, such as web video instructions to facilitate web video-related processes and functions; and/or web shopping instructions to facilitate web shopping-related processes and functions. In some examples, the media processing instructions 2966 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. The memory 2950 can include additional instructions or fewer instructions. Furthermore, various functions of the computing device 2900 can be implemented in hardware and/or in software, including in one or more signal processing and/or application specific integrated circuits.

Figure 30:
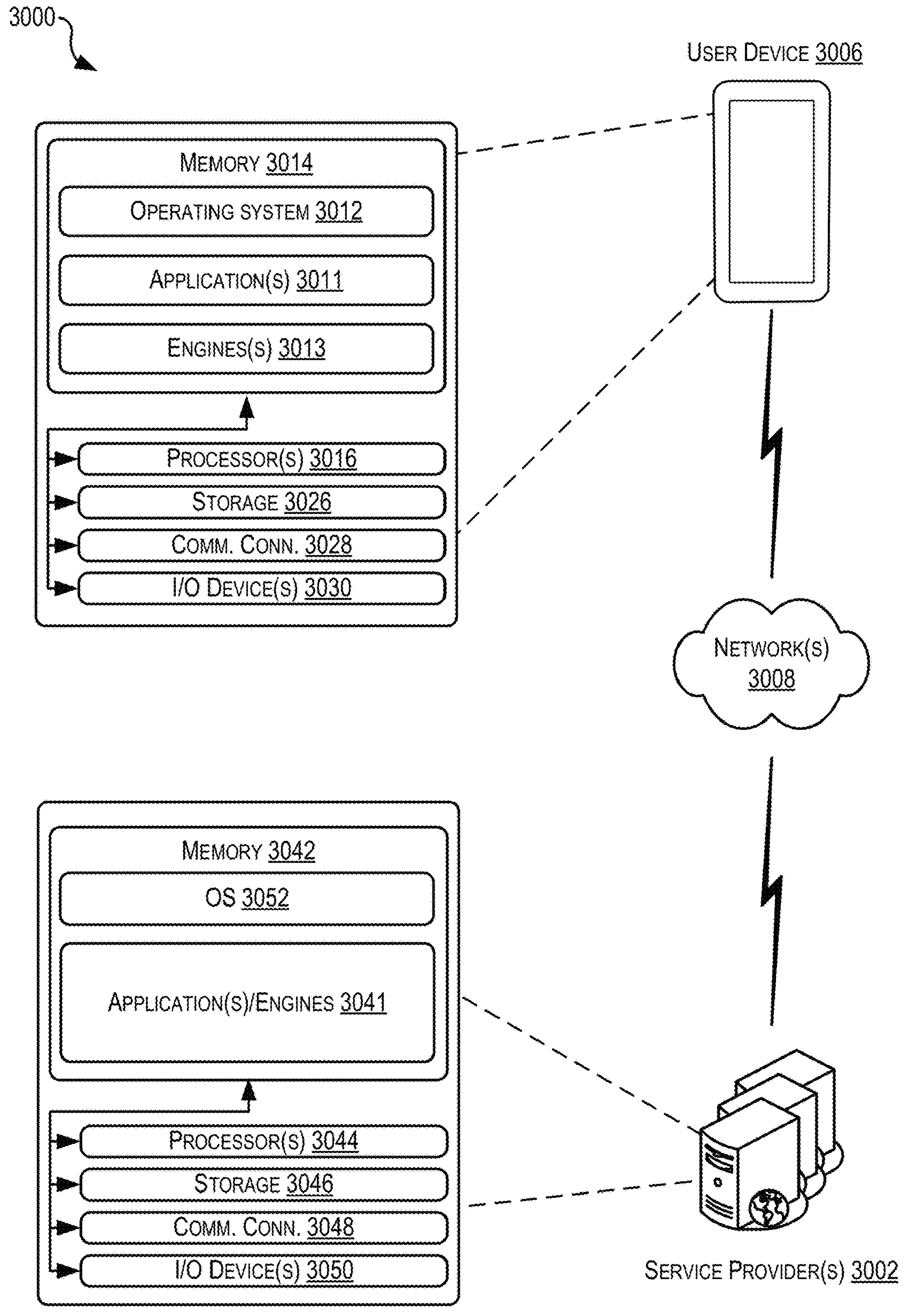
FIG. 30 illustrates an example architecture or environment configured to implement techniques described herein, according to at least one example.

FIG. 30 illustrates an example architecture or environment 3000 configured to implement techniques described herein, according to at least one example. The architecture 3000 includes a user device 3006 (e.g., the user device 102) and a service provider computer 3002 (e.g., the map server 122). In some examples, the example architecture 3000 may further be configured to enable the user device 3006 and the service provider computer 3002 to share information. In some examples, the devices may be connected via one or more networks 3008 (e.g., via Bluetooth, WiFi, the Internet). In some examples, the service provider computer 3002 may be configured to implement at least some of the techniques described herein with reference to the user device 3006 and vice versa.

In some examples, the networks 3008 may include any one or a combination of many different types of networks, such as cable networks, the Internet, wireless networks, cellular networks, satellite networks, other private and/or public networks, or any combination thereof. While the illustrated example represents the user device 3006 accessing the service provider computer 3002 via the networks 3008, the described techniques may equally apply in instances where the user device 3006 interacts with the service provider computer 3002 over a landline phone, via a kiosk, or in any other manner. It is also noted that the described techniques may apply in other client/server arrangements (e.g., set-top boxes), as well as in non-client/server arrangements (e.g., locally stored applications, peer-to-peer configurations).

As noted above, the user device 3006 may be any type of computing device such as, but not limited to, a mobile phone, a smartphone, a personal digital assistant (PDA), a laptop computer, a desktop computer, a thin-client device, a tablet computer, a wearable device such as a smart watch, an electronic device in a moveable vehicle or transport device, or the like. In some examples, the user device 3006 may be in communication with the service provider computer 3002 via the network 3008, or via other network connections.

In one illustrative configuration, the user device 3006 may include at least one memory 3014 and one or more processing units (or processor(s)) 3016. The processor(s) 3016 may be implemented as appropriate in hardware, computer-executable instructions, firmware, or combinations thereof. Computer-executable instructions or firmware implementations of the processor(s) 3016 may include computer-executable or machine-executable instructions written in any suitable programming language to perform the various functions described. The user device 3006 may also include geo-location devices (e.g., a global positioning system (GPS) device or the like) for providing and/or recording geographic location information associated with the user device 3006. In some examples, the processors 3016 may include a GPU and a CPU.

The memory 3014 may store program instructions that are loadable and executable on the processor(s) 3016, as well as data generated during the execution of these programs. Depending on the configuration and type of the user device 3006, the memory 3014 may be volatile (such as random access memory (RAM)) and/or non-volatile (such as read-only memory (ROM), flash memory). The user device 3006 may also include additional removable storage and/or non-removable storage 3026 including, but not limited to, magnetic storage, optical disks, and/or tape storage. The disk drives and their associated non-transitory computer-readable media may provide non-volatile storage of computer-readable instructions, data structures, program modules, and other data for the computing devices. In some examples, the memory 3014 may include multiple different types of memory, such as static random access memory (SRAM), dynamic random access memory (DRAM), or ROM. While the volatile memory described herein may be referred to as RAM, any volatile memory that would not maintain data stored therein once unplugged from a host and/or power would be appropriate.

The memory 3014 and the additional storage 3026, both removable and non-removable, are all examples of non-transitory computer-readable storage media. For example, non-transitory computer-readable storage media may include volatile or non-volatile, removable or non-removable media implemented in any method or technology for storage of information such as computer-readable instructions, data structures, program modules, or other data. The memory 3014 and the additional storage 3026 are both examples of non-transitory computer-storage media. Additional types of computer-storage media that may be present in the user device 3006 may include, but are not limited to, phase-change RAM (PRAM), SRAM, DRAM, RAM, ROM, Electrically Erasable Programmable Read-Only Memory (EEPROM), flash memory or other memory technology, compact disc read-only memory (CD-ROM), digital video disc (DVD) or other optical storage, magnetic cassettes, magnetic tape, magnetic disk storage or other magnetic storage devices, or any other medium that can be used to store the desired information and that can be accessed by the user device 3006. Combinations of any of the above should also be included within the scope of non-transitory computer-readable storage media. Alternatively, computer-readable communication media may include computer-readable instructions, program modules, or other data transmitted within a data signal, such as a carrier wave, or other transmission. However, as used herein, computer-readable storage media does not include computer-readable communication media.

The user device 3006 may also contain communications connection(s) 3028 that allow the user device 3006 to communicate with a data store, another computing device or server, user terminals, and/or other devices via the network 3008. The user device 3006 may also include I/O device(s) 3030, such as a keyboard, a mouse, a pen, a voice input device, a touch screen input device, a display, speakers, and a printer.

Turning to the contents of the memory 3014 in more detail, the memory 3014 may include an operating system 3012 and/or one or more application programs or services for implementing the features disclosed herein such as applications 3011 (e.g., the navigation application 104, other map applications, web application) and map engine 3013. The techniques described with respect to FIGS. 1-28 may be performed by the map engine 3013.

The service provider computer 3002 may also be any type of computing device such as, but not limited to, a collection of virtual or "cloud" computing resources, a remote server, a mobile phone, a smartphone, a PDA, a laptop computer, a desktop computer, a thin-client device, a tablet computer, a wearable device, a server computer, or a virtual machine instance. In some examples, the service provider computer 3002 may be in communication with the user device 3006 via the network 3008, or via other network connections.

In one illustrative configuration, the service provider computer 3002 may include at least one memory 3042 and one or more processing units (or processor(s)) 3044. The processor(s) 3044 may be implemented as appropriate in hardware, computer-executable instructions, firmware, or combinations thereof. Computer-executable instructions or firmware implementations of the processor(s) 3044 may include computer-executable or machine-executable instructions written in any suitable programming language to perform the various functions described.

The memory 3042 may store program instructions that are loadable and executable on the processor(s) 3044, as well as data generated during the execution of these programs. Depending on the configuration and type of service provider computer 3002, the memory 3042 may be volatile (such as RAM) and/or non-volatile (such as ROM and flash memory). The service provider computer 3002 may also include additional removable storage and/or non-removable storage 3046 including, but not limited to, magnetic storage, optical disks, and/or tape storage. The disk drives and their associated non-transitory computer-readable media may provide non-volatile storage of computer-readable instructions, data structures, program modules, and other data for the computing devices. In some examples, the memory 3042 may include multiple different types of memory, such as SRAM, DRAM, or ROM. While the volatile memory described herein may be referred to as RAM, any volatile memory that would not maintain data stored therein, once unplugged from a host and/or power, would be appropriate. The memory 3042 and the additional storage 3046, both removable and non-removable, are both additional examples of non-transitory computer-readable storage media.

The service provider computer 3002 may also contain communications connection(s) 3048 that allow the service provider computer 3002 to communicate with a data store, another computing device or server, user terminals, and/or other devices via the network 3008. The service provider computer 3002 may also include I/O device(s) 3050, such as a keyboard, a mouse, a pen, a voice input device, a touch input device, a display, speakers, and a printer.

Turning to the contents of the memory 3042 in more detail, the memory 3042 may include an operating system 3052 and/or one or more application programs 3041 or services for implementing the features disclosed herein such as those described with reference to FIGS. 1-28.

In the following, further clauses are described to facilitate the understanding of the present disclosure.

Clause 1. A computer-implemented method, comprising:

- determining a boundary polygon corresponding to a first terrain mesh, the boundary polygon comprising a set of candidate points that excludes any collinear points;
- determining a triangulation for the boundary polygon based on the set of candidate points, the triangulation defining a plurality of triangles within the boundary polygon;
- performing a simplification operation for a first triangle of the plurality of triangles by at least:
- determining first vertical elevations for individual candidate points within the first triangle;
- determining vertical errors for the individual candidate points in the first triangle by comparing the first vertical elevations with corresponding second vertical elevations obtained from the first terrain mesh; and
- adding a first candidate point to a second terrain mesh based on a first vertical error of the first candidate point; and
- causing rendering, on a display, of a map view that includes the second terrain mesh including the first candidate point.

Clause 2. The computer-implemented method of clause 1, further comprising, while a vertical error of any candidate point within the plurality of triangles is greater than a vertical error threshold, iteratively:

- adding candidate points to individual triangles of the plurality of triangles;
- updating vertical errors for candidate points within the individual triangles of the plurality of triangles; and
- determining new triangles based on the candidate points within the individual triangles.

Clause 3. The computer-implemented method of clause 1, further comprising iteratively performing the simplification operation for each triangle of the plurality of triangles.

Clause 4. The computer-implemented method of clause 1, wherein the simplification operation further comprises determining an updated triangulation for the first triangle based on the first candidate point, the updated triangulation defining a plurality of updated triangles within the first triangle.

Clause 5. The computer-implemented method of clause 4, further comprising iteratively performing the simplification operation for each updated triangle of the plurality of updated triangles.

Clause 6. The computer-implemented method of clause 1, wherein the first vertical error comprises a maximum vertical error among the vertical errors.

Clause 7. The computer-implemented method of clause 1, further comprising:

- determining a composite vertical error for the first triangle based on the vertical errors; and
- ceasing performing of the simplification operation based on a comparison of the composite vertical error with a vertical error threshold.

Clause 8. The computer-implemented method of clause 7, wherein the vertical error threshold comprises a predefined value that represents a maximum allowable elevation differences between the first terrain mesh and the second terrain mesh.

Clause 9. The computer-implemented method of clause 1, wherein the set of candidate points comprises a set of vertices on the boundary polygon, wherein the individual candidate points within the first triangle comprise a subset of the set of vertices.

Clause 10. The computer-implemented method of clause 1, wherein the second vertical elevations comprise ground truth elevations.

Clause 11. The computer-implemented method of clause 1, wherein the first terrain mesh comprises a first set of triangles and the second terrain mesh comprises a second set of triangles that includes fewer triangles than the first set of triangles.

Clause 12. The computer-implemented method of clause 1, wherein the first terrain mesh occupies more memory than the second terrain mesh.

Clause 13. The computer-implemented method of clause 1, wherein adding the first candidate point to the second terrain mesh comprises using Delaunay Triangulation.

Clause 14. The computer-implemented method of clause 1, further comprising iteratively determining edge swapping by at least:

- identifying, from the second terrain mesh, a plurality of edges, wherein individual edges of the plurality of edges are shared among two triangles of the second terrain mesh;
- for each individual edge, computing a first volume of the two triangles that share the respective edge;
- for each first computed volume, comparing the first computing volume with a second volume of triangles from first terrain mesh that are located at the same coordinates as the two triangles; and
- swapping individual edges between vertices of the two triangles based on the comparing; and
- updating the second terrain mesh with triangles having swapped edges.

Clause 15. The computer-implemented method of clause 1, further comprising iteratively evaluating points in the second terrain mesh by at least:

- selecting a first point of the second terrain mesh;
- computing a volume of a cone generated by a patch comprising faces formed by edges incident the first point;
- removing the first point from the second terrain mesh based on the volume;
- recomputing triangles for the patch without the first point; and
- updating the second terrain mesh based on the recomputed triangles.

Clause 16. One or more non-transitory computer-readable storage devices comprising computer-executable instructions that, when executed by a computer system, causes the computer system to perform the method of clauses 1-15.

Clause 17. A system, comprising:

- one or more memories for storing computer-executable instructions; and
- one or more processors configured access the one or more memories and execute the computer-executable instructions to perform the method of any of clauses 1-15.

Clause 18. A computer-implemented method, comprising:

determining, in accordance with an elevation criterion, an elevation anomaly data point in a joined region defined by a first elevation dataset and a second elevation dataset;

determining, in accordance with a buffer criterion, a set of buffer points surrounding the elevation anomaly data point, the set of buffer points comprising a set of elevation anomaly points comprising the elevation anomaly data point and at least one other elevation anomaly data point;

determining interpoint distances between buffer point in the set of buffer points;

determining, for at least one buffer point of the set of buffer points, a reduction factor based a first interpoint distance for the at least one buffer point and a first elevation value of the at least one buffer point;

applying the reduction factor to the at least one buffer point to adjust the first elevation value; and causing rendering, on a display, of a map view that includes the at least one buffer point with the adjusted first elevation value.

Clause 19. The computer-implemented method of clause 18, wherein the elevation criterion corresponds to a threshold elevation difference between the first elevation dataset and the second elevation dataset.

Clause 20. The computer-implemented method of clause 19, wherein the elevation anomaly data point comprises a first three-dimensional point on the first elevation dataset that has an elevation value that meets or exceeds the threshold elevation difference as compared to a second three-dimensional point on the second elevation dataset that corresponds to the first three-dimensional point.

Clause 21. The computer-implemented method of clause 18, further comprising accessing a polygon dataset that defines a boundary between the first elevation dataset and the second elevation dataset in the joined region, and wherein the elevation anomaly data point is defined at a portion of the polygon dataset.

Clause 22. The computer-implemented method of clause 21, wherein the first elevation dataset comprises a land digital elevation model, the second elevation dataset comprises a bathymetry, and the polygon dataset comprises a coastline.

Clause 23. The computer-implemented method of clause 18, wherein the buffer criterion corresponds a predefined radius surrounding the elevation anomaly data point, and wherein determining the set of buffer points surrounding the elevation anomaly data point comprises identifying the set of buffer points within the predefined radius.

Clause 24. The computer-implemented method of clause 18, wherein the reduction factor comprises a value that is greater than or equal to one, and wherein applying the reduction factor to the at least one buffer point to adjust the first elevation value comprises reducing the first elevation value by the value.

Clause 25. The computer-implemented method of clause 18, further comprising iteratively applying the reduction factor to other buffer points in the set of buffer points to adjust elevation values of the other buffer points.

Clause 26. The computer-implemented method of clause 25, wherein iteratively applying the reduction factor to the other buffer points produces a smooth transition between first elevation values of the first elevation dataset corresponding to elevation anomaly data points and second elevation values of the second elevation dataset corresponding to the set of buffer points.

Clause 27. The computer-implemented method of clause 18, further comprising iteratively repeating the method for other elevation anomaly data points in the joined region.

Clause 28. The computer-implemented method of clause 18, further comprising merging the set of buffer points into a first geometry representing the set of buffer points.

Clause 29. The computer-implemented method of clause 28, further comprising:

determining a different set of buffer points surrounding a different elevation anomaly data point;

merging the set of buffer points into a second geometry representing the different set of buffer points; and determining the interpoint distance comprises determining an interpoint distance between the first geometry and the second geometry.

Clause 30. The computer-implemented method of clause 18, wherein the first elevation dataset and the second elevation dataset were joined together using a merge function to define the joined region.

Clause 31. The computer-implemented method of clause 18, further comprising applying a different reduction factor to other buffer points to adjust elevation values of the other buffer points based on the reduction factor.

Clause 32. The computer-implemented method of clause 31, wherein applying the reduction factor and applying the different reduction factor comprises applying a cosine smoothing function to the at least one buffer point the other buffer points to create a slope between the first elevation dataset and the second elevation dataset surrounding the elevation anomaly data point.

Clause 33. The computer-implemented method of clause 18, wherein the map view comprises a three-dimensional map that includes the at least one buffer point with the adjusted first elevation value.

Clause 34. The computer-implemented method of clause 33, wherein causing rendering, on the display, of the map view comprises providing a portion of the three-dimensional map to a user device for the user device to render the map view on the display of the user device.

Clause 35. One or more non-transitory computer-readable storage devices comprising computer-executable instructions that, when executed by a computer system, causes the computer system to perform the method of clauses 18-34.

Clause 36. A system, comprising:

one or more memories for storing computer-executable instructions; and one or more processors configured access the one or more memories and execute the computer-executable instructions to perform the method of any of clauses 18-34.

Clause 37. A computer-implemented method, comprising:

identifying a subject polygon defined by a first polygon and a second polygon;

determining a plurality of line segments within the subject polygon and that define a medial axis of the subject polygon;

determining a plurality of faces within the subject polygon based on the plurality of line segments;

assigning a first face of the plurality of faces to the first polygon;

updating a first boundary of the first polygon to include a first face area corresponding to the first face; and causing rendering, on a display, of a map view that includes the updated first boundary.

Clause 38. The computer-implemented method of clause 37, wherein the subject polygon comprises a closed gap between the first polygon and the second polygon or an overlap between the first polygon and the second polygon.

Clause 39. The computer-implemented method of clause 37, wherein the medial axis of the subject polygon comprises a set of all points in the subject polygon that have more than one closest point on a polygon boundary of the subject polygon.

Clause 40. The computer-implemented method of clause 37, wherein each face of the plurality of faces comprises a distinct face area within a subject polygon boundary of the subject polygon, the subject polygon boundary defining a subject polygon area.

Clause 41. The computer-implemented method of clause 40, wherein determining the plurality of faces within the subject polygon based on the plurality of line segments comprises dividing the subject polygon area into the distinct face areas using the plurality of lines segments.

Clause 42. The computer-implemented method of clause 37, wherein assigning the first face to the first polygon comprises identifying a shared boundary between a portion of a subject polygon boundary of the subject polygon that includes the first face and a portion of the first polygon boundary, and wherein updating the first boundary of the first polygon comprises updating the first boundary based on the shared boundary.

Clause 43. The computer-implemented method of clause 37, wherein updating the first boundary of the first polygon comprises expanding the first boundary of the first polygon along a first face boundary corresponding to the first face and defining the first face area.

Clause 44. The computer-implemented method of clause 37, further comprising: assigning a second face of the plurality of faces to the second polygon; and updating a second boundary of the second polygon to include a second face area corresponding to the second face, and wherein causing rendering, on the display, of the map view comprises causing rendering of the map view that includes the updated first boundary and the updated second boundary.

Clause 45. The computer-implemented method of clause 37, wherein the subject polygon is defined by the first polygon, the second polygon, and a third polygon.

Clause 46. The computer-implemented method of clause 45, wherein the first face comprises a first shared boundary with the first polygon and a second shared boundary with the second polygon.

Clause 47. The computer-implemented method of clause 46, wherein assigning the first face of the plurality of faces to the first polygon comprises:

determining that a first length of the first shared boundary is greater than a second length of the second shared boundary; and assigning the first face to the first polygon based on the first length being greater than the second length.

Clause 48. The computer-implemented method of clause 37, wherein the first polygon has a first priority and the second polygon has a second priority, and wherein assigning the first face to the first polygon comprises assigning the first face based on the first priority being higher than the second priority.

Clause 49. The computer-implemented method of clause 37, wherein the first polygon corresponds to a first influence boundary of a first island and a second polygon corresponds to a second influence boundary of a second island.

Clause 50. The computer-implemented method of clause 49, wherein the subject polygon comprises an overlap between the first influence boundary and the second influence boundary.

Clause 51. One or more non-transitory computer-readable storage devices comprising computer-executable instructions that, when executed by a computer system, causes the computer system to perform the method of clauses 37-50.

Clause 52. A system, comprising:

one or more memories for storing computer-executable instructions; and one or more processors configured access the one or more memories and execute the computer-executable instructions to perform the method of any of clauses 37-50.

Clause 53. A computer-implemented method, comprising:

determining, by a driver node of a distributed computing framework, an overall adjacency graph for a plurality of input polygons, the overall adjacency graph comprising a plurality of nodes representing the plurality of input polygons and a plurality of edges representing a plurality of boundaries between input polygons of the plurality of input polygons that are adjacent;

at a first worker node of the distributed computing framework, generating, for a first input polygon, a first planar graph using the overall adjacency graph, the first planar graph representing particular input polygons that are adjacent to the first input polygon;

assigning, using the first planar graph, at least one of a first gap or a first overlap to the first input polygon or to a first particular input polygon that is adjacent to the first input polygon; and traverse the first planar graph to construct a first target polygon that includes at least one of a first assigned gap or a first assigned overlap; and causing rendering, on a display, of a map view that includes the first target polygon.

Clause 54. The computer-implemented method of clause 53, wherein determining the overall adjacency graph comprises:

distributing, by the driver node, the plurality of input polygons to a set of worker nodes of the distributed computing network, the set of worker nodes comprising the first worker node;

determining, by individual worker nodes, a plurality of adjacent polygons for each input polygon of the plurality of input polygons;

determining, by the individual worker nodes, a plurality of individual adjacency graphs corresponding to the plurality of adjacent polygons; and determining, by the driver node, the overall adjacency graph by combining the plurality of individual adjacency graphs.

Clause 55. The computer-implemented method of clause 54, wherein determining the plurality of adjacent polygons by the individual worker nodes is performed in parallel by the individual worker nodes.

Clause 56. The computer-implemented method of clause 54, wherein determining the plurality of adjacency graphs by the individual worker nodes is performed in parallel by the individual worker nodes.

Clause 57. The computer-implemented method of clause 54, further comprising, prior to determining the overall adjacency graph, receiving, by the driver node from the individual worker nodes, the plurality of individual adjacency graphs.

Clause 58. The computer-implemented method of clause 54, wherein determining the plurality of adjacent polygons for each input polygon of the plurality of input polygons comprises querying, by individual worker nodes, an index using a query bounding box to identify neighboring polygons corresponding to a single input polygon of the plurality of input polygons.

Clause 59. The computer-implemented method of clause 58, wherein the query bounding box is specific to each worker node and corresponds to a predefined area of a map that includes the plurality of input polygons.

Clause 60. The computer-implemented method of clause 58, wherein querying the index using the query bounding box returns the neighboring polygons that intersect the query bounding box.

Clause 61. The computer-implemented method of clause 58, wherein the neighboring polygons intersect the single input polygon.

Clause 62. The computer-implemented method of clause 58, wherein querying the index by the individual worker nodes is performed in parallel by the individual worker nodes.

Clause 63. The computer-implemented method of clause 53, further comprising:

at a second worker node of the distributed computing framework and in parallel with the first worker node, generating, for a second input polygon, a second planar graph using the overall adjacency graph, the second planar graph representing other input polygons that are adjacent to the second input polygon;

assigning, using the second planar graph, at least one of a second gap or a second overlap to the second input polygon or to a second other input polygon that is adjacent to the second input polygon; and traverse the second planar graph to construct a second target polygon that includes at least one of a second assigned gap or a second assigned overlap.

Clause 64. The computer-implemented method of clause 53, wherein the first gap comprises an area that is defined between the first input polygon and the particular input polygons and is unassigned to either of the first input polygon or any of the particular input polygons.

Clause 65. The computer-implemented method of clause 53, wherein the first overlap comprises an area that is defined the first input polygon overlapping a portion of at least one of the particular input polygons and is unassigned to either of the first input polygon or any of the particular input polygons.

Clause 66. The computer-implemented method of clause 53, wherein traversing the first planar graph to construct the first target polygon comprises changing a perimeter boundary of one of the first input polygon or the first particular input polygon to include at least one of the first assigned gap or the first assigned overlap.

Clause 67. The computer-implemented method of clause 53, wherein the plurality of input polygons represent a plurality of governmental boundaries.

Clause 68. One or more non-transitory computer-readable storage devices comprising computer-executable instructions that, when executed by a computer system, causes the computer system to perform the method of clauses 53-67.

Clause 69. A system, comprising:

one or more memories for storing computer-executable instructions; and one or more processors configured access the one or more memories and execute the computer-executable instructions to perform the method of any of clauses 53-67.

Clause 70. A computer-implemented method, comprising:

accessing a first set of polygons of a first type and a set of polylines of a second type;

grouping polygons of the first set of polygons into face groups based on centroids of the polygons, a first face group comprising at least one polygon of the first set of polygons that is oriented in a particular direction with respect to at least one polyline of the set of polylines;

determining that a first polygon of a first face group is anomalous based on a perimeter of the first polygon and a first property of a first polyline of the set of polylines; and for the first face group, computing a set of ideal push vectors for the first polyline based on the first property of the first polyline;

combining the set of ideal push vectors into a single vector; and applying the single vector to the first face group to translate at least one vertex of the first polygon with respect to the first polyline.

Clause 71. The computer-implemented method of clause 70, wherein the first type is a building type and the second type is a road type.

Clause 72. The computer-implemented method of clause 70, wherein the first polyline comprises a centerline of a road and the first property comprises a centerline offset value that defines a road edge with respect to the centerline.

Clause 73. The computer-implemented method of clause 72, wherein applying the single vector to the first face group translates the first polygon away from the centerline and to a point that is beyond the road edge.

Clause 74. The computer-implemented method of clause 70, wherein computing the set of ideal push vectors comprises determining the set of ideal push vectors based on a second property of the first polyline.

Clause 75. The computer-implemented method of clause 74, wherein the second property comprises a road class value for the first polyline.

Clause 76. The computer-implemented method of clause 70, wherein computing the set of ideal push vectors for the first polyline comprises computing an ideal push vector at each vertex of the first polyline that is opposite the first face group based on the first property of the first polyline.

Clause 77. The computer-implemented method of clause 76, further comprising, for the first face group, determining mean value coordinates for each vertex of the first polygon.

Clause 78. The computer-implemented method of clause 77, wherein combining the set of ideal push vectors into the single vector comprises using the mean value coordinates as weights for each vertex to define the single vector.

Clause 79. The computer-implemented method of clause 70, wherein the single vector is oriented perpendicular with respect to the first polygon.

Clause 80. The computer-implemented method of clause 70, wherein the first polygon belongs to the first face group and a second face group.

Clause 81. The computer-implemented method of clause 80, further comprising determining that the first polygon of the second face group is anomalous based on a perimeter of the first polygon and a second property of a second polyline of the set of polylines.

Clause 82. The computer-implemented method of clause 81, further comprising, for the second face group, computing a different set of ideal push vectors for the second polyline based on the second property of the second polyline;

combining the different set of ideal push vectors into a different single vector; and applying the different single vector to the second face group to translate the first polygon with respect to the second polyline.

Clause 83. The computer-implemented method of clause 70, wherein determining that the first polygon is anomalous comprises determining that a portion of the perimeter of the first polygon intersects a projection that is offset from the first polyline.

Clause 84. The computer-implemented method of clause 70, wherein the single vector comprises a vector field that is substantially continuous across the first polygon.

Clause 85. The computer-implemented method of clause 70, wherein the first face group comprises first polygons of the first of polygons that are located within a block that is bounded by at least two polylines of the set of polylines.

Clause 86. The computer-implemented method of clause 85, wherein each ideal push vector of set of ideal push vectors is perpendicular to a segment of the first polyline, comprises a length substantially equal to a road width, and is oriented towards an inside of the block that includes the first face group.

Clause 87. One or more non-transitory computer-readable storage devices comprising computer-executable instructions that, when executed by a computer system, causes the computer system to perform the method of clauses 70-86.

Clause 88. A system, comprising:

one or more memories for storing computer-executable instructions; and one or more processors configured access the one or more memories and execute the computer-executable instructions to perform the method of any of clauses 70-86.

Clause 89. A computer-implemented method, comprising:

identifying an intersection condition corresponding to an intersection between a first polygon of a first type and a second polygon of a second type, the first polygon comprising a set of edges connected by a set of vertexes;

selecting a first pivot point for the first polygon, the first pivot point comprising a vertex of the set of vertexes or a midpoint of one edge of the set of edges;

performing an iterative scaling operation comprising at least one of:

scaling the first polygon with respect to the first pivot point in a first dimension corresponding to a first heading of a set of headings; or scaling the first polygon with respect to the first pivot point in a second dimension corresponding to a second heading of the set of headings;

determining, based on the iterative scaling operation, a polygon transformation that avoids the intersection condition; and causing rendering, on a display, of a map view that includes the polygon transformation.

Clause 90. The computer-implemented method of clause 89, wherein the first polygon comprises a building and the second polygon comprises a road.

Clause 91. The computer-implemented method of clause 89, wherein the first type of polygon comprises a structure type and the second type of polygon comprises a transport type.

Clause 92. The computer-implemented method of clause 89, wherein the iterative scaling operation is a first iterative scaling operation, the method further comprising:

selecting a second pivot point for the first polygon; and performing a second iterative scaling operation with respect to the second pivot point, and wherein determining the polygon transformation comprises determining the polygon transformation based on a comparison of first output from the first iterative scaling operation and second output from the second iterative scaling operation.

Clause 93. The computer-implemented method of clause 89, further comprising determining a set of pivot points for the first polygon;

determining the set of headings corresponding to the set of pivot points; and determining a set of pivot-heading pairs by at least combing the set of pivot points with the set of headings.

Clause 94. The computer-implemented method of clause 93, wherein selecting the first pivot point comprises selecting a first pivot-heading pair, and wherein performing the iterative scaling operation comprises performing the iterative scaling operation using the first pivot-heading pair.

Clause 95. The computer-implemented method of clause 89, wherein performing the iterative scaling operation comprises iteratively scaling the first polygon in the first dimension and the second dimension, respectively, according to a first set of predefined scaling factor parameter values for the first dimension and a second set of predefined scaling factor parameter values for the second dimension.

Clause 96. The computer-implemented method of clause 95, wherein the first set of predefined scaling factor parameter values is the same as the second set of predefined scaling factor parameter values.

Clause 97. The computer-implemented method of clause 95, wherein the first set of predefined scaling factor parameter values comprises values between 0.500 and 1.0.

Clause 98. The computer-implemented method of clause 95, wherein the first dimension, the second dimension, the first set of predefined scaling factor parameter values, and the second set of predefined scaling factor parameter values are represented in a two-dimensional search space.

Clause 99. The computer-implemented method of clause 98, wherein performing the iterative scaling operation comprises performing a linear walk through the two-dimensional search space.

Clause 100. The computer-implemented method of clause 99, wherein determining, based on the iterative scaling operation, the polygon transformation that avoids the intersection condition comprises identifying a cell in the two-dimensional search space that corresponds to a first parameter value of the first set of predefined scaling factor parameter values and a second parameter value of a second set of predefined scaling factor parameter values.

Clause 101. The computer-implemented method of clause 89, wherein performing the iterative scaling operation comprises performing a linear walk through a two-dimensional search space that is based on the first set of headings and the second set of headings.

Clause 102. The computer-implemented method of clause 101, wherein performing the linear walk through the two-dimensional search space identifies the polygon transformation that avoids the intersection condition and identifies other polygon transformations that avoid the intersection condition.

Clause 103. The computer-implemented method of clause 101, wherein performing the linear walk through the two-dimensional search space identifies certain polygon transformations that do not avoid the intersection condition.

Clause 104. The computer-implemented method of clause 89, wherein the first polygon has a first measured area and the polygon transformation has a second measured area that is less than the first measured area.

Clause 105. The computer-implemented method of clause 89, further comprising generating the polygon transformation based on an output of the iterative scaling operation that indicates that the first input polygon be scaled in at least one dimension of the first dimension or the second dimension.

Clause 106. The computer-implemented method of clause 89, further comprising generating the polygon transformation by at least:

- converting the first polygon to Mercator coordinates;
- translating the first polygon using coordinates of the first pivot point;
- rotating the first polygon using an angle of a heading associated with the first pivot point;
- scaling the first polygon longitudinally according to first output from the iterative scaling operation relating to the first dimension;
- scaling the first polygon transversally according to second output from the iterative scaling operation relating to the second dimension;
- rotating the first polygon inversely using the angle of the heading;
- translating the first polygon inversely using the coordinates of the first pivot;
- converting the first polygon from Mercator coordinates; and
- clipping using the first polygon as input to define the polygon transformation.

Clause 107. The computer-implemented method of clause 89, further comprising:

- generating a score for the polygon transformation based on an area of the polygon transformation divided by a number of vertices in the polygon transformation; and
- prior to causing rendering, selecting the polygon transformation from among a set of potential polygon transformations based on the score.

Clause 108. The computer-implemented method of clause 89, wherein causing rendering of the polygon transformation comprises presenting the polygon transformation for user review and approval, and wherein causing rendering further comprises causing rendering of the first polygon and the second polygon.

Clause 109. One or more non-transitory computer-readable storage devices comprising computer-executable instructions that, when executed by a computer system, causes the computer system to perform the method of clauses 89-108.

Clause 110. A system, comprising:

- one or more memories for storing computer-executable instructions; and
- one or more processors configured access the one or more memories and execute the computer-executable instructions to perform the method of any of clauses 89-108.

The various examples can be further implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network.

Most examples utilize at least one network that would be familiar to those skilled in the art for supporting communications using any of a variety of commercially available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In examples utilizing a network server, the network server can run any of a variety of server or mid-tier applications, including HTTP servers, FTP servers, CGI servers, data servers, Java servers, and business application servers. The server(s) may also be capable of executing programs or scripts in response to requests from user devices, such as by executing one or more applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of examples, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, keypad), and at least one output device (e.g., a display device, printer, speaker). Such a system may also include one or more storage devices, such as disk drives, optical storage devices, and solid-state storage devices such as RAM or ROM, as well as removable media devices, memory cards, or flash cards.

Such devices can also include a computer-readable storage media reader, a communications device (e.g., a modem, a network card (wireless or wired), an infrared communication device), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or browser. It should be appreciated that alternate examples may have numerous variations from that described above. For example, customized hardware might also be used and/or particular elements might be implemented in hardware, software (including portable software, such as applets), or both. Further, connection to other computing devices such as network input/output devices may be employed.

Non-transitory storage media and computer-readable media for containing code, or portions of code, can include any appropriate media known or used in the art, including storage media, such as, but not limited to, volatile and non-volatile, removable and non-removable media implemented in any method or technology for storage of information such as computer-readable instructions, data structures, program modules, or other data, including RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by a system device. Based at least in part on the disclosure and teachings provided herein, a person of ordinary skill in the art will appreciate other ways and/or methods to implement the various examples.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (e.g., meaning "including, but not limited to") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is otherwise understood within the context as used in general to present that an item, term, etc. may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Preferred examples of this disclosure are described herein, including the best mode known to the inventors for carrying out the disclosure. Variations of those preferred examples may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:

identifying an intersection condition corresponding to an intersection between a first polygon of a first type and a second polygon of a second type, the first polygon comprising a set of edges connected by a set of vertexes;

selecting a first pivot-heading pair for the first polygon, the first pivot-heading pair comprising a vertex of the set of vertexes or a midpoint of one edge of the set of edges;

performing an iterative scaling operation comprising at least one of:

scaling the first polygon with respect to a first pivot-heading in a first dimension corresponding to a first heading of the first pivot-heading pair; or scaling the first polygon with respect to the first pivot-heading in a second dimension corresponding to a second heading of the first pivot-heading pair;

determining, based on the iterative scaling operation, a polygon transformation that avoids the intersection condition; and causing rendering, on a display, of a map view that includes the polygon transformation.

2. The computer-implemented method of claim 1, wherein the first polygon comprises a building and the second polygon comprises a road.

3. The computer-implemented method of claim 1, wherein the first polygon comprises a structure type and the second polygon comprises a transport type.

4. The computer-implemented method of claim 1, wherein the iterative scaling operation is a first iterative scaling operation, the method further comprising:

selecting a second pivot point for the first polygon; and performing a second iterative scaling operation with respect to the second pivot point, and wherein determining the polygon transformation comprises determining the polygon transformation based on a comparison of first output from the first iterative scaling operation and second output from the second iterative scaling operation.

5. The computer-implemented method of claim 1, further comprising:
determining a set of pivot points for the first polygon;
determining a set of headings corresponding to the set of pivot points; and
determining a set of pivot-heading pairs by at least combing the set of pivot points with the set of headings, the set of pivot-heading pairs comprising the first pivot-heading pair.

6. One or more non-transitory computer-readable storage devices comprising computer-executable instructions that, when executed by one or more processors of a computer system, causes the computer system to perform operations comprising:
identifying an intersection condition corresponding to an intersection between a first polygon of a first type and a second polygon of a second type, the first polygon comprising a set of edges connected by a set of vertexes;
selecting a first pivot-heading pair for the first polygon, the first pivot-heading pair comprising a vertex of the set of vertexes or a midpoint of one edge of the set of edges;
performing an iterative scaling operation comprising at least one of:
scaling the first polygon with respect to a first pivot-heading in a first dimension corresponding to a first heading of the first pivot-heading pair; or
scaling the first polygon with respect to the first pivot-heading in a second dimension corresponding to a second heading of the first pivot-heading pair;
determining, based on the iterative scaling operation, a polygon transformation that avoids the intersection condition; and
causing rendering, on a display, of a map view that includes the polygon transformation.

7. The one or more non-transitory computer-readable storage devices of claim 6, wherein performing the iterative scaling operation comprises iteratively scaling the first polygon in the first dimension and the second dimension, respectively, according to a first set of predefined scaling factor parameter values for the first dimension and a second set of predefined scaling factor parameter values for the second dimension.

8. The one or more non-transitory computer-readable storage devices of claim 7, wherein the first set of predefined scaling factor parameter values is the same as the second set of predefined scaling factor parameter values.

9. The one or more non-transitory computer-readable storage devices of claim 7, wherein the first set of predefined scaling factor parameter values comprises values between 0.500 and 1.0.

10. The one or more non-transitory computer-readable storage devices of claim 7, wherein the first dimension, the second dimension, the first set of predefined scaling factor parameter values, and the second set of predefined scaling factor parameter values are represented in a two-dimensional search space.

11. The one or more non-transitory computer-readable storage devices of claim 10, wherein performing the iterative scaling operation comprises performing a linear walk through the two-dimensional search space.

12. The one or more non-transitory computer-readable storage devices of claim 11, wherein determining, based on the iterative scaling operation, the polygon transformation that avoids the intersection condition comprises identifying a cell in the two-dimensional search space that corresponds to a first parameter value of the first set of predefined scaling factor parameter values and a second parameter value of a second set of predefined scaling factor parameter values.

13. The one or more non-transitory computer-readable storage devices of claim 6, wherein performing the iterative scaling operation comprises performing a linear walk through a two-dimensional search space that is based on the first heading of the first pivot-heading pair and the second heading of the first pivot-heading pair.

14. The one or more non-transitory computer-readable storage devices of claim 13, wherein performing the linear walk through the two-dimensional search space identifies the polygon transformation that avoids the intersection condition and identifies other polygon transformations that avoid the intersection condition.

15. The one or more non-transitory computer-readable storage devices of claim 13, wherein performing the linear walk through the two-dimensional search space identifies certain polygon transformations that do not avoid the intersection condition.

16. A computer system, comprising:
one or more memories for storing computer-executable instructions; and
one or more processors configured to access the one or more memories and execute the computer-executable instructions to at least:
identify an intersection condition corresponding to an intersection between a first polygon of a first type and a second polygon of a second type, the first polygon comprising a set of edges connected by a set of vertexes;
select a first pivot-heading pair for the first polygon, the first pivot-heading pair comprising a vertex of the set of vertexes or a midpoint of one edge of the set of edges;
perform an iterative scaling operation comprising at least one of:
scaling the first polygon with respect to a first pivot-heading in a first dimension corresponding to a first heading of the first pivot-heading pair; or
scaling the first polygon with respect to the first pivot-heading in a second dimension corresponding to a second heading of the first pivot-heading pair;
determine, based on the iterative scaling operation, a polygon transformation that avoids the intersection condition; and
cause rendering, on a display, of a map view that includes the polygon transformation.

17. The computer system of claim 16, wherein the first polygon has a first measured area and the polygon transformation has a second measured area that is less than the first measured area.

18. The computer system of claim 16, wherein the one or more memories further comprise additional computer-executable instructions, and wherein the one or more processors are configured to access the one or more memories and execute the additional computer-executable instructions to at least generate the polygon transformation based on an output of the iterative scaling operation that indicates that the first polygon be scaled in at least one dimension of the first dimension or the second dimension.

19. The computer system of claim 16, wherein the one or more memories further comprise additional computer-executable instructions, and wherein the one or more processors are configured to access the one or more memories and execute the additional computer-executable instructions to at least:

generate a score for the polygon transformation based on an area of the polygon transformation divided by a number of vertices in the polygon transformation; and prior to causing rendering, select the polygon transformation from among a set of potential polygon transformations based on the score.

* * * * *